United States Patent
Tamura

(10) Patent No.: US 9,553,862 B2
(45) Date of Patent: Jan. 24, 2017

(54) COMMUNICATION SYSTEM, MANAGEMENT APPARATUS, COMMUNICATION METHOD AND COMPUTER-READABLE RECORDING MEDIUM

(71) Applicant: Hideki Tamura, Kanagawa (JP)

(72) Inventor: Hideki Tamura, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 31 days.

(21) Appl. No.: 14/453,095

(22) Filed: Aug. 6, 2014

(65) Prior Publication Data
US 2015/0047002 A1 Feb. 12, 2015

(30) Foreign Application Priority Data
Aug. 9, 2013 (JP) .................................. 2013-167021

(51) Int. Cl.
H04L 29/06 (2006.01)

(52) U.S. Cl.
CPC ........... H04L 63/08 (2013.01); H04L 65/1066 (2013.01); H04L 65/1069 (2013.01);
(Continued)

(58) Field of Classification Search
CPC .. H04L 65/10; H04L 65/1066; H04L 65/1073; H04L 65/40; H04L 65/1093; H04L 65/403; H04L 65/1069; H04L 63/08
See application file for complete search history.

(56) References Cited

U.S. PATENT DOCUMENTS 7,660,849 B1 * 2/2010 Shaffer ............... H04L 12/1818
                                                                  370/261
7,945,615 B1 * 5/2011 Shetty ............... G06F 17/30371
                                                                   709/203

(Continued)

FOREIGN PATENT DOCUMENTS

JP        07-177482      7/1995
JP        2012-050063      3/2012

(Continued)

*Primary Examiner* — Kambiz Zand
*Assistant Examiner* — Ayoub Alata
(74) *Attorney, Agent, or Firm* — Oblon, McClelland, Maier & Neustadt, L.L.P.

(57) ABSTRACT

In the present invention, a start request terminal transmits start request information including participation restriction information to a management system. A transmission/reception unit of the management system transmits participation authentication information for authenticating participation in an established session to a middle-of-conference participation terminal. A transmission/reception unit of a participation request terminal transmits, to the management system, participation request information for requesting participation of the participation request terminal in an established session and participation authentication information which is input with the terminal in accordance with the participation authentication information transmitted to the terminal. A participation determination unit of the management system compares the participation request information received from the participation request terminal and the participation authentication information corresponding to the participating terminal in a terminal management table, and determines whether to permit the participation request terminal to participate in the established session.

18 Claims, 33 Drawing Sheets

(52) U.S. Cl.
CPC ...... *H04L 65/1073* (2013.01); *H04L 65/1093* (2013.01); *H04L 65/403* (2013.01); *H04L 65/40* (2013.01)

(56) References Cited

U.S. PATENT DOCUMENTS

| | | | |
|---|---|---|---|
| 2003/0156698 A1* | 8/2003 | Creamer | H04M 3/382 379/207.01 |
| 2009/0086012 A1* | 4/2009 | Thapa | H04N 7/15 348/14.08 |
| 2013/0117373 A1 | 5/2013 | Umehara | |
| 2014/0033274 A1 | 1/2014 | Okuyama | |
| 2014/0049597 A1 | 2/2014 | Inoue | |
| 2014/0129641 A1 | 5/2014 | Umehara | |
| 2014/0137193 A1 | 5/2014 | Inoue | |

FOREIGN PATENT DOCUMENTS

| | | |
|---|---|---|
| JP | 2014-027433 | 2/2014 |
| JP | 2014-093582 | 5/2014 |

\* cited by examiner

FIG.5

RELAY APPARATUS MANAGEMENT TABLE

| RELAY APPARATUS ID | OPERATION STATE | RECEPTION DATE/TIME | IP ADDRESS OF RELAY APPARATUS | MAXIMUM DATA TRANSMISSION SPEED (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |
| 111e | ONLINE | | 1.1.1.3 | |

FIG.6

TERMINAL AUTHENTICATION MANAGEMENT TABLE

| TERMINAL ID | PASSWORD |
|---|---|
| 10aa | aaaa |
| 10ab | abab |
| 10ba | baba |
| ... | ... |

FIG.7

TERMINAL MANAGEMENT TABLE

| TER-MINAL ID | TERMINAL NAME | OPERATION STATE | COMMU-NICATION STATE | PARTICIPA-TION AU-THENTICATION INFORMATION (PIN CODE) | PARTICI-PATION PIN CODE | PARTICIPA-TION PERMITTED TERMINAL ID | RECEPTION DATE/TIME | IP ADDRESS OF TERMINAL |
|---|---|---|---|---|---|---|---|---|
| 10aa | TERMINAL AA IN TOKYO OFFICE, JAPAN | ONLINE (READY TO COMMUNICATE) | PRIVATE BUSY | 1234 | | | 2009.11.10.13:40 | 1.2.1.3 |
| 10ab | TERMINAL AB IN TOKYO OFFICE, JAPAN | OFFLINE | CALLING | | | | 2009.11.09.12:00 | 1.2.1.4 |
| 10ac | TERMINAL AC IN TOKYO OFFICE, JAPAN | ONLINE (READY TO COMMUNICATE) | NONE | | 1234 | 10aa | 2009.11.10.13:00 | 1.2.1.5 |
| 10ad | TERMINAL AD IN TOKYO OFFICE, JAPAN | ONLINE (IN COMMUNICATION) | PRIVATE BUSY | 1234 | | | 2009.11.10.13:30 | 1.2.1.6 |
| 10ae | TERMINAL AE IN TOKYO OFFICE, JAPAN | ONLINE (IN COMMUNICATION) | BUSY | 1234 | | | 2009.11.10.13:15 | 1.2.1.7 |
| ... | ... | ... | | | | | ... | ... |
| 10ba | TERMINAL BA IN OSAKA OFFICE, JAPAN | ONLINE (READY TO COMMUNICATE) | NONE | | | | 2009.11.10.13:45 | 1.2.2.3 |
| 10bb | TERMINAL BB IN OSAKA OFFICE, JAPAN | ONLINE (READY TO COMMUNICATE) | NONE | | | | 2009.11.10.13:50 | 1.2.2.4 |
| ... | ... | ... | | | | | ... | ... |
| 10ca | TERMINAL CA IN NEW YORK OFFICE, AMERICA | OFFLINE | | | | | 2009.11.10.12:45 | 1.3.1.3 |
| 10cb | TERMINAL CB IN NEW YORK OFFICE, AMERICA | ONLINE (IN COMMUNICATION) | CALLING | | | | 2009.11.10.13:55 | 1.3.1.4 |
| ... | ... | ... | | | | | ... | ... |
| 10da | TERMINAL DA IN WASHINGTON OFFICE, AMERICA | ONLINE (IN COMMUNICATION) | BUSY | | | | 2009.11.08.12:45 | 1.3.2.3 |
| 10db | TERMINAL DB IN WASHINGTON OFFICE, AMERICA | ONLINE (READY TO COMMUNICATE) | NONE | | | | 2009.11.10.12:45 | 1.3.2.4 |
| ... | ... | ... | ... | | | | ... | ... |

FIG.8

DESTINATION LIST MANAGEMENT TABLE

| TERMINAL ID | DESTINATION TERMINAL ID |
|---|---|
| 10aa | 10ab, 10ac, 10ad, 10db |
| 10ab | 10aa, 10ca, 10cb |
| 10ac | 10aa, 10ad, 10ae |
| ... | ... |
| 10db | 10aa, 10ab, 10ba, ···, 10da, 10ca, 10cb, ···, 10da |

FIG.9

SESSION MANAGEMENT TABLE

| SESSION ID | RELAY APPARATUS ID | START REQUEST TERMINAL ID | DESTINATION TERMINAL ID | DELAY TIME (ms) | RECEPTION DATE/ TIME OF DELAY INFORMATION |
|---|---|---|---|---|---|
| se1 | 111e | 10aa | 10db | 200 | 2009.11.10.14:00 |
| se2 | 111b | 10ba | 10be | 50 | 2009.11.10.14:10 |
| se3 | 111c | 10cd | 10cf | 400 | 2009.11.10.14:20 |
| ... | ... | ... | ... | ... | ... |

FIG.10

STATE CHANGE MANAGEMENT TABLE

| CHANGE REQUEST INFORMATION | PRIOR-TO-CHANGE STATE INFORMATION | CHANGE INFORMATION |
|---|---|---|
| CALL | NONE | ACCEPTED |
| JOIN | ACCEPTED | BUSY |
| | PRIVATE ACCEPTED | PRIVATE BUSY |
| LEAVE | BUSY | NONE |
| | PRIVATE BUSY | NONE |

FIG.11

STATE CHANGE MANAGEMENT TABLE

| CHANGE REQUEST INFORMATION | TERMINAL INFORMATION | PRIOR-TO-CHANGE STATE INFORMATION | CHANGE INFORMATION |
|---|---|---|---|
| INVITE | START REQUEST TERMINAL | NONE | CALLING |
| | DESTINATION TERMINAL | NONE | RINGING |
| PRIVATE INVITE | START REQUEST TERMINAL | NONE | PRIVATE CALLING |
| | DESTINATION TERMINAL | NONE | PRIVATE RINGING |
| ACCEPT | START REQUEST TERMINAL | CALLING | ACCEPTED |
| | | PRIVATE CALLING | PRIVATE ACCEPTED |
| | | ACCEPTED | ACCEPTED |
| | | PRIVATE ACCEPTED | PRIVATE ACCEPTED |
| | DESTINATION TERMINAL | RINGING | ACCEPTED |
| | | PRIVATE RINGING | PRIVATE ACCEPTED |

FIG.30

COMMUNICATION SYSTEM, MANAGEMENT APPARATUS, COMMUNICATION METHOD AND COMPUTER-READABLE RECORDING MEDIUM

CROSS-REFERENCE TO RELATED APPLICATION(S)

The present application claims priority to and incorporates by reference the entire contents of Japanese Patent Application No. 2013-167021 filed in Japan on Aug. 9, 2013.

BACKGROUND OF THE INVENTION

1. Field of the Invention

The present invention relates to a communication system, a management apparatus, a communication method, and a computer-readable recording medium.

2. Description of the Related Art

In recent years, in response to the demand for reducing travel expenses and travel time, communication systems for conducting television conference and the like via a communication network such as the Internet are widely available. In such communication system, when communication is started between multiple communication terminals, image data and audio data are transmitted and received, so that the television conference can be realized.

With recent enrichment of broadband environment, high quality image data and high quality audio data can be transmitted and received between multiple communication terminals. Therefore, the situation of the party with which the television conference is conducted can be easily recognized, so that the satisfaction of communication by conversation can be improved.

Japanese Laid-Open Patent Publication NO. 2012-50063 suggests a technique associated with such television conference system, which includes registering terminal information about the party with which communication is made in advance, managing the state of a terminal, and selecting a terminal registered in the destination list, thus easily starting communication with the terminal with which communication is conducted.

Depending on the conference, highly confidential data may be transmitted and received, and it is desired to provide a technique for appropriately restricting participants participating in the conference. Japanese Laid-open Patent Publication NO. 7-177482 suggests such technique for restricting participants participating in the conference, which includes registering participants before the conference is started in order to restrict participants participating in the conference, and preventing those other the registered participants from participating in the conference.

However, in the technique described in Japanese Laid-Open Patent Publication NO. 2012-50063, anybody with a terminal registered in the destination list can participate in the conference, and there is a problem in that the party with which communication is conducted and which is registered in the destination list cannot be prevented from being participating in the conference depending on the agenda of the conference.

In the technique described in Japanese Laid-open Patent Publication NO. 7-177482, there is a problem in that it is troublesome to register participants before the conference is started and it is impossible to easily restrict participation.

In view of the above circumstances, there is a need to provide a communication system, a management apparatus, a communication method, and a computer-readable recording medium capable of improving security while easily restricting a participation location for a session.

SUMMARY OF THE INVENTION

It is an object of the present invention to at least partially solve the problems in the conventional technology.

According to the present invention, there is provide a communication system including a plurality of terminals, the communication system comprising: a first obtaining unit configured to obtain start request information which is information for requesting start of a session between a first terminal and a second terminal of the plurality of terminals and which includes designation of presence/absence of participation restriction restricting a terminal other than the first terminal and the second terminal from participating in the session; a session management unit configured to establish the session between the first terminal and the second terminal in accordance with the start request information; a notification unit configured to notify, to a third terminal other than the first terminal and the second terminal, participation authentication information for authenticating participation in an established session that is already established between the first terminal and the second terminal; a second obtaining unit configured to obtain participation request information with which the third terminal requests participating in the established session, and participation authentication information that is input with the third terminal in accordance with the participation authentication information notified by the notification unit; and a participation determination unit, wherein, when the participation request information is a request for participation in the established session established by the start request information, the participation determination unit compares the participation authentication information notified by the notification unit and the participation authentication information obtained by the second obtaining unit, and when the participation authentication information notified by the notification unit and the participation authentication information obtained by the second obtaining unit match each other, the participation determination unit permits the third terminal to participate in the established session, and when the participation determination unit permits participation in the established session, the session management unit causes the third terminal to participate in the established session.

The present invention also provides a management apparatus comprising: a first obtaining unit configured to obtain start request information which is information for requesting start of a session between a first terminal and a second terminal of a plurality of terminals and which includes designation of presence/absence of participation restriction restricting a terminal other than the first terminal and the second terminal from participating in the session; a session management unit configured to establish the session between the first terminal and the second terminal in accordance with the start request information; a notification unit configured to notify, to a third terminal other than the first terminal and the second terminal, participation authentication information for authenticating participation in an established session that is already established between the first terminal and the second terminal; a second obtaining unit configured to obtain participation request information with which the third terminal requests participating in the established session, and participation authentication information that is input with the third terminal in accordance with the participation authentication information notified by the notification unit; and a participation determination unit, wherein, when the participation request information is a request for participation in the established session established by the start request information, the participation determination unit compares the participation authentication information notified by the notification unit and the participation authentication information obtained by the second obtaining unit, and when the participation authentication information notified by the notification unit and the participation authentication information obtained by the second obtaining unit match each other, the participation determination unit permits the third terminal to participate in the established session, and when the participation determination unit permits participation in the established session, the session management unit causes the third terminal to participate in the established session.

The present invention also provides a communication method comprising: a step of obtaining start request information which is information for requesting start of a session between a first terminal and a second terminal of a plurality of terminals and which includes designation of presence/absence of participation restriction restricting a terminal other than the first terminal and the second terminal from participating in the session; a step of establishing the session between the first terminal and the second terminal in accordance with the start request information; a step of notifying, to a third terminal other than the first terminal and the second terminal, participation authentication information for authenticating participation in an established session that is already established between the first terminal and the second terminal; a step of obtaining participation request information with which the third terminal requests participating in the established session, and participation authentication information that is input with the third terminal in accordance with the participation authentication information notified to the third terminal; and a step of permitting the third party to participate in the established session when the participation request information is a request for participation in the established session established by the start request information, the participation authentication information notified to the third terminal and the participation authentication information which is input with the third terminal are compared, and when the participation authentication information notified to the third terminal and the participation authentication information which is input with the third terminal match each other.

The present invention also provides a non-transitory computer-readable recording medium that contains a computer program that causes a computer to function as a first obtaining unit configured to obtain start request information which is information for requesting start of a session between a first terminal and a second terminal of a plurality of terminals and which includes designation of presence/absence of participation restriction restricting a terminal other than the first terminal and the second terminal from participating in the session; a session management unit configured to establish the session between the first terminal and the second terminal in accordance with the start request information; a notification unit configured to notify, to a third terminal other than the first terminal and the second terminal, participation authentication information for authenticating participation in an established session that is already established between the first terminal and the second terminal; a second obtaining unit configured to obtain participation request information with which the third terminal requests participating in the established session, and participation authentication information that is input with the third terminal in accordance with the participation authentication information notified by the notification unit; and a participation determination unit, wherein, when the participation request information is a request for participation in the established session established by the start request information, the participation determination unit compares the participation authentication information notified by the notification unit and the participation authentication information obtained by the second obtaining unit, and when the participation authentication information notified by the notification unit and the participation authentication information obtained by the second obtaining unit match each other, the participation determination unit permits the third terminal to participate in the established session.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a conceptual diagram illustrating a relay apparatus management table;

FIG. 6 is a conceptual diagram illustrating a terminal authentication management table;

FIG. 7 is a conceptual diagram illustrating a terminal management table;

FIG. 8 is a conceptual diagram illustrating a destination list management table;

FIG. 9 is a conceptual diagram illustrating a session management table;

FIG. 10 is a conceptual diagram illustrating a state change management table;

FIG. 11 is a conceptual diagram illustrating a state change management table;

FIG. 30 is a diagram illustrating an example of display of a destination list of the first embodiment;

DETAILED DESCRIPTION OF THE PREFERRED EMBODIMENTS

Hereinafter, embodiments of a communication system, a management apparatus, a communication method, and a computer-readable recording medium according to the present invention will be hereinafter explained in details with reference to FIGS. 1 to 37. The present invention is not limited by the embodiments explained below. The constituent element according to the embodiments explained below include those that would be easily conceived of by a person ordinarily skilled in the art, those substantially the same as the constituent element according to the embodiments, and those in a so-called equivalent range. Further, the constituent elements can be omitted, replaced, and changed in various manners without deviating from the gist of the embodiments below.

First Embodiment

Overall Configuration of the Present Embodiment

Figure 1:
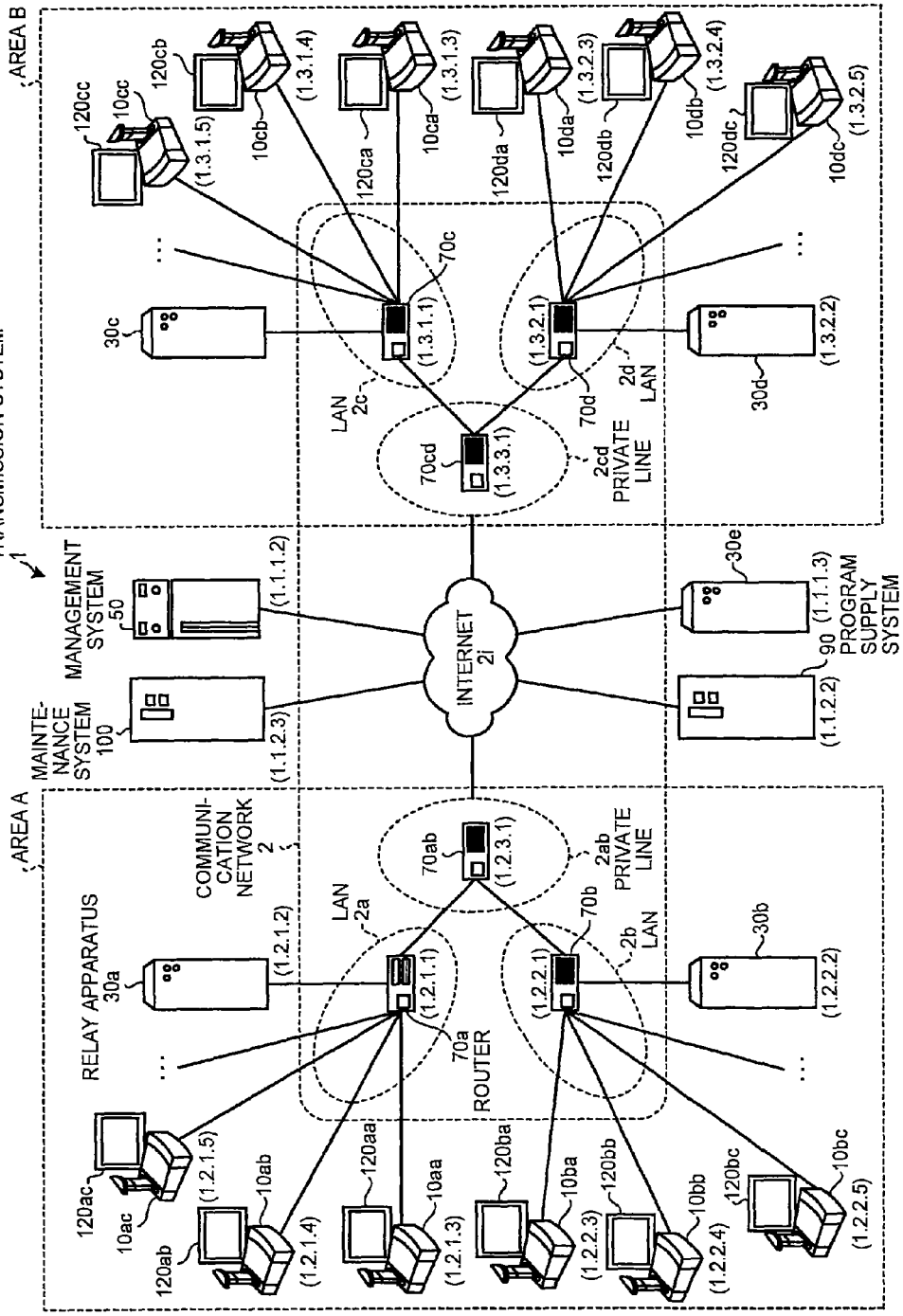
FIG. 1 is a schematic diagram illustrating a transmission system.

FIG. 1 is a schematic diagram illustrating a transmission system according to the present invention. Overall configuration of the transmission system 1 will be explained with reference to FIG. 1.

The transmission system 1 includes a data providing system, for transmitting content data in one direction from one of the transmission terminals to the other of the transmission terminals via a transmission management system, or a communication system for transmitting information, emotions, or the like between multiple transmission terminals with each other via the transmission management system. This communication system is a system for transmitting information, emotions, or the like between multiple communication terminals (corresponding to "transmission terminals") with each other via the communication management system (corresponding to "transmission management system"). Examples of communication systems include a television conference system, a television telephone system, an audio conference system, an audio telephone system, and a PC (Personal Computer) screen sharing system.

In the present embodiment, a transmission system 1, a transmission management system 50, and a transmission terminal 10 will be explained while assuming a television conference system serving as an example of a communication system, a television conference management system serving as an example of a communication management system, and a television conference terminal serving as an example of a communication terminal. More specifically, a communication system according to the present embodiment is not only applied to the television conference system but also applied to the communication system, the transmission system, and the like.

The transmission system 1 as shown in FIG. 1 includes multiple transmission terminals (10aa, 10ab, . . . ), displays (120aa, 120ab, . . . ) for the transmission terminals (10aa, 10ab, . . . ), multiple relay apparatuses (30a to 30e), and a transmission management system 50, a program supply system 90, and a maintenance system 100. In the explanation below, the "transmission terminal" will be simply referred to as a "terminal", and the "transmission management system" will be simply referred to as a "management system".

In the present embodiment, any given terminal of the terminals (10aa, 10ab, . . . ) will be referred to as a "terminal 10", or the terminals (10aa, 10ab, . . . ) are collectively referred to as "terminal 10". Any given display of the displays (120aa, 120ab, . . . ) will be referred to as a "display 120", or the displays (120aa, 120ab, . . . ) are collectively referred to as "display 120". Any given relay apparatus of the relay apparatuses (30a to 30e) will be referred to as a "relay apparatus 30", or the relay apparatuses (30a to 30e) are collectively referred to as "relay apparatus 30".

The terminal 10 transmits and receives various kinds of information to/from other apparatuses. For example, the terminal 10 establishes a session with another terminal 10, and performs communication in the established session by means of transmission/reception of content data including audio data and image data. Therefore, in the transmission system 1, television conference is realized between multiple terminals 10.

It should be noted that the content data transmitted between the terminals 10 are not limited to the audio data and the image data. The content data transmitted between the terminals 10 may be text data, and may include not only the audio data and the image data but also the text data. The image data may be either a motion picture or a still picture. The image data may include both of the motion picture and the still picture.

In a case where the television conference is started in the transmission system 1 according to the present embodiment, a user who wants to start the television conference operates a predetermined terminal 10, so that the operated terminal 10 transmits start request information to the management system 50.

In this case, the start request information is information for requesting start of a session used for the television conference, and includes information for designating the terminal 10 which is the party with which the session is established. In the explanation below, the terminal 10 transmitting the start request information will be referred to as a start request terminal. The terminal 10 of the party with which the session is conducted and which is designated as the party with which the session is conducted will be referred to as a destination terminal.

It should be noted that the destination terminal may be a single terminal 10, or may be two or more terminals 10. More specifically, in the transmission system 1, a television conference can be realized using a session established not only between two terminals 10 but also between three or more terminals 10.

Further, in the transmission system 1 according to the present embodiment, another terminal 10 can participate in a television conference of which session has already been established and started in the middle of the conference. A user who wants to participate in the television conference operates the predetermined terminal 10, so that the operated terminal 10 transmits participation request information, which designates a session being established and used for the television conference in which the user wants to participate (hereinafter referred to as established session) to the management system 50. In the explanation below, the terminal 10 which transmits the participation request information will be referred to as a participation request terminal.

The relay apparatus 30 relays content data between multiple terminals 10.

The management system 50 centrally manages the terminals 10 and the relay apparatuses 30. The management system 50 establishes a session between the terminals 10, so that the television conference is realized by communication and the like between the terminals 10. In a case where the management system 50 receives the start request information of the session from the predetermined terminal 10, the management system 50 establishes the session between the destination terminal and the terminal 10 (start request terminal) which transmitted the start request information, and starts the television conference. When the management system 50 receives the participation request information to the established session from the predetermined terminal 10, the management system 50 determines whether or not to allow the participation request terminal to participate in the established session.

Multiple routers (70a to 70d, 70ab, 70cd) shown in FIG. 1 select the optimum path for content data. In the present embodiment, any given router of the routers (70a to 70d, 70ab, 70cd) may be referred to as "router 70", or the routers (70a to 70d, 70ab, 70cd) are collectively referred to as "router 70".

The program supply system 90 has an HD (Hard Disk), not shown, storing a program for terminal which causes the terminal 10 to realize various kinds of functions or various kinds of means, and can transmit the program for terminal to the terminal 10. In addition, in the program supply system 90, the HD also stores a program for relay apparatus which causes the relay apparatus 30 to realize various kinds of functions or various kinds of means, and can transmit the program for relay apparatus to the relay apparatus 30. Further, in the program supply system 90, the HD also stores a program for transmission management which causes the management system 50 to realize various kinds of functions or various kinds of means, and can transmit the program for transmission management to the management system 50.

The maintenance system 100 is a computer for keeping, managing, or maintaining at least one of the terminal 10, the relay apparatus 30, the management system 50, and the program supply system 90. For example, when the maintenance system 100 is installed in the home country, and the terminal 10, the relay apparatus 30, the management system 50, or the program supply system 90 is installed overseas, the maintenance system 100 performs remote maintenance to, e.g., keep, manage, and maintain at least one of the terminal 10, the relay apparatus 30, the management system 50, and the program supply system 90 via the communication network 2. The maintenance system 100 performs maintenance to manage model number, serial number, sales company, maintenance inspection, or malfunction history of at least one of the terminal 10, the relay apparatus 30, the management system 50, and the program supply system 90 without relying on the communication network 2.

The terminals (10aa, 10ab, 10ac, . . . ), the relay apparatus 30a, and the router 70a are connected via a LAN 2a in a communicable manner. The terminals (10ba, 10bb, 10bc, . . . ), the relay apparatus 30b, and the router 70b are connected via a LAN 2b in a communicable manner. The LAN 2a and the LAN 2b are connected via a private line 2ab including a router 70ab in a communicable manner, and are structured within a predetermined area A. For example, the area A is Japan, and the LAN 2a is structured in an office in Tokyo, and the LAN 2b is structured in an office in Osaka.

On the other hand, the terminals (10ca, 10cb, 10cc, . . . ), the relay apparatus 30c, and the router 70c are connected via a LAN 2c in a communicable manner. The terminals (10da, 10db, 10dc, . . . ), the relay apparatus 30d, and the router 70d are connected via the LAN 2d in a communicable manner. The LAN 2c and LAN 2d are connected via a private line 2cd including a router 70cd in a communicable manner, and are structured within a predetermined area B. For example, the area B is America, and the LAN 2c is structured in an office in New York, and the LAN 2d is structured in an office in Washington D.C.

The area A and the area B are connected via the routers (70ab, 70cd) to the Internet 2i in a communicable manner.

The management system 50 and the program supply system 90 are connected via the Internet 2i to the terminal 10 and the relay apparatus 30 in a communicable manner. The management system 50 and the program supply system 90 may be installed in the area A or the area B, or may be installed in an area other than the area A and the area B.

The relay apparatus 30e is connected via the communication network 2 with the terminal 10 in a communicable manner. The relay apparatus 30e is operating at all times, and the relay apparatus 30e is installed in an area other than the area A and the area B so that the relay apparatus 30e is less affected by communication traffic in the local area of the area A or the area B. Therefore, in a case where the terminal 10 communicates with a terminal installed in another local area, the relay apparatus 30e is used as a relay apparatus for relaying content data. In a case where communication is performed between the terminals 10 in the same local area, the relay apparatus 30e is also used as an emergency relay apparatus if the relay apparatus installed in the local area is not operating.

In the present embodiment, the communication network 2 is structured to include the LAN 2a, the LAN 2b, the private line 2ab, the Internet 2i, the private line 2cd, the LAN 2c, and the LAN 2d. In this communication network 2, there may be a portion where communication is performed not only via a wire but also wirelessly.

In FIG. 1, four sets of numerals indicated in proximity to each terminal 10, each relay apparatus 30, the management system 50, each router 70, the program supply system 90, and the maintenance system 100 indicate IP addresses of generally-available IPv4 in a simplified manner. For example, the IP address of the terminal 10aa is considered to be "1.2.1.3". IPv6 may be used instead of IPv4, but in order to simplify the explanation, IPv4 is used in this explanation.

Hardware Configuration of the Present Embodiment

Subsequently, the hardware configuration of each of the pieces of the equipment of the present embodiment will be explained.

Hardware Configuration of Terminal

Figure 2:
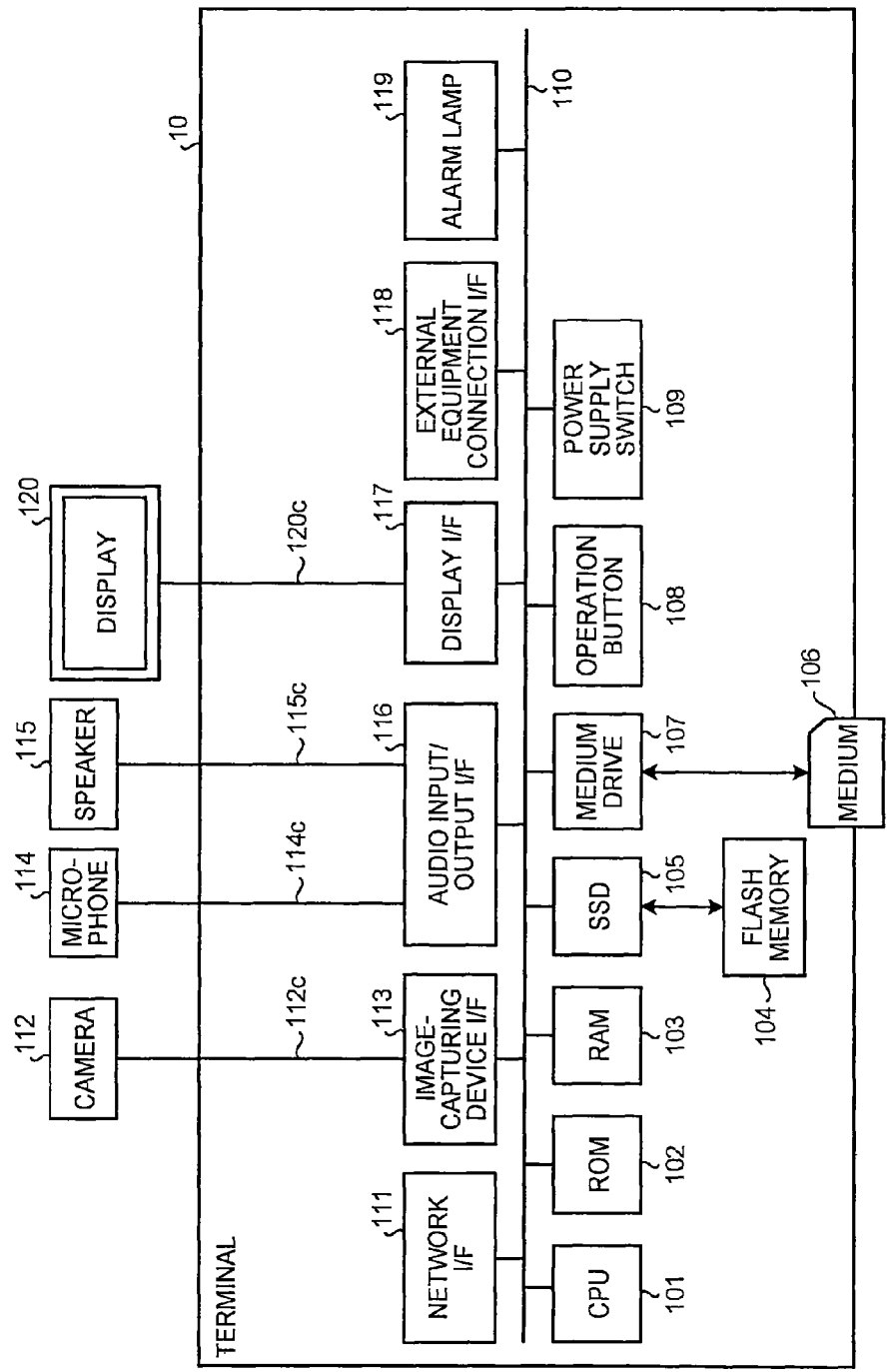
FIG. 2 is a diagram illustrating an example of a hardware configuration of a transmission terminal.

FIG. 2 is a diagram illustrating an example of a hardware configuration of a transmission terminal. The hardware configuration of the terminal 10 will be explained in details with reference to FIG. 2.

As shown in FIG. 2, the terminal 10 of the present embodiment includes a CPU (Central Processing Unit) 101, a ROM (Read Only Memory) 102, a RAM (Random Access Memory) 103, a flash memory 104, an SSD (Solid State Drive) 105, a medium drive 107, an operation button 108, and a power supply switch 109.

The CPU 101 controls entire operation of the terminal 10. The ROM 102 stores a program for the terminal 10. The RAM 703 is used as a work area for the CPU 101. The flash memory 104 stores various kinds of data such as image data and audio data. The SSD 105 controls reading and writing of various kinds of data to/from the flash memory 104 in accordance with the control of the CPU 101. The medium drive 107 controls reading and writing of data to/from a medium 106 such as a flash memory. The operation button 108 is operated when, e.g., the destination of the terminal 10 is selected. The power supply switch 109 switches the terminal 10 to either ON or OFF state.

The terminal 10 includes a network I/F 111, an image-capturing device I/F 113, an audio input/output I/F 116, a display I/F 117, an external equipment connection I/F 118, and an alarm lamp 119.

The network I/F 111 is an interface for communicating data using the communication network 2. The image-capturing device I/F 113 is an interface for transmitting image data with a camera 112 which obtains image data by image-capturing a subject in accordance with the control of the CPU 101. The audio input/output I/F 116 is an interface for processing input/output of the audio signal with a speaker 115 which outputs audio and a microphone 114 which inputs audio in accordance with the control of the CPU 101. The microphone 114 and the speaker 115 are connected via a cable 114c and a cable 115c, respectively, to the audio input/output I/F 116. The display I/F 117 is an interface for transmitting image data to the externally-attached display 120 in accordance with the control of the CPU 101. The external equipment connection I/F 118 is an interface for connecting various kinds of external equipment. The alarm lamp 119 is a lamp for notifying abnormality of various kinds of functions of the terminal 10.

The CPU 101, the ROM 102, the RAM 103, the SSD 105, the medium drive 107, the operation button 108, the power supply switch 109, the network I/F 111, the image-capturing device I/F 113, the audio input/output I/F 116, the display I/F 117, the external equipment connection I/F 118, and the alarm lamp 119, which have been explained above, are electrically connected with each other via a bus line 110 such as an address bus and a data bus.

The medium 106 is a storage device detachably attached to the terminal 10. As long as the medium 106 is a non-volatile memory from/to which data are read and written in accordance with the control of the CPU 101, the medium 106 is not limited to the flash memory, and the medium 106 may also be an EEPROM (Electrically Erasable and Programmable ROM) and the like.

The camera 112 includes a lens and a solid-state image-capturing device for converting light into electrical charge and electronizing an image (video) of a subject. The camera 112 is connected via a cable 112c to the image-capturing device I/F 113. The solid-state image-capturing device may be a CMOS (Complementary Metal Oxide Semiconductor), a CCD (Charge Coupled Device), or the like.

The external equipment connection I/F 118 is an interface allowing for electrical connection with external equipment such as an externally-attached camera, an externally-attached microphone, an externally-attached speaker, and the like by means of USB (Universal Serial Bus) cable and the like. When the external equipment connection I/F 118 is connected with the externally-attached camera, the externally-attached camera operates in priority to the camera 112 in accordance with the control of the CPU 101. Likewise, when the external equipment connection I/F 118 is connected with the externally-attached microphone or when the external equipment connection I/F 118 is connected with the externally-attached speaker, the externally-attached microphone or the externally-attached speaker operate in priority to the microphone 114 or the speaker 115, respectively, in accordance with the control of the CPU 101.

The display 120 is a display device constituted by liquid crystal or organic EL for displaying an image of a subject, an icon for operation, and the like. The display 120 is connected to the display I/F 117 via the cable 120c. The cable 120c may be a cable for analog RGB (VGA) signal, or may be a cable for component video, or may be a cable for HDMI (registered trademark) (High-Definition Multimedia Interface) or a cable for DVI (Digital Video Interactive) signal.

It should be noted that the terminal 10 may be a general-purpose PC, a smart phone, a tablet terminal, or a cellular telephone.

It should be noted that the program of the terminal 10 explained above may be recorded as a file in an installable format or an executable format to a computer readable recording medium (such as the medium 106) and may be distributed. Alternatively, the program of the terminal 10 explained above may be stored in the ROM 102 instead of the medium 106.

Hardware Configuration of Relay Apparatus And System

Figure 3:
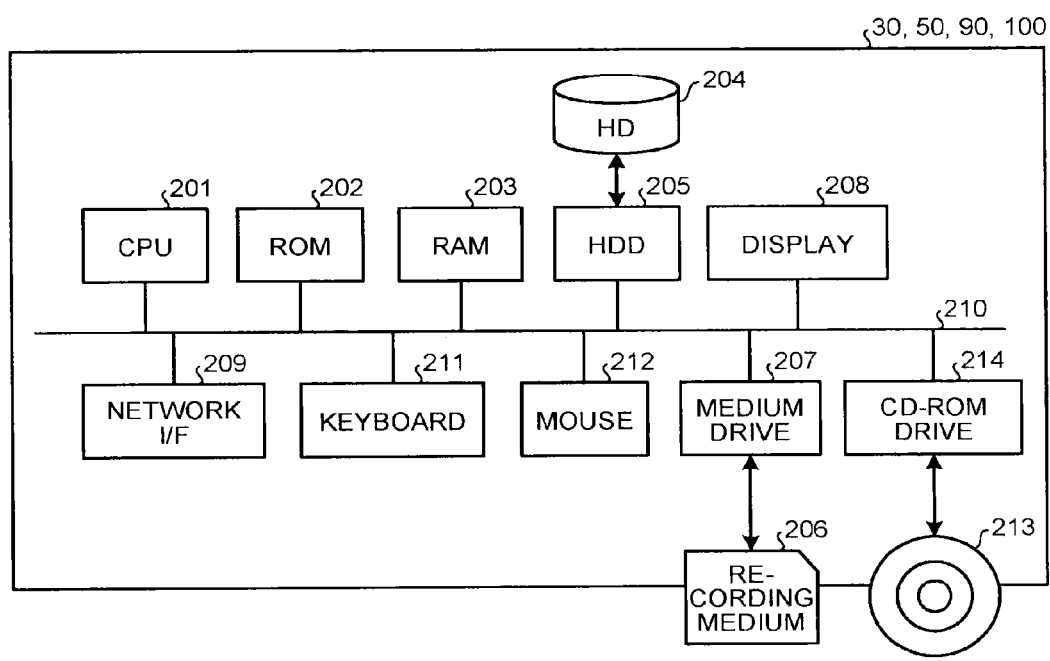
FIG. 3 is a diagram illustrating examples of hardware configurations of a relay apparatus, a transmission management system, a program supply system, and a maintenance system.

FIG. 3 is a diagram illustrating an example of hardware configurations of the relay apparatus, the transmission management system, the program supply system, and the maintenance system. The details of the hardware configurations of the relay apparatus 30, the management system 50, the program supply system 90, and the maintenance system 100 will be explained with reference to FIG. 3.

First, the hardware configuration of the management system 50 will be explained with reference to FIG. 3. The management system 50 includes a CPU 201, a ROM 202, a RAM 203, an HD (Hard Disk) 204, an HDD (Hard Disk Drive) 205, a medium drive 207, a display 208, a network I/F 209, a keyboard 211, a mouse 212, and a CD-ROM drive 214.

The CPU 201 controls entire operation of the management system 50. The ROM 202 stores a transmission management program. The RAM 203 is used as a work area for the CPU 201. The HD 204 stores various kinds of data. The HOD 205 controls reading and writing of various kinds of data to/from the HD 204 in accordance with the control of the CPU 201. The medium drive 207 controls reading and writing of data to/from a recording medium 206 such as a flash memory in accordance with the control of the CPU 201. The display 208 displays various kinds of information such as a cursor, a menu, a window, a text, an image, or the like. The network I/F 209 is an interface for communicating data by using the communication network 2. The keyboard 211 is an input device for, e.g., selecting texts, numerals, various kinds of commands and moving the cursor. The mouse 212 is an input device for, e.g., selecting and executing various kinds of commands, selecting processing target, and moving the cursor. The CD-ROM drive 214 controls reading and writing of data to/from the CD-ROM (Compact Disc Read Only Memory) 213 which is an example of detachable recording medium.

The CPU 201, the ROM 202, the RAM 203, the HDD 205, the medium drive 207, the display 208, the network I/F 209, the keyboard 211, the mouse 212, and the CD-ROM drive 214, explained above, are electrically connected with each other via a bus line 210 such as an address bus and a data bus.

It should be noted that the program for the transmission management explained above may be recorded as a file in an installable format or an executable format to a computer readable recording medium such as the recording medium 206 or the CD-ROM 213, and may be distributed.

The relay apparatus 30 has the same hardware configuration as the management system 50 explained above, and therefore, explanation thereabout will be omitted. However, the ROM 202 stores the program for the relay apparatus which is for controlling the relay apparatus 30. In such case, the program for the relay apparatus may be recorded as a file in an installable format or an executable format to the computer readable recording medium such as the recording medium 206 or the CD-ROM 213, and may be distributed.

It should be noted that the program supply system 90 has the same hardware configuration as the management system 50 explained above, and therefore, explanation thereabout will be omitted. However, the ROM 202 stores the program for the program providing which is for controlling the program supply system 90. In such case, the program for the program providing may be recorded as a file in an installable format or an executable format to the computer readable recording medium such as the recording medium 206 or the CD-ROM 213, and may be distributed.

It should be noted that the maintenance system 100 has the same hardware configuration as the management system 50 explained above, and therefore, explanation thereabout will be omitted. However, the ROM 202 stores the program for the maintenance which is for controlling the maintenance system 100. In such case, the program for the maintenance may be recorded as a file in an installable format or an executable format to the computer readable recording medium such as the recording medium 206 or the CD-ROM 213, and may be distributed.

In other examples of detachable recording media, the program may be recorded to a computer readable recording medium such as CD-R (Compact Disc Recordable), DVD (Digital Versatile Disk), or Blu-ray Disc (registered trademark), and the like may be provided.

Functional Configuration of the Present Embodiment

Figure 4:
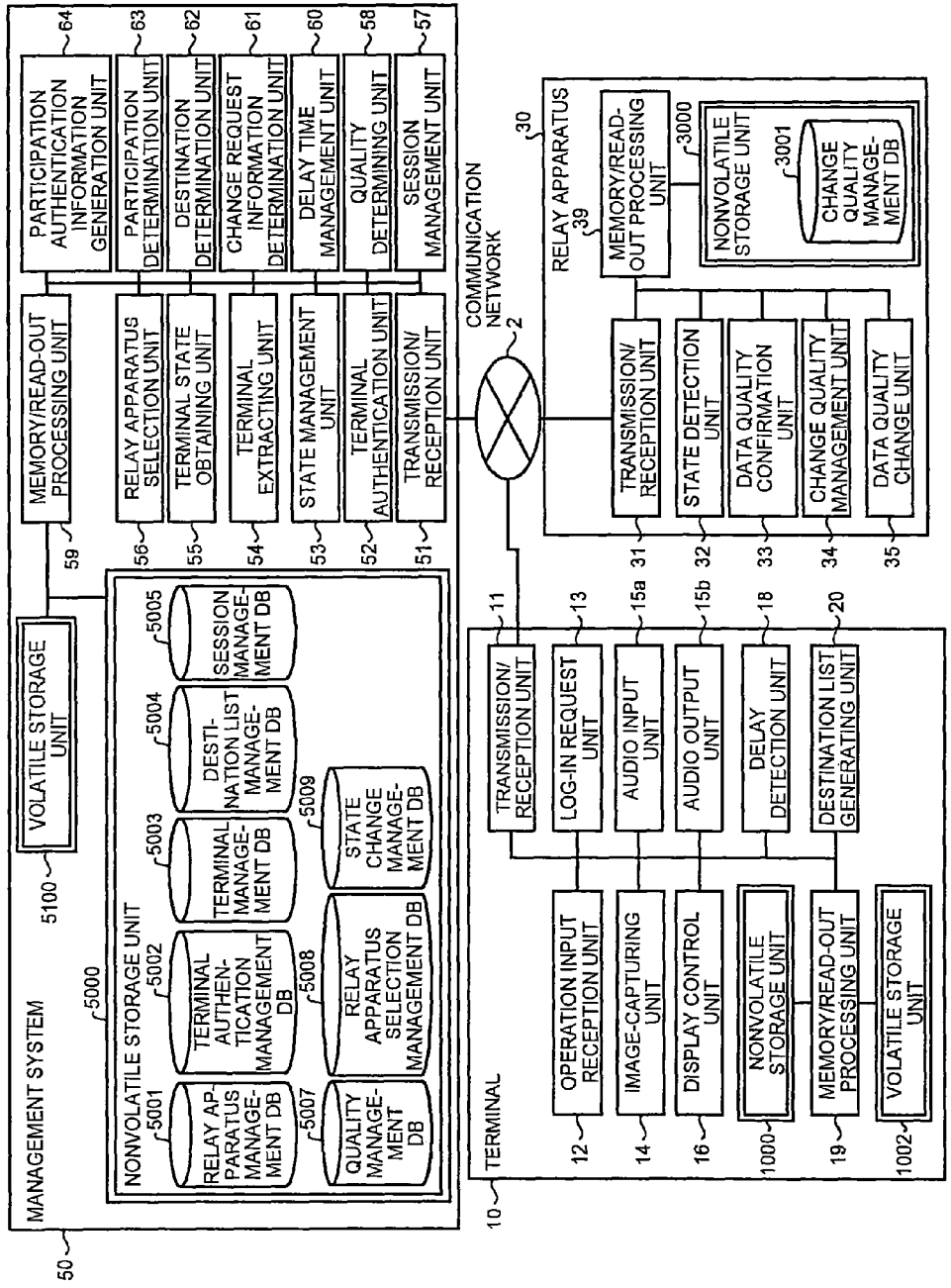
FIG. 4 is a diagram illustrating an example of function blocks of the transmission terminal, the relay apparatus, and the transmission management system according to a first embodiment of the present invention.

FIG. 4 is a diagram illustrating an example of function blocks of the transmission terminal, the relay apparatus, and the transmission system according to the first embodiment. The functional configuration of each of the pieces of the equipment of the present embodiment will be explained with reference to FIG. 4.

As shown in FIG. 4, the terminal 10, the relay apparatus 30, and the management system 50 are connected to allow for data communication via the communication network 2. The program supply system 90 and the maintenance system 100 as shown in FIG. 1 are not directly related in communication of the television conference, and therefore, they are omitted in FIG. 4.

Functional Configuration of Terminal

The terminal 10 includes a transmission/reception unit 11, an operation input reception unit 12, a log-in request unit 13, an image-capturing unit 14, an audio input unit 15a, an audio output unit 15b, a display control unit 16, a delay detection unit 18, a memory/read-out processing unit 19, and a destination list generation unit 20. Each of the processing units explained above is a function or means which is realized by causing any one of the constituent elements as shown in FIG. 2 to operate in accordance with a command given by the CPU 101 according to the program stored in the ROM 102. The terminal 10 includes a volatile storage unit 1002 that is realized by the RAM 103 as shown in FIG. 2 and a nonvolatile storage unit 1000 that is realized by the flash memory 104 as shown in FIG. 2.

The transmission/reception unit 11 is realized by the network I/F 111 as shown in FIG. 2, and transmits and receives various kinds of data to/from another terminal, apparatus, or system via the communication network 2. Before the terminal 10 in question establishes a session with another terminal 10 and starts television conference by means of communication, the transmission/reception unit 11 starts reception of each piece of state information indicating the state of each terminal 10, which is a destination terminal candidate, from the management system 50. In this case, the destination terminal candidate is another terminal 10 which is a candidate with which the television conference is conducted which can be designated as a terminal with which the terminal 10 conducts the television conference, i.e., a terminal with which the session is established. More specifically, the terminal 10 cannot establish a session with a terminal which is not set as a destination terminal candidate in advance, and cannot conduct the television conference.

The state information indicates operation state of each terminal 10 (the state as to whether online or offline), and when online, the state information further indicates detailed state as to whether, e.g., the terminal 10 is communicating or is ready to receive communication (hereinafter referred to as communication state). The state information is not limited to only the operation state and the communication state of each terminal 10, and may indicate various states which include, for example, a state that the cable is disconnected from the terminal 10, a state that the audio can be output but the image cannot be output, a state that the audio is configured not to be output (MUTE), or the like. In the explanation below, for example, a case where the state information indicates the operation state and the communication state will be explained.

When the terminal 10 operates as a start request terminal, the transmission/reception unit 11 transmits the start request information to the management system 50. In this case, the start request information is information for requesting start of a session used for the television conference. More specifically, the start request information is information including information indicating that the start is requested, the terminal ID of the start request terminal which is the transmission source of the start request information, the terminal ID of the destination terminal with which the session is established, and the participation restriction information indicating presence/absence of participation restriction to the session of a terminal 10 other than the destination terminal, and the terminal ID of a middle-of-conference participation terminal explained later. The terminal ID is information for identifying the terminal 10, and may be stored to the terminal 10 in advance, or may be determined when it is directly input by the user to the terminal 10.

More specifically, a piece of information in the start request information which indicates that the start is requested is either "Invite" or "Private Invite". In this case, "Invite" is information indicating that the start is requested, and is participation restriction information indicating that there is no participation restriction. On the other hand, "Private Invite" is information indicating that the start is requested, and is participation restriction information indicating that there is participation restriction.

In this case, the participation restriction information will be explained in detail. In the transmission system 1 according to the present embodiment, another terminal 10 can participate in the established session. However, for example, in some cases, when highly confidential conference is conducted, participation of another terminal 10 in the conference is preferably not admitted. Therefore, in the transmission system 1 according to the present embodiment, participation of another terminal 10 to the established session is restricted in accordance with whether there is participation restriction which is indicated by the participation restriction information.

When the terminal 10 operates as the participation request terminal, the transmission/reception unit 11 transmits the participation request information to the management system 50. In this case, the participation request information is information for requesting participating in the established session used in the television conference already started. More specifically, the participation request information is information including "Call" which is information indicating that the participation is requested, the terminal ID of the participation request terminal which is the transmission source of the participation request information, and the terminal ID of the participating terminal which is participating in the established session which is desired to be participated in. In this case, more specifically, the participating terminal is the destination terminal or the start request terminal indicated by the start request information transmitted when the established session is started.

The operation input reception unit 12 is realized by the operation button 108 and the power supply switch 109 as shown in FIG. 2, and receives various kinds of input from the user. For example, when the user turns ON the power supply switch 109 of the operation input reception unit 12 as shown in FIG. 2, the terminal 10 is turned ON. When the user changes the power supply switch 109 from the ON state to the OFF state, the transmission/reception unit 11 transmits the state information indicating that the terminal 10 is turned OFF to the management system 50, and thereafter, the operation input reception unit 12 completely turns OFF the terminal 10. Accordingly, the management system 50 can find that the terminal 10 changes from the power ON state to the power OFF state.

The log-in request unit 13 is realized by a command given by the CPU 101 as shown in FIG. 2, and when the terminal 10 is turned ON, the transmission/reception unit 11 transmits log-in request information for requesting log-in and the IP address of the terminal 10 at that moment via the communication network 2 to the management system 50.

The image-capturing unit 14 is realized by the command given by the CPU 101 as shown in FIG. 2 and the camera 112 and the image-capturing device I/F 113 as shown in FIG. 2, and captures an image of a subject and outputs the captured image data.

The audio input unit 15a is realized by the audio input/output I/F 116 as shown in FIG. 2, and the microphone 114 converts the user's audio into an audio signal, and thereafter, the audio input unit 15a receives the audio data related to the audio signal. The audio output unit 15b is realized by the command given by the CPU 101 as shown in FIG. 2 and the audio input/output I/F 116 as shown in FIG. 2, and outputs the audio signal related to the audio data to the speaker 115, and outputs the audio from the speaker 115.

The display control unit 16 is realized by the display I/F 117 as shown in FIG. 2, and performs control so as to transmit image data to the externally-attached display 120. Before the terminal 10 which is the request source starts communication of the television conference with the terminal 10 serving as the desired destination, the display control unit 16 reflects the state information of the destination terminal candidates received by the transmission/reception unit 11, and displays the destination list including the names of the destination terminal candidates on the display 120.

The delay detection unit 18 is realized by a command given by the CPU 101 as shown in FIG. 2, and detects a delay time (ms) of image data or audio data transmitted from another terminal 10 via the relay apparatus 30.

The memory/read-out processing unit 19 is realized by a command given by the CPU 101 as shown in FIG. 2 and the SSD 105 as shown in FIG. 2, for example, and performs processing to store various kinds of data to the nonvolatile storage unit 1000, and read various kinds of data stored in the nonvolatile storage unit 1000. The nonvolatile storage unit 1000 stores the terminal ID, the password, and the like for identifying the terminal 10. Further, the memory/read-out processing unit 19 performs processing to store various kinds of data to the volatile storage unit 1002, and read various kinds of data stored in the volatile storage unit 1002. The content data received when communication is performed with the destination terminal are overwritten to the volatile storage unit 1002 every time the content data are received. Among these, an image is displayed on the display 120 on the basis of the image data stored prior to overwriting, and audio is output from the speaker 115 on the basis of the audio data stored prior to overwriting.

Figure 17:
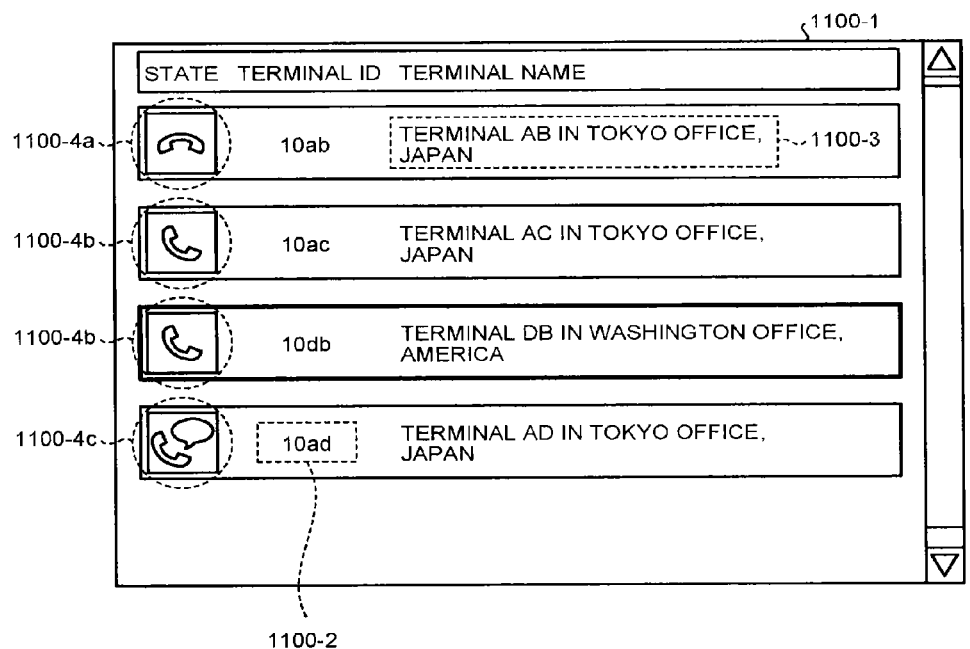
FIG. 17 is a diagram illustrating an example of display of a destination list.

The destination list generation unit 20 is realized by a command given by the CPU 101 as shown in FIG. 2, and generates and updates the destination list in which the state of a destination terminal candidate is indicated by an icon as shown in FIG. 17, on the basis of the state information of the terminal 10 serving as each destination terminal candidate and the destination list information explained later received from the management system 50.

Functional Configuration of Relay Apparatus

The relay apparatus 30 includes a transmission/reception unit 31, a state detection unit 32, a data quality confirmation unit 33, a change quality management unit 34, a data quality change unit 35, and a memory/read-out processing unit 39. Each of the processing units explained above is a function or means that is realized when any one of the constituent elements as shown in FIG. 3 operates in accordance with a command given by the CPU 201 according to the program stored in the ROM 202. The relay apparatus 30 is realized by the HD 204 as shown in FIG. 3, and includes a nonvolatile storage unit 3000 keeping the memory of various kinds of data even if the relay apparatus 30 is turned OFF.

The transmission/reception unit 31 is realized by the network I/F 209 as shown in FIG. 3, and transmits and receives various kinds of data to/from another terminal, apparatus, or system via the communication network 2.

The state detection unit 32 is realized by a command given by the CPU 201 as shown in FIG. 3, and detects the operation state of the relay apparatus 30. Examples of operation states include states such as "ON line", "OFF line", "malfunction", or the like.

The data quality confirmation unit 33 is realized by a command given by the CPU 201 as shown in FIG. 3, and searches a change quality management table explained later using the IP address of the terminal 10 serving as the relay destination as a search key, and extracts image quality of corresponding image data to be relayed.

The change quality management unit 34 is realized by a command given by the CPU 201 as shown in FIG. 3, and changes the content of the change quality management table explained later on the basis of the image information transmitted from the management system 50.

The data quality change unit 35 is realized by a command given by the CPU 201 as shown in FIG. 3, and changes the image quality of the image data transmitted from the terminal 10 of the transmission source on the basis of the content of the changed change quality management table.

The memory/read-out processing unit 39 is realized by the HDD 205 as shown in FIG. 3, and performs processing to store various kinds of data to the nonvolatile storage unit 3000, and read various kinds of data stored in the nonvolatile storage unit 3000.

(Change Quality Management Table)

The nonvolatile storage unit 3000 stores a change quality management DB (Data Base) 3001 constituted by the change quality management table. In the change quality management table, the IP address of the terminal 10 which is the relay destination of the image data is associated with the image quality of the image data relayed to the relay destination by the relay apparatus 30, and the relay destination and the image quality are managed.

In the present embodiment, there are a low resolution image serving as a base image of which horizontal size is 160 pixels and vertical size is 120 pixels, a medium resolution image of which horizontal size is 320 pixels and vertical size is 240 pixels, and a high resolution image of which horizontal size is 640 pixels and vertical size is 480 pixels. When transmitted via a narrow band width path, low resolution image data made of only the low resolution image data, serving as the base image, among them are relayed. When each band width is relatively wide, image data of a medium image quality made of medium resolution image data and low resolution image data serving as a base image are relayed. When the band width is extremely wide, low resolution image data serving as the base image quality, medium resolution image data, and high resolution image data are relayed.

Functional Configuration of Management System

The management system 50 includes a transmission/reception unit 51, a terminal authentication unit 52, a state management unit 53, a terminal extraction unit 54, a terminal state obtaining unit 55, a relay apparatus selection unit 56, a session management unit 57, a quality determination unit 58, a memory/read-out processing unit 59, a delay time management unit 60, a change request information determination unit 61, a destination determination unit 62, a participation determination unit 63, and a participation authentication information generation unit 64. Each of the processing units is a function or means that is realized when any one of the constituent elements as shown in FIG. 3 operates in accordance with a command given by the CPU 201 according to the program stored in the ROM 202. The management system 50 is realized by the HD 204 as shown in FIG. 3, and has a nonvolatile storage unit 5000 keeping the memory of various kinds of data even if the management system 50 is in the OFF state. Further, the management system 50 has a volatile storage unit 5100 that is realized by the PAM 203 as shown in FIG. 3.

(Relay Apparatus Management Table)

FIG. 5 is a conceptual diagram illustrating a relay apparatus management table. The relay apparatus management table will be explained with reference to FIG. 5.

The nonvolatile storage unit 5000 stores a relay apparatus management DB 5001 constituted by the relay apparatus management table as shown in FIG. 5. For each relay apparatus ID identifying a relay apparatus 30, the relay apparatus management table manages the operation state of the relay apparatus 30, the state information including the operation state, the reception date/time of reception by the management system 50, the IP address of the relay apparatus 30, and the maximum data transmission speed (Mbps) at the relay apparatus 30, in such a manner that the operation state of the relay apparatus 30, the state information including the operation state, the reception date/time of reception by the management system 50, the IP address of the relay apparatus 30, and the maximum data transmission speed (Mbps) at the relay apparatus 30 are associated with each other. In this case, the relay apparatus ID is information for identifying the relay apparatus 30.

For example, the relay apparatus management table as shown in FIG. 5 indicates that a relay apparatus 30a of which relay apparatus ID is "111a" is such that its operation state is "online", the date/time when the management system 50 receives the state information is "13:00 on Nov. 10, 2009", the IP address of this relay apparatus 30a is "1.2.1.2", and the maximum data transmission speed of the relay apparatus 30a is 100 Mbps.

(Terminal Authentication Management Table)

FIG. 6 is a conceptual diagram illustrating the terminal authentication management table. The terminal authentication management table will be explained with reference to FIG. 6.

The nonvolatile storage unit 5000 stores a terminal authentication management DB 5002 constituted by a terminal authentication management table as shown in FIG. 6. In the terminal authentication management table, the terminal ID of each of all the terminals 10 managed by the management system 50 is associated with its password and managed. In this case, the terminal ID is information for identifying the terminal 10, and the password is information used to authenticate the terminal 10. For example, as shown in FIG. 6, the terminal authentication management table indicates the terminal ID of the terminal 10*aa* is "10aa", and the password is "aaaa".

It should be noted that the terminal ID and the relay apparatus ID of the present embodiment indicate identification information such as texts, symbols, numerals, various kinds of marks, or the like used to uniquely identify the terminal 10 and the relay apparatus 30, respectively. Alternatively, the terminal ID and the relay apparatus ID may be identification information which is a combination of at least two of the texts explained above, the texts, the symbols, the numerals, and various kinds of marks.

(Terminal Management Table)

FIG. 7 is a conceptual diagram illustrating the terminal management table. The terminal management table will be explained with reference to FIG. 7.

The nonvolatile storage unit 5000 stores a terminal management DB 5003 constituted by a terminal management table as shown in FIG. 7. For the terminal ID of each terminal 10, the terminal management table manages the terminal name, the operation state of the terminal 10, the communication state with another terminal, the participation authentication information (PIN (Personal Identification Number) code), the participation PIN code, the participation destination terminal ID, the reception date/time when log-in request information explained later is received by the management system 50, and the IP address of the terminal 10 in such a manner that the terminal name, the operation state of the terminal 10, the communication state with another terminal, the participation authentication information (PIN (Personal Identification Number) code), the participation PIN code, the participation destination terminal ID, the reception date/time when log-in request information explained later is received by the management system 50, and the IP address of the terminal 10 are associated with each other.

In this case, the operation state is either online which is a state where the power supply is turned on and the terminal is ready to communicate or the terminal is in communication, and offline which is a state where the terminal cannot communicate, e.g., the terminal is not turned ON.

Examples of communication states include "Calling", "Ringing", "Accepted", "Busy", "None", and the like. "Calling" is a state in which the terminal 10 is calling another terminal 10. More specifically, "Calling" indicates a state in which the terminal 10 transmits start request information of a session used for television conference to another terminal 10 and waits for a response. "Ringing" is a state in which the terminal 10 is called by another terminal 10. More specifically, "Ringing" indicates a state in which the terminal 10 receives the start request information from another terminal 10, and has not yet completed response to the received start request information. "Accepted" is a state in which the terminal 10 has completed response of permission to the start request information transmitted from another terminal 10, but has not yet established the session, and indicates a state in which the terminal 10 has completed reception of permission to the start request information transmitted from the terminal 10 in question but has not yet established the session. "Busy" indicates a state in which the terminal 10 has established the session with another terminal 10, and is transmitting content data for the television conference. "None" indicates a state in which the terminal 10 is not communicating with another terminal, and is waiting. The above communication states are communication states corresponding to a session not applied with participation restriction, which is established in response to start request information including participation restriction information indicating that there is no participation restriction.

Further, in the management system 50 according to the present embodiment, a communication state corresponding to a session applied with participation restriction established in response to start request information including participation restriction information indicating presence of the participation restriction is managed as a communication state different from the communication state corresponding to the session not applied with the participation restriction. More specifically, these states correspond to "Calling", "Ringing", "Accepted", and "Busy", respectively, which serve as the communication states for the session not applied with the participation restriction, and there are "Private Calling", "Private Ringing", "Private Accepted", "Private Busy", and the like, which are the communication states for the session applied with the participation restriction. As described above, in accordance with presence/absence of the participation restriction, the communication states are distinguished and managed, and therefore, in the management system 50 according to the present embodiment, presence/absence of the participation restriction can be identified from the communication state.

The participation authentication information is information for authenticating participation in a session applied with participation restriction. Therefore, the participation authentication information is registered for a terminal of which communication state is "Private Calling", "Private Ringing", "Private Accepted", or "Private Busy" indicating the session applied with the participation restriction. In the present embodiment, the participation authentication information is a PIN code made of alphabets, numerals, symbols, or a combination of numerals. However, the participation authentication information is not limited thereto.

The participation PIN code is a PIN code allocated by the start request terminal (participation destination terminal) to a terminal 10 (middle-of-conference participation terminal) designated with participation in the session applied with the participation restriction.

The participation destination terminal ID is a terminal ID of the start request terminal, i.e., the participation destination terminal, which is to be notified by the start request terminal to the middle-of-conference participation terminal designated with participation in the session applied with the participation restriction.

For example, the terminal management table as shown in FIG. 7 shows that the terminal 10*ad* of which terminal ID is "10ad" is as follows: the terminal name is "terminal AD in Tokyo Office, Japan", the operation state is "online (in communication)", the communication state is "Private Busy" indicating the state of transmitting content data via a session applied with the participation restriction, the participation authentication information is "1234", the reception date/time of the log-in request information by the management system 50 is "13:30 on Nov. 10, 2009", and the IP address of this terminal 10*ad* is "1.2.1.6".

(Destination List Management Table)

FIG. 8 is a conceptual diagram illustrating a destination list management table. The destination list management table will be explained with reference to FIG. 8.

The nonvolatile storage unit 5000 stores a destination list management DB 5004 constituted by a destination list management table as shown in FIG. 8. The destination list management table manages the terminal ID of the start request terminal for the session used in the television conference including communication managed by the management system 50 and the terminal ID for identifying the destination terminal candidate which is the terminal 10 of the candidate of destination of the content data transmitted from this start request terminal, in such a manner that the terminal ID of the start request terminal for the session used in the television conference including communication managed by the management system 50 and the terminal ID for identifying the destination terminal candidate which is the terminal 10 of the candidate of destination of the content data transmitted from this start request terminal are associated with each other.

For example, in the destination list management table as shown in FIG. 8, the destination terminal candidate with which the terminal (the terminal 10aa) of which terminal ID is "10aa" can request start of the television conference includes the terminal (the terminal 10ab) of which terminal ID is "10ab", the terminal (the terminal 10ac) of which terminal ID is "10ac", the terminal (the terminal 10ad) of which terminal ID is "10ad", and the terminal (the terminal 10db) of which terminal ID is "10db". The destination terminal candidate is updated when the destination terminal candidate is added or deleted in response to the request of addition or deletion which is given by the start request terminal to the management system 50.

(Session Management Table)

FIG. 9 is a conceptual diagram illustrating a session management table. The session management table will be explained with reference to FIG. 9.

The nonvolatile storage unit 5000 stores a session management DB 5005 constituted by a session management table as shown in FIG. 9. For each session ID for identifying a session in which content data are transmitted between terminals, the session management table manages the relay apparatus ID of the relay apparatus 30 used for relaying of the content data in the session, the terminal ID of the start request terminal of the session, and the terminal ID of the destination terminal designated in the start request information of the session as the terminal with which the television conference is conducted, in such a manner that the relay apparatus ID of the relay apparatus 30 used for relaying of the content data in the session, the terminal ID of the start request terminal of the session, and the terminal ID of the destination terminal designated in the start request information of the session as the terminal with which the television conference is conducted are associated with each other. Further, for each session ID, the session management table manages the delay time (ms) of reception when the destination terminal receives image data and the reception date/time when the delay information indicating the delay time is transmitted from the destination terminal and is received by the management system 50, in such a manner that the delay time (ms) of reception when the destination terminal receives image data and the reception date/time when the delay information indicating the delay time is transmitted from the destination terminal and is received by the management system 50 are associated with each other.

For example, the session management table as shown in FIG. 9 indicates that the relay apparatus 30e (relay apparatus ID "111e") selected in the session executed using the session ID "se1" relays content data between the start request terminal (the terminal 10aa) of which terminal ID is "10aa" and the destination terminal (the terminal 10db) of which terminal ID is "10db", and that the delay time of the image data at "14:00 on Nov. 10, 2009" at the destination terminal is 200 (ms). When the television conference is conducted between two terminals 10, the reception date/time of the delay information may be managed on the basis of the delay information transmitted from the start request terminal which is not the destination terminal. However, when television conference is conducted between three or more terminals 10, the reception date/time of the delay information is managed on the basis of the delay information transmitted from the terminal 10 at the reception side of the content data.

(Quality Management Table)

The nonvolatile storage unit 5000 stores a quality management DB 5007 constituted by a quality management table. The quality management table associates and manages the image quality of the image data (the quality of the image) relayed by the relay apparatus 30 in accordance with the delay time (ms) of the image data at the start request terminal or the destination terminal.

(Relay Apparatus Selection Management Table)

The nonvolatile storage unit 5000 stores a relay apparatus selection management DB 5008 constituted by a relay apparatus selection management table. The relay apparatus selection management table manages the terminal ID of each of all the terminals 10 managed by the management system 50 and the relay apparatus ID of the relay apparatus 30 used for relaying of content data, in such a manner that the relay apparatus ID of the relay apparatus 30 used for relaying of content data is associated with the terminal ID of each of all the terminals 10 managed by the management system 50.

(State Change Management Table)

FIGS. 10 and 11 are conceptual diagrams illustrating the state change management table. The state change management table will be explained with reference to FIGS. 10 and 11.

The nonvolatile storage unit 5000 stores a state change management DB 5009 constituted by state change management tables as shown in FIGS. 10 and 11. The state change management table as shown in FIG. 10 manages change request information for requesting change of the communication state between the terminals 10, prior-to-change state information indicating the communication state before the change by the state management unit 53 explained later, and change information indicating the communication state after the change by the state management unit 53, in such a manner that the change request information for requesting change of the communication state between the terminals 10, the prior-to-change state information indicating the communication state before the change by the state management unit 53 explained later, and the change information indicating the communication state after the change by the state management unit 53 are associated with each other. The state change management table as shown in FIG. 11 manages the change request information, the terminal information for identifying the start request terminal and the destination terminal, the prior-to-change state information, and the change information, in such a manner that the change request information, the terminal information for identifying the start request terminal and the destination terminal, the prior-to-change state information, and the change information are associated with each other.

The state change management table as shown in FIG. 11 indicates that when the management system 50 receives change request information "Invite", the management system 50 changes the communication state "None" of the start request terminal before the change to "Calling", and changes the communication state "None" of the destination terminal before the change to "Ringing". The change request information includes "Invite", "Private Invite", and "Accept" as shown in FIG. 11, and "Join", "Call", and "Leave" and the like as shown in FIG. 10.

"Invite" is information included in the start request information, and is change request information accompanying the transmission of the start request information. "Accept" is change request information accompanying response to the start request information, and indicates start of communication which is permission of establishment of a session. "Join" is change request information accompanying completion of establishment of a session in response to the start request information, and indicates that the start of relay of content data is requested. "Call" is information included in the participation request information, and is the change request information accompanying the transmission of the participation request information, and indicates that the participation in the established session is requested. "Leave" is the change request information indicating that the termination of the session is requested.

(Each Functional Unit of Management System)

Subsequently, each functional unit of the management system 50 will be explained in details. In the explanation below, when each functional unit of the management system 50 is explained, the relationship with main constituent elements for achieving the functional units of the management system 50 of the constituent elements as shown in FIG. 3 will also be explained.

The transmission/reception unit 51 is realized by the network I/F 209 as shown in FIG. 3. The transmission/reception unit 51 transmits and receives various kinds of information to/from another terminal, apparatus or system via the communication network 2.

The terminal authentication unit 52 searches the terminal authentication management table (see FIG. 6) the nonvolatile storage unit 5000 by using, as the search keys, the terminal ID and the password included in the log-in request information received via the transmission/reception unit 51, and determines whether the same terminal ID and the same password are managed in the terminal authentication management table, thus authenticating the terminal.

The state management unit 53 manages the operation state and the communication state of the terminal management table (see FIG. 7). In order to manage the operation state of the terminal 10 which requests to log in (log-in request terminal), the state management unit 53 stores, to the terminal management table, the terminal ID of the log-in request terminal, the operation state of the log-in request terminal, the participation authentication information (where there is participation restriction), the reception date/time when the management system 50 receives the log-in request information, and the IP address of the log-in request terminal, in such a manner that the terminal ID of the log-in request terminal, the operation state of the log-in request terminal, the participation authentication information (where there is participation restriction), the reception date/time when the management system 50 receives the log-in request information, and the IP address of the log-in request terminal are associated with each other, and the state management unit 53 manages them.

When the user of the terminal 10 changes the power supply switch 109 from the OFF state to the ON state, the state management unit 53 updates the operation state of the terminal management table to be changed from the offline to the online on the basis of the information for turning ON the power which is transmitted from the terminal 10. When the user changes the power supply switch 109 of the terminal 10 from the ON state to the OFF state, the state management unit 53 updates the operation state of the terminal management table to be changed from the online to the offline on the basis of the information for turning OFF the power which is transmitted from the terminal 10.

When the change request information transmitted by the start request terminal or the destination terminal of the television conference is received by the transmission/reception unit 51, the state management unit 53 appropriately changes the state of at least one of the communication state and the operation state of at least one of the start request terminal and the destination terminal in the terminal management table on the basis of the change request information.

The state management unit 53 registers a PIN code generated as explained later to the participation PIN code corresponding to the terminal ID of the middle-of-conference participation terminal designated with participation in the session applied with the participation restriction by the start request terminal in the terminal management table. The state management unit 53 registers the terminal ID of the start request terminal designating the middle-of-conference participation terminal to the participation destination terminal ID corresponding to the terminal ID of the middle-of-conference participation terminal in the terminal management table.

Figure 12:
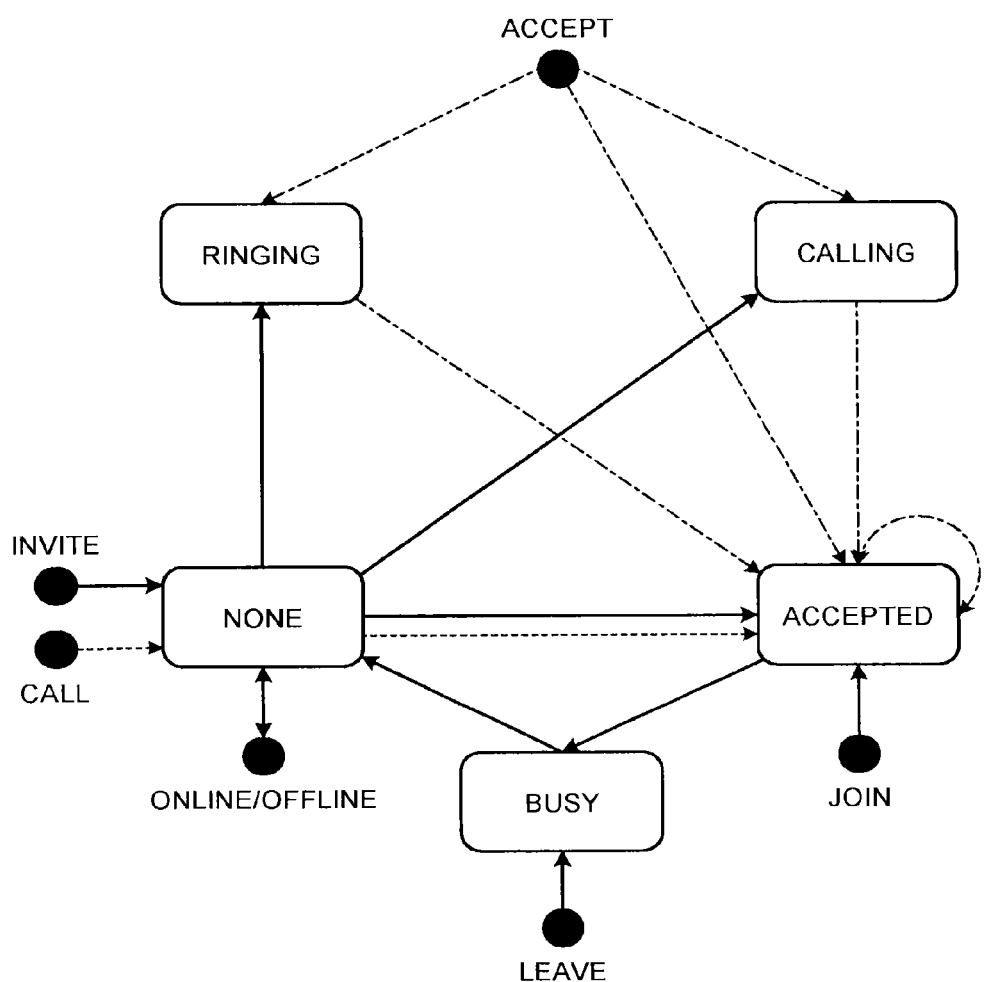
FIG. 12 is a state transition diagram illustrating communication state in a case where there is no participation restriction.
Figure 13:
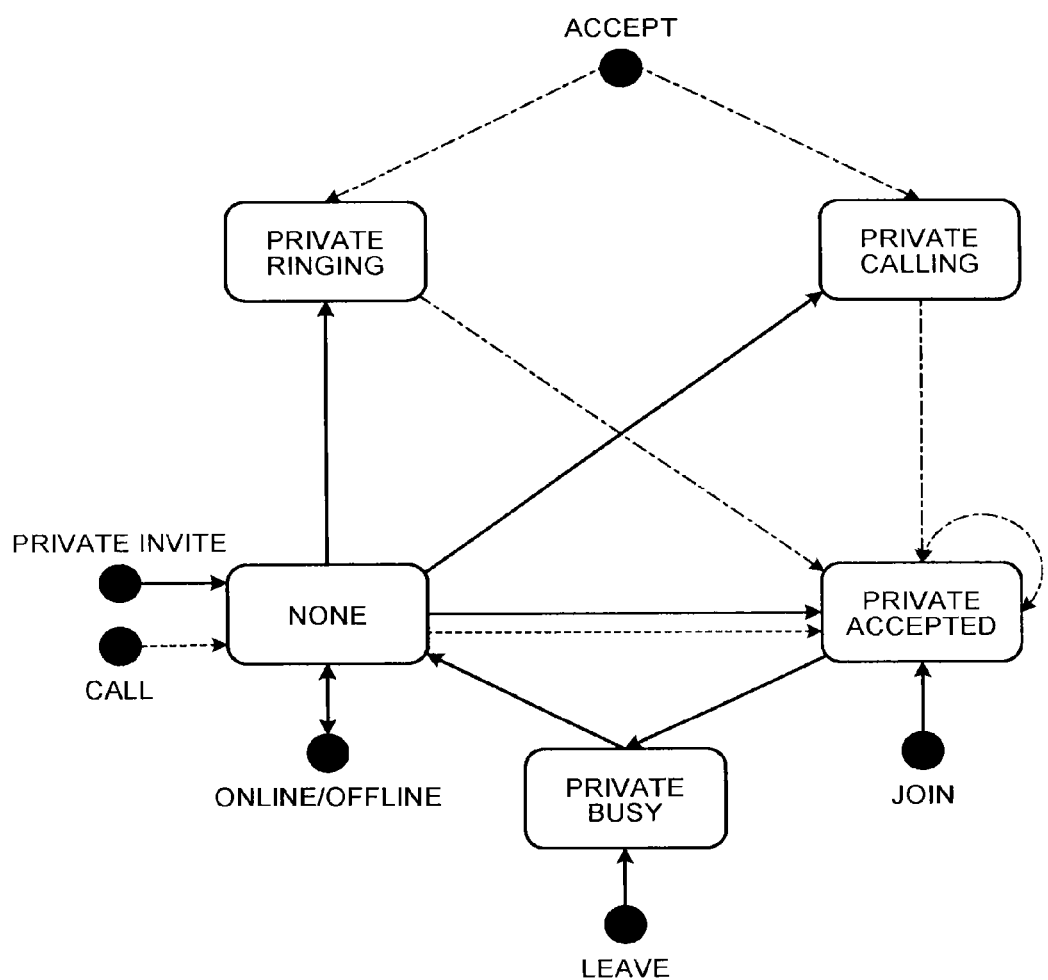
FIG. 13 is a state transition diagram illustrating communication state in a case where there is participation restriction.

FIG. 12 is a state transition diagram illustrating the communication state where there is no participation restriction. FIG. 13 is a state transition diagram illustrating the communication state where there is participation restriction. As shown in FIGS. 12 and 13, the state management unit 53 manages the state transition of the communication state. As shown in FIGS. 10 and 11, the state management unit 53 changes the communication state of the terminal 10 in accordance with limitation of change of the communication state realized by referring to the state change management table (see FIGS. 12 and 13).

For example, when the state management unit 53 receives the change request information "Accept", the state management unit 53 changes the communication state to "Accepted" if the communication state of the terminal 10 is "Ringing" or "Calling" as shown in FIG. 12. When the state management unit 53 receives the change request information "Accept", the state management unit 53 maintains the communication state "Accepted" if the communication state of the terminal 10 is "Accepted" as shown in FIG. 12.

For example, when the state management unit 53 receives the change request information "Accept", the state management unit 53 changes the communication state to "Private Accepted" if the communication state of the terminal 10 is "Private Ringing" or "Private Calling" as shown in FIG. 13. When the state management unit 53 receives the change request information "Accept", the state management unit 53 maintains the communication state "Private Accepted" if the communication state of the terminal 10 is "Private Accepted" as shown in FIG. 13.

In the present embodiment, for example, the state change management table (see FIGS. 10 and 11) is used in order to allow the state management unit 53 to change the communication state, but the embodiments are not limited thereto. For example, the definition can be set by the program for the management system so that the state management unit 53 can change the communication state in accordance with the limitation of transition of the communication state indicated in the state transition diagrams of FIGS. 12 and 13.

The terminal extraction unit 54 searches the destination list management table (see FIG. 8) by using, as the search key, the terminal ID of the terminal which is the processing target such as the terminal 10 which made log-in request, and reads the terminal ID of the destination terminal candidate capable of communicating with the target terminal, which means capable of establishing the session. More specifically, the terminal extraction unit 54 reads the terminal ID of the destination terminal candidate associated with the terminal ID of the start request terminal matching the terminal ID of the target terminal in the destination list management table.

The terminal extraction unit 54 searches destination list management table by using the terminal ID of the target terminal as the key, and also reads the terminal ID of another terminal 10 registering the terminal ID of the target terminal as the destination terminal candidate. More specifically, the terminal extraction unit 54 reads the terminal ID of the start request terminal associated with the terminal ID of the destination terminal candidate matching the terminal ID of the target terminal in the destination list management table.

The terminal state obtaining unit 55 searches the terminal management table (see FIG. 7) by using the terminal ID as the search key, and reads the operation state and the communication state for each terminal ID. Therefore, the terminal state obtaining unit 55 can obtain the operation state and the communication state of the destination terminal candidate capable of communicating with the terminal which made log-in request. The terminal state obtaining unit 55 searches the terminal management table, and obtains the operation state of the terminal which made log-in request.

The relay apparatus selection unit 56 performs processing to select one of multiple relay apparatuses 30. More specifically, the relay apparatus selection unit 56 generates a session ID for identifying a session in which content data are transmitted between terminals 10. The relay apparatus selection unit 56 searches the relay apparatus selection management table of the relay apparatus selection management DB 5008 on the basis of the terminal ID of the destination terminal and the terminal ID of the start request terminal included in the start request information transmitted from the start request terminal, thus extracting each of the corresponding relay apparatus IDs. The relay apparatus selection unit 56 selects the relay apparatus ID of the relay apparatus 30 of which operation state is "online" from among the relay apparatuses 30 managed by the relay apparatus management table (see FIG. 5), thus selecting the relay apparatus 30.

The session management unit 57 stores, to the session management table (see FIG. 9), the session ID generated by the relay apparatus selection unit 56, the terminal ID of the start request terminal, and the terminal ID of the destination terminal in such a manner that the session ID generated by the relay apparatus selection unit 56, the terminal ID of the start request terminal, and the terminal ID of the destination terminal are associated with each other, and the session management unit 57 manages them. For each session ID, the session management unit 57 stores and manages, in the session management table, the relay apparatus ID of the single relay apparatus 30 ultimately selected.

Further, the session management unit 57 searches the session management table by using, as the search key, the terminal ID of the participating terminal already participating in the session which is the target of the participation request included in the participation request information, and extracts the session ID of the session which is the target of the participation request. More specifically, the session management unit 57 searches the session management table to find the terminal ID of the destination terminal or the terminal ID of the start request terminal matching the terminal ID of the participating terminal. Then, the session management unit 57 extracts the session ID associated with the matching terminal ID.

The quality determination unit 58 searches the quality management table of the quality management DB 5007 by using the delay time as the search key, and extracts the image quality of the corresponding image data, thus determining the image quality of the image data relayed by the relay apparatus 30.

The memory/read-out processing unit 59 is executed by the HDD 205 as shown in FIG. 3, and performs processing to store various kinds of data to the nonvolatile storage unit 5000, and read various kinds of data stored in the nonvolatile storage unit 5000. Further, the memory/read-out processing unit 59 also performs processing to store various kinds of data to the volatile storage unit 5100, and read various kinds of data stored in the volatile storage unit 5100.

The delay time management unit 60 searches the terminal management table (see FIG. 7) by using the IP address of the destination terminal as the search key, and extracts the corresponding terminal ID. Further, the delay time management unit 60 stores the delay time indicated by the delay information into a field portion of a delay time in a record including the extracted terminal ID in the session management table (see FIG. 9), and manages the delay time stored there.

The change request information determination unit 61 refers to the change request information, and determines whether the change request information is particular change request information or not. In this case, the particular change request information is "Invite", "Private Invite", and "Accept". More specifically, the particular change request information is change request information stored in the state change management table as shown in FIG. 11.

The destination determination unit 62 refers to the destination list management table (see FIG. 8), and determines whether or not the terminal ID of the participation request terminal requesting participation is included in the terminal ID of the destination terminal participating in a content data session sed (explained later) extracted by the terminal extraction unit 54.

When the transmission/reception unit 51 receives the participation request information for participating in the established session from the predetermined terminal (participation request terminal), the participation determination unit 63 refers to the participation restriction information corresponding to the established session, and determines whether the participation request terminal is permitted to participate in the established session. More specifically, when the participation request information is information for requesting participation in the established session established by the start request information designating presence of the participation restriction, the participation determination unit 63 compares the participation authentication information generated as described later and the participation authentication information received from the participation request terminal. Then, when the participation authentication information generated as described later and the participation authentication information received from the participation request terminal do not match each other, the participation determination unit 63 does not permit the participation request terminal to participate in the established session. On the other hand, when the participation authentication information generated as described later and the participation authentication information received from the participation request terminal match each other, the participation determination unit 63 permits the participation request terminal to participate in the established session. When the participation request information is information for requesting participating in the established session established by the start request information designating absence of the participation restriction, the participation determination unit 63 also permits the participation request terminal to participate in the established session.

When the transmission/reception unit 51 receives the start request information from the start request terminal, and the start request information is information designating presence of the participation restriction, the participation authentication information generation unit 64 generates the participation authentication information (PIN code).

Processing/Operation of the Present Embodiment

The processing/operation performed by the transmission system 1 according to the present embodiment will be explained with reference to FIGS. 14 to 33.

Figure 14:
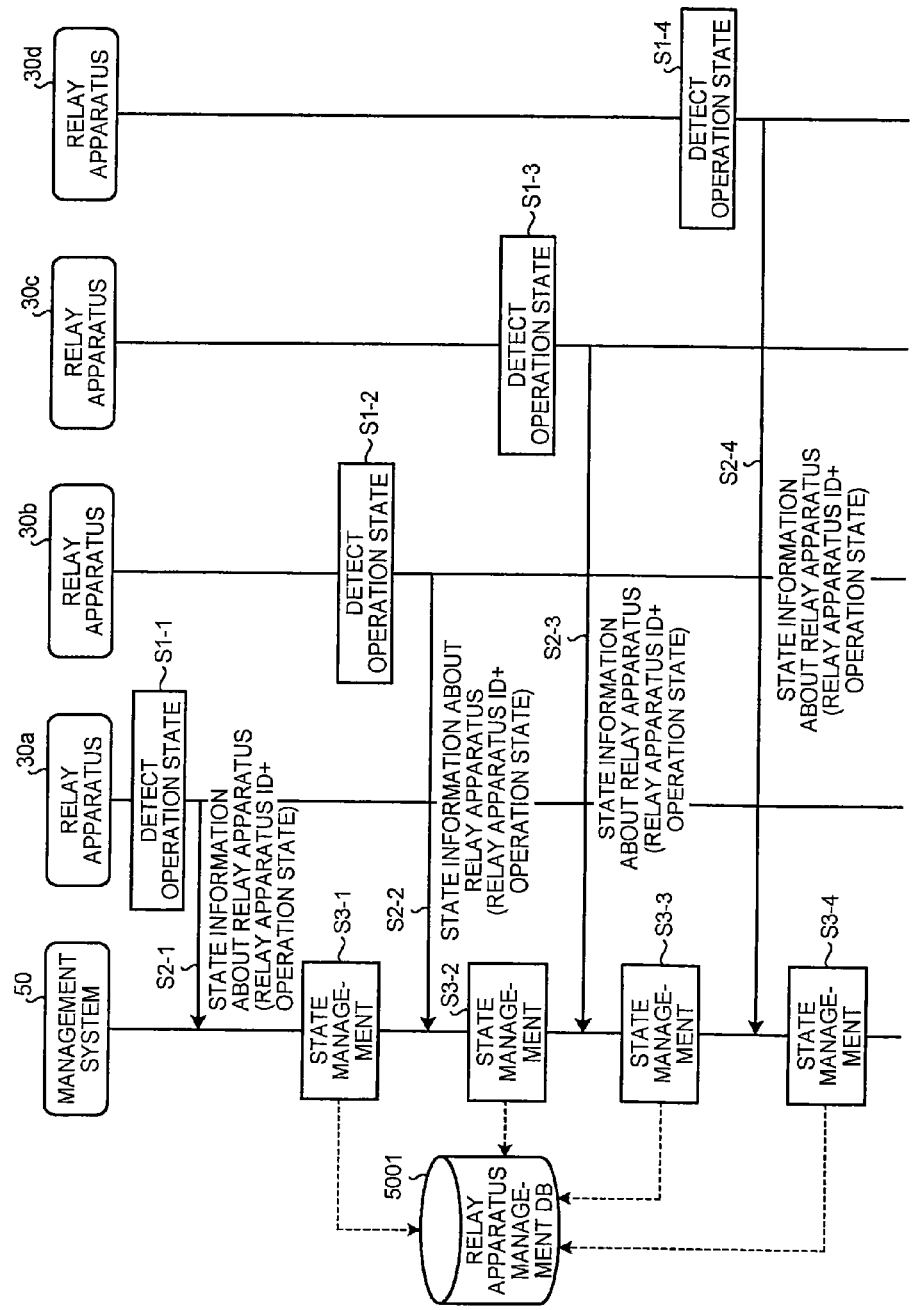
FIG. 14 is a sequence diagram illustrating an example of processing for managing state information indicating operation state of each relay apparatus.

Processing for Managing State Information Indicating the State of Relay Apparatus FIG. 14 is a sequence diagram illustrating an example of processing for managing the state information indicating the operation state of each relay apparatus. Processing for managing the state information indicating the state of each relay apparatus 30 transmitted from the relay apparatus 30 to the management system 50 will be explained with reference to FIG. 14.

In each relay apparatus 30, the state detection unit 32 as shown in FIG. 4 detects, with a regular interval of time, the operation state of the relay apparatus 30 which is the apparatus in question (step S1-1 to S1-4). Then, in order to cause the management system 50 to manage the operation state of each relay apparatus 30 in real time, the transmission/reception unit 31 of each relay apparatus 30 transmits the state information via the communication network 2 to the management system 50 with a regular interval of time (step S2-1 to S2-4). Each of these pieces of state information includes the relay apparatus ID given to each relay apparatus 30 and the operation state detected by the state detection unit 32 of the relay apparatus 30 related to the relay apparatus ID. In the present embodiment, as shown in FIG. 5, the relay apparatuses 30a, 30b, 30d operate normally and is in "online" state. On the other hand, the relay apparatus 30c is operating, but has some kind of problem in the program for executing the relay operation of the relay apparatus 30c, and is therefore in the "offline" state.

Subsequently, in the management system 50, the transmission/reception unit 51 receives the state information transmitted from each relay apparatus 30, and stores the state information for each pieces of relay apparatus IDs to the relay apparatus management table (see FIG. 5) of the nonvolatile storage unit 5000 via the memory/read-out processing unit 59 (step S3-1 to S3-4). Therefore, as shown in FIG. 5, the relay apparatus management table stores the operation state of any one of "online", "offline", or "malfunction" for each relay apparatus ID, and manages the operation state. At this occasion, the reception date/time when the management system 50 receives the state information is also stored for each relay apparatus ID. When the relay apparatus 30 does not transmit the state information, the field portion of the operation state and the field portion of the reception date/time in each record of the relay apparatus management table are vacant, or the field portion of the operation state and the field portion of the reception date/time in each record of the relay apparatus management table indicate the operation state and the reception date/time, respectively, received previously.

Figure 15:
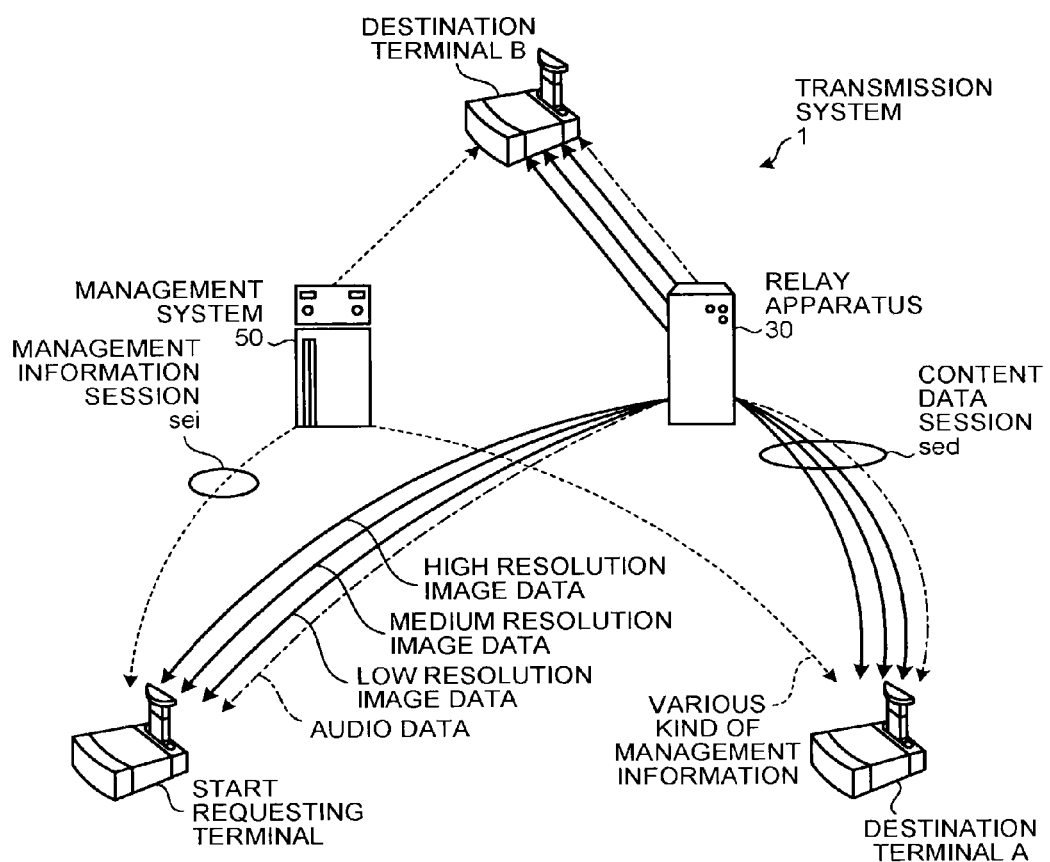
FIG. 15 is a conceptual diagram illustrating the state of transmission/reception of content data and various kinds of management information by the transmission system.

State of Transmission/Reception of Content Data and Various Kinds of Management Information FIG. 15 is a conceptual diagram illustrating the state of transmission/reception of content data and various kinds of management information in the transmission system. The concept showing the state of transmission/reception of content data and various kinds of management information in the transmission system 1 will be explained with reference to FIG. 15.

As shown in FIG. 15, in the transmission system 1, a management information session sei for transmitting and receiving various kinds of management information is established via the management system 50 between the start request terminal and the destination terminal A and between the start request terminal and the destination terminal B. Four sessions are established via the relay apparatus 30 between the start request terminal and the destination terminal A and between the start request terminal and the destination terminal B in order to transmit and receive four data including high resolution image data, medium resolution image data, low resolution image data, and audio data. In this case, these four sessions are collectively indicated as content data session sed. More specifically, the content data session sed is a session used for the television conference.

It should be noted that the concept of the session is merely an example. The session of image data need not be classified into each resolution. For example, the number of sessions may be three or less, or may be five or more.

Figure 16:
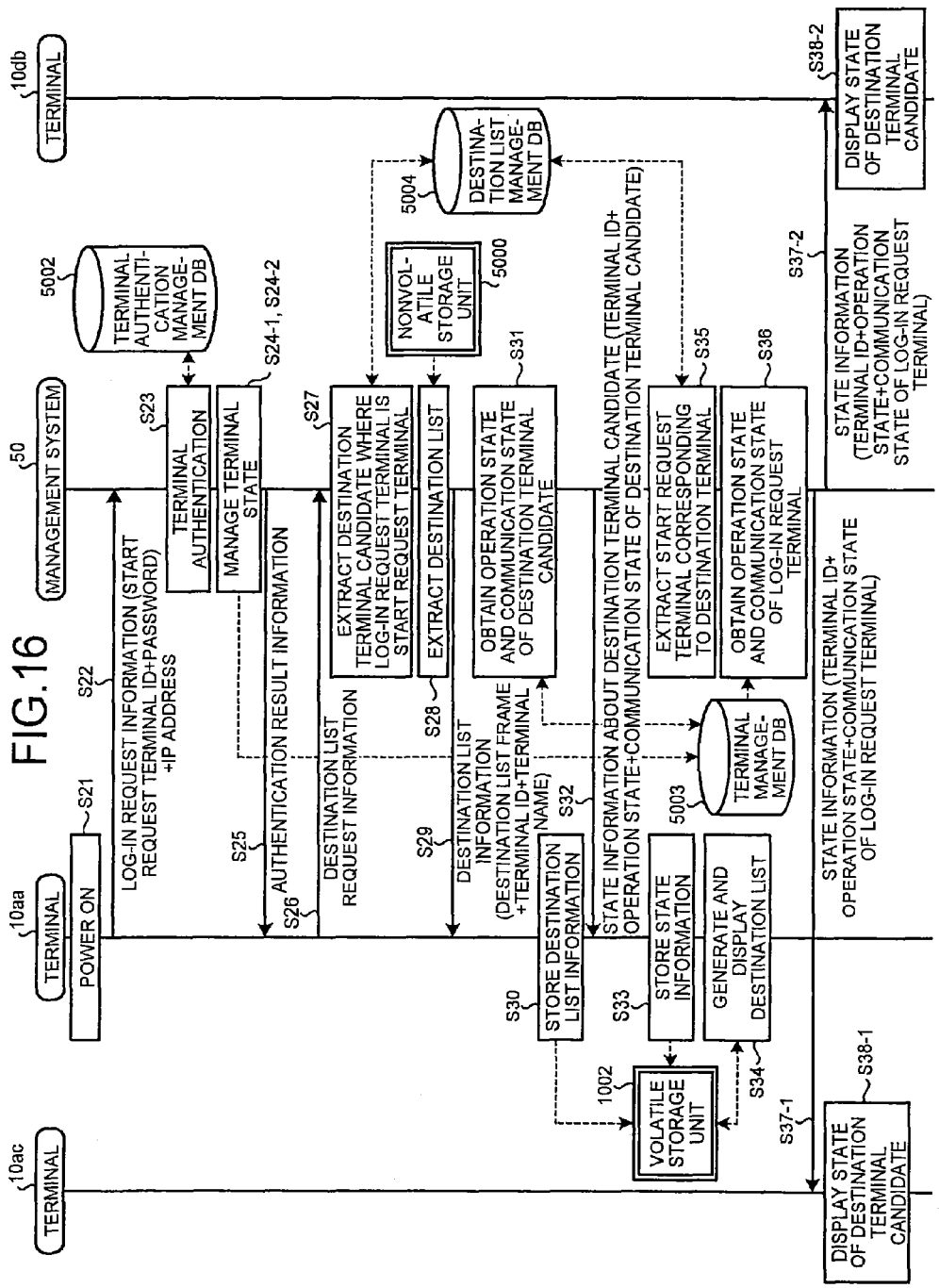
FIG. 16 is a sequence diagram illustrating an example of processing preparation stage for starting communication between transmission terminals.

Transmission/Reception Processing of Each Piece of Management Information in Preparation Stage Before Terminal Starts Communication FIG. 16 is a sequence diagram illustrating an example of processing in preparation stage for starting communication between transmission terminals. FIG. 17 is a diagram illustrating an example of display of a destination list. The transmission/reception processing of each of the pieces of management information in the previous stage before the terminal 10aa starts communication will be explained with reference to FIGS. 16 and 17. It should be noted that FIG. 16 shows processing in which all of various kinds of management information are transmitted and received by the management information session sei.

First, when the user of the terminal 10aa turns ON the power supply switch 109 as shown in FIG. 2, the operation input reception unit 12 as shown in FIG. 4 receives the power ON, and turns on the terminal 10aa (step S21). Then, in response to the power ON of the terminal 10aa, the log-in request unit 13 transmits log-in request information indicating log-in request and the IP address of the terminal 10aa from a transmission/reception unit 11 via the communication network 2 to the management system 50 (step S22). This log-in request information includes the terminal ID and the password for identifying the terminal 10aa which is the terminal in question serving as the request source. The terminal ID and the password are data which are read from the nonvolatile storage unit 1000 by the memory/read-out processing unit 19 and transmitted to the transmission/reception unit 11. When the log-in request information is transmitted from the terminal 10aa to the management system 50, the management system 50 which is the reception side can recognize the IP address of the terminal 10aa which is the transmission side.

Subsequently, the terminal authentication unit 52 of the management system 50 searches the terminal authentication management table (see FIG. 6) by using, as the search key, the terminal ID and the password included in the log-in request information received via the transmission/reception unit 51, and determines whether the same terminal ID and the same password are managed in the terminal authentication management table, thus performing the terminal authentication (step S23).

When the terminal authentication unit 52 determines the log-in request sent by a terminal 10 having legitimate usage permission, the state management unit 53 stores, to the terminal management table (see FIG. 7), the reception date/time when the log-in request information is received and the IP address of the terminal 10aa for each record indicated by the terminal ID and the terminal name of the terminal 10aa, in such a manner that the reception date/time when the log-in request information is received and the IP address of the terminal 10aa are associated with each other (step S24-1). As a result, the terminal management table as shown in FIG. 7 manages the terminal ID "10aa" of the terminal 10aa, the reception date/time "2009.11.10.13:40", and the terminal IP address "1.2.1.3" in such a manner that the reception date/time "2009.11.10.13:40" and the terminal IP address "1.2.1.3" are associated with the terminal ID "10aa" of the terminal 10aa.

Subsequently, the state management unit 53 sets the operation state "online" and the communication state "None" of the terminal 10aa, and stores, in the terminal management table, the operation state and the communication state for each record indicated by the terminal ID and the terminal name of the terminal 10aa, in such a manner that the operation state and the communication state are associated with each other (step S24-2). As a result, the terminal management table as shown in FIG. 7 manages the terminal ID "10aa" of the terminal 10aa, the operation state "online", and the communication state "None" in such a manner that the operation state "online" and the communication state "None" are associated with the terminal ID "10aa" of the terminal 10aa.

Then, the transmission/reception unit 51 of the management system 50 transmits, via the communication network 2, the authentication result information indicating the result of the terminal authentication obtained from the terminal authentication unit 52 to the log-in request terminal (the terminal 10aa) which transmitted the log-in request information (step S25). In the present embodiment, a case where the terminal authentication unit 52 performs the terminal authentication to determine the terminal having the legitimate usage permission will be hereinafter explained.

When the terminal 10aa receives the authentication result information indicating the result of the terminal authentication indicating the terminal 10aa is the terminal having the legitimate usage permission, the transmission/reception unit 11 transmits, via the communication network 2 to the management system 50, the destination list request information indicating that the destination list is requested (step S26). Accordingly, the transmission/reception unit 51 of the management system 50 receives the destination list request information.

Subsequently, the terminal extraction unit 54 searches the destination list management table (see FIG. 8) by using, as the search key, the terminal ID of the log-in request terminal (the terminal 10aa), and extracts the terminal ID of the destination terminal candidate with which the log-in request terminal can communicate as the start request terminal, i.e., with which the log-in request terminal can establish the session (step S27). The terminal extraction unit 54 searches the terminal management table (see FIG. 7) by using the extracted terminal ID as the search key, and extracts the terminal name corresponding to the terminal ID, i.e., the terminal name of the destination terminal candidate. In this case, the terminal. IDs ("10ab", "10ac", "10ad", "10db") of the destination terminal candidates (the terminals 10ab, 10ac, 10ad, 10db) corresponding to the terminal ID "10aa" of the start request terminal (the terminal 10aa) and the terminal names corresponding thereto ("the terminal AB in Tokyo Office, Japan", "the terminal AC in Tokyo Office, Japan", "the terminal AD in Tokyo Office, Japan", "the terminal DB in Washington Office, Japan") are extracted.

Subsequently, the transmission/reception unit 51 of the management system 50 reads data of a destination list frame (data in the portion of the destination list frame 1100-1 as shown in FIG. 17) via the memory/read-out processing unit 59 from the nonvolatile storage unit 5000 (step S28). Then, the transmission/reception unit 51 transmits the destination list frame and the destination list information including the terminal ID and the terminal name of the destination terminal candidate extracted by the terminal extraction unit 54 to the start request terminal (the terminal 10aa) (step S29). Accordingly, in the start request terminal (the terminal 10aa), the transmission/reception unit 11 receives the destination list information, and the memory/read-out processing unit 19 stores the destination list information to the volatile storage unit 1002 (step S30).

As described above, in the present embodiment, each terminal 10 does not manage the destination list information. Instead, the management system 50 centrally manages the destination list information of all the terminals 10. Therefore, even when the transmission system 1 includes a new terminal 10, or an already included terminal 10 is excluded, or, e.g., the appearance of the destination list frame is changed, the management system 50 centrally takes care of the management, and therefore, this can save each terminal 10 from trouble of changing the destination list information.

The terminal state obtaining unit 55 of the management system 50 searches the terminal management table (see FIG. 7) by using, as the search key, the terminal IDs of the destination terminal candidates ("10ab", "10ac", "10ad", "10db") extracted by the terminal extraction unit 54. Then, the terminal state obtaining unit 55 reads the corresponding operation state and the corresponding communication state for each of the terminal IDs of the destination terminal candidates, and obtains the operation state and the communication state of each of the destination terminal candidates (the terminals 10ab, 10ac, 10ad, 10db) (step S31).

Subsequently, the transmission/reception unit 51 transmits the state information including the terminal ID which is the search key used in step S31 and the operation state and the communication state of the corresponding destination terminal candidate to the log-in request terminal via the communication network 2 (step S32). More specifically, the transmission/reception unit 51 transmits the state information including the terminal ID "10ab" serving as the search key and the operation state "offline" of the destination terminal candidate (the terminal 10ab) to the log-in request terminal (the terminal 10aa). When the operation state is "offline", the state information does not include the communication state. The transmission/reception unit 51 transmits, to the log-in request terminal (the terminal 10aa), the pieces of state information for all the destination terminal candidates such as the state information including the terminal ID "10ac", the operation state "online" of the destination terminal candidate (the terminal 10ac), and the communication state "None".

Subsequently, the memory/read-out processing unit 19 of the log-in request terminal (the terminal 10aa) stores, in order, the state information received from the management system 50 to the volatile storage unit 1002 (step S33). Therefore, the log-in request terminal (the terminal 10aa) receives the state information about the destination terminal candidate, thus capable of obtaining the operation state and the communication state, at the present moment, of each of the destination terminal candidates capable of communicating with the log-in request terminal serving as the start request terminal.

Subsequently, the destination list generation unit 20 of the log-in request terminal (the terminal 10aa) generates a destination list reflecting the operation state and the communication state of the destination terminal candidate on the basis of the state information about the destination candidate terminal and the destination list information stored in the volatile storage unit 1002. Then, the display control unit 16 displays the destination list on the display 120aa as shown in FIG. 1 with predetermined timing (step S34).

As shown in FIG. 17, the destination list displayed on the display 120aa includes the terminal ID 1100-2 of the destination terminal candidate, the terminal name 1100-3, the icons 1100-4a to 1100-4c reflecting the state information, and the like, in the destination list frame 1100-1. The icons include the offline icon 1100-4a indicating offline and that communication cannot be performed, the communicable manner icon 1100-4b indicating online and communicable, and the communicating icon 1100-4c indicating online and communicating.

When the operation state of the destination terminal candidate is "online" and the communication state is "None", the destination list generation unit 20 allocates the communicable manner icon 1100-4b to the destination terminal candidate. When the operation state of the destination terminal candidate is "online", and the communication state is other than "None", the destination list generation unit 20 allocates the communicating icon 1100-4c to the destination terminal candidate. When the operation state of the destination terminal candidate is "offline", the destination list generation unit 20 allocates the offline icon 1100-4a to the destination terminal candidate.

On the other hand, the terminal extraction unit 54 of the management system 50 searches the destination list management table (see FIG. 8) by using the terminal ID "10aa" of the log-in request terminal (the terminal 10aa) as the search key, and extracts the terminal IDs of other terminals 10 (start request terminal) registering the terminal ID "10aa" of the log-in request terminal as the destination terminal candidate (step S35). In the destination list management table as shown in FIG. 8, the terminal IDs of the other terminals 10 extracted are "10ab", "10ac", and "10db".

Subsequently, the terminal state obtaining unit 55 of the management system 50 searches the terminal management table (see FIG. 7) by using, as the search key, the terminal ID "10aa" of the log-in request terminal (the terminal 10aa), and obtains the operation state and the communication state of the log-in request terminal (step S36).

Then, the transmission/reception unit 51 transmits the state information including the terminal ID "10aa" of the log-in request terminal (the terminal 10aa), the operation state "online", and the communication state "None" obtained by the terminal state obtaining unit 55 in step S36 to the terminal 10 of which operation state is "online" in the terminal management table (in this case, the operation states of the terminals 10ac, 10db are considered to be "online") among the terminals 10ab, 10ac, 10db having the terminal IDs ("10ab", "10ac", and "10db") extracted by the terminal extraction unit 54 in step S35 (step S37-1 and S37-2). Subsequently, each of the terminal 10ac and the terminal 10db displays the state information about the destination terminal candidates on the display 120 (step S38-1 and S38-2). When the transmission/reception unit 51 transmits the state information to the terminals 10ac, 10db, the transmission/reception unit 51 refers to the IP address managed in the terminal management table (see FIG. 7) on the basis of each terminal ID ("10ac", "10db"). Therefore, the transmission/reception unit 51 can transmit the terminal ID "10aa" of the log-in request terminal, the operation state "online", and the communication state "None" to each of the terminals (the terminals 10ac, 10db) capable of communicating with the log-in request terminal as the destination.

Like step S21, in another terminal 10, when the user turns on the power supply switch 109 as shown in FIG. 2, an operation input reception unit 12 as shown in FIG. 4 receives the power ON, and performs the same processing as the processing in steps S22 to S38-1, S38-2 explained above.

Processing where Terminal Requests Start of Communication with Another Terminal

Figure 18:
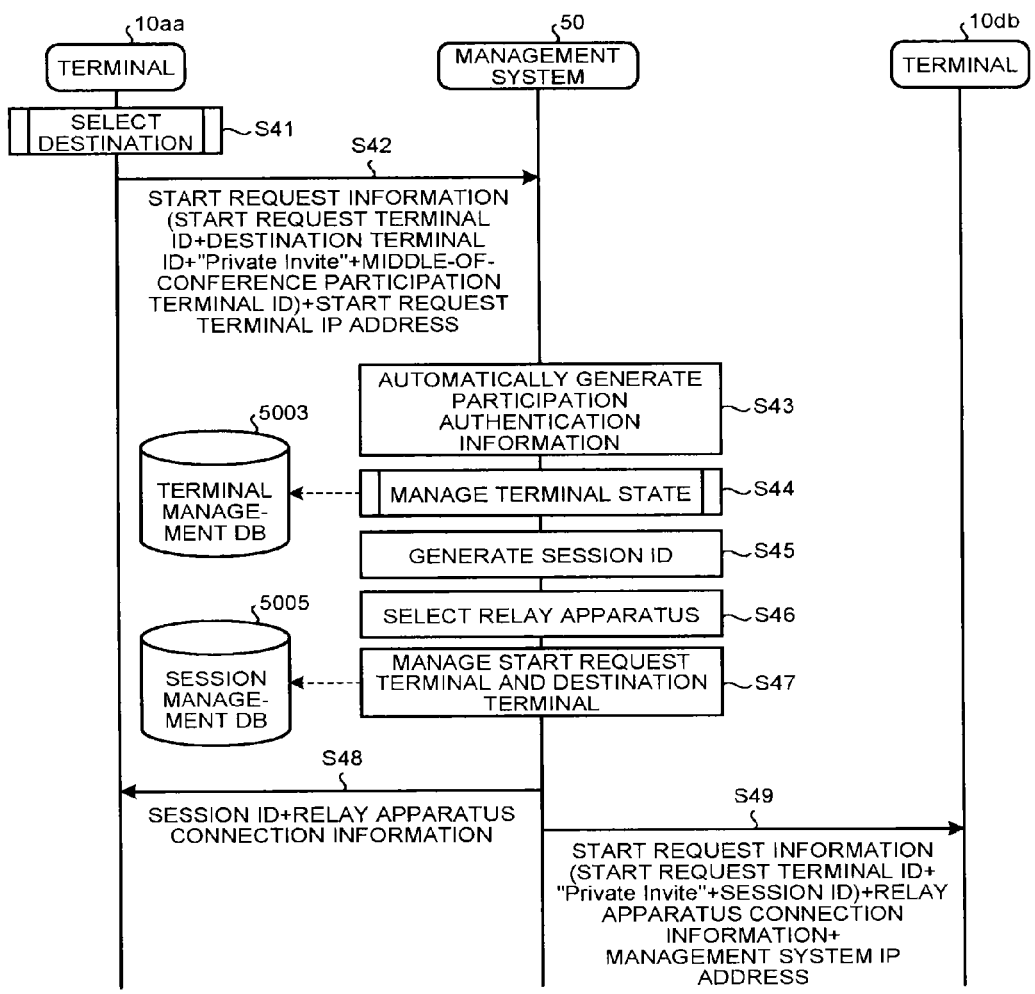
FIG. 18 is a sequence diagram illustrating an example of processing for requesting start of communication.
Figure 19:
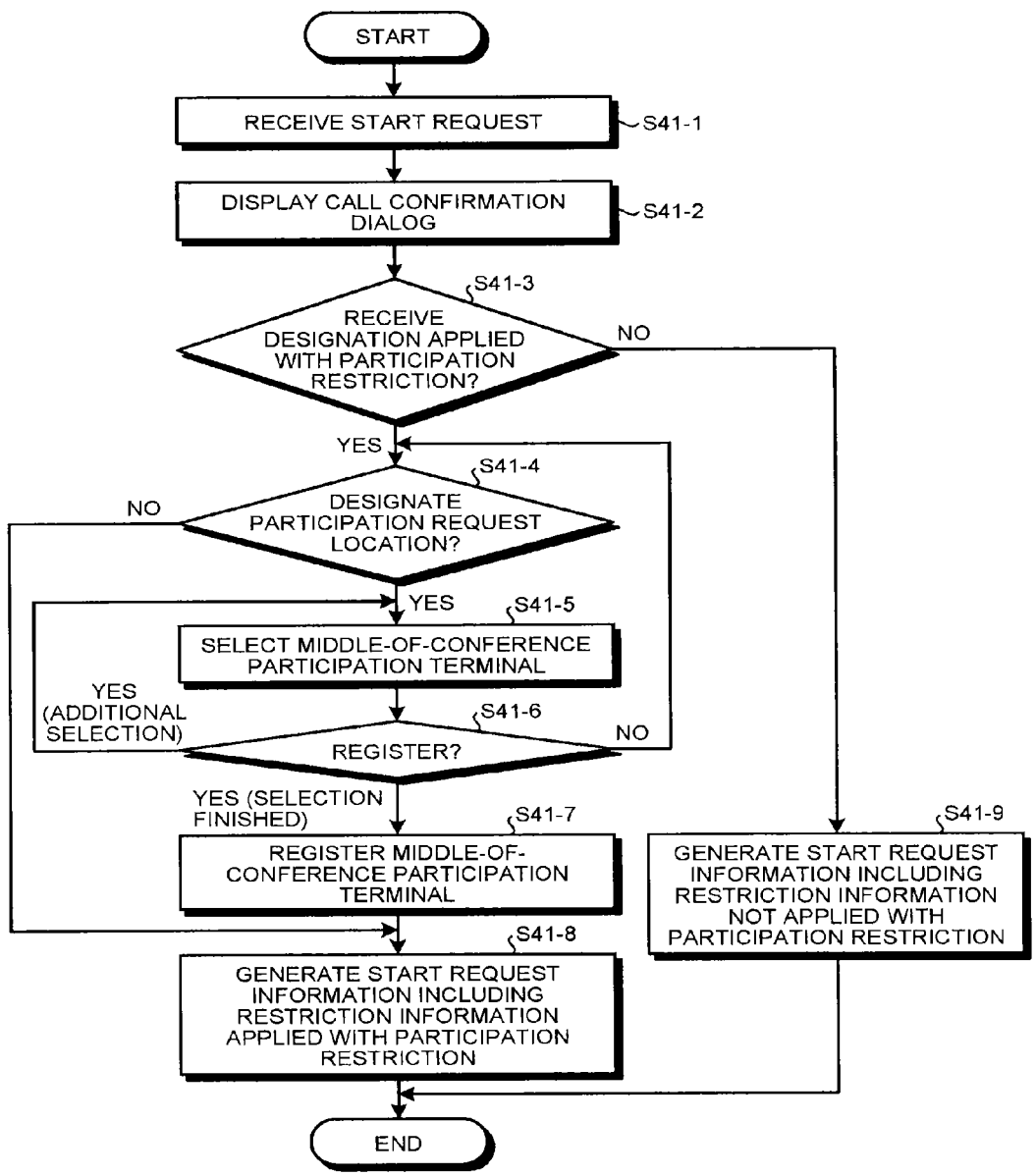
FIG. 19 is a flow diagram illustrating an example of detailed flow of a start request terminal of destination selection processing.
Figure 20:
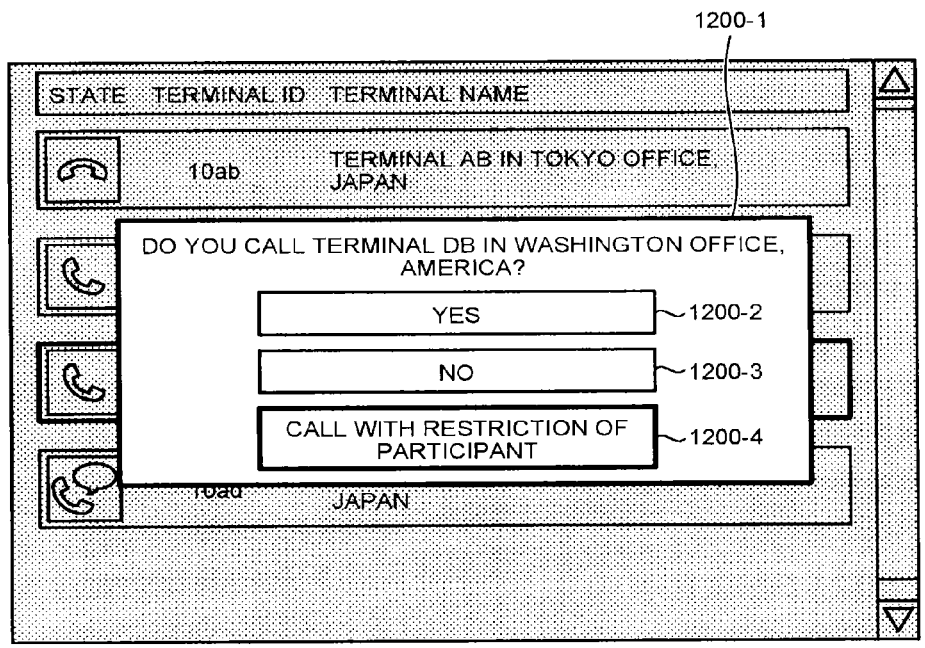
FIG. 20 is a diagram illustrating an example of display of a call confirmation dialog.
Figure 21:
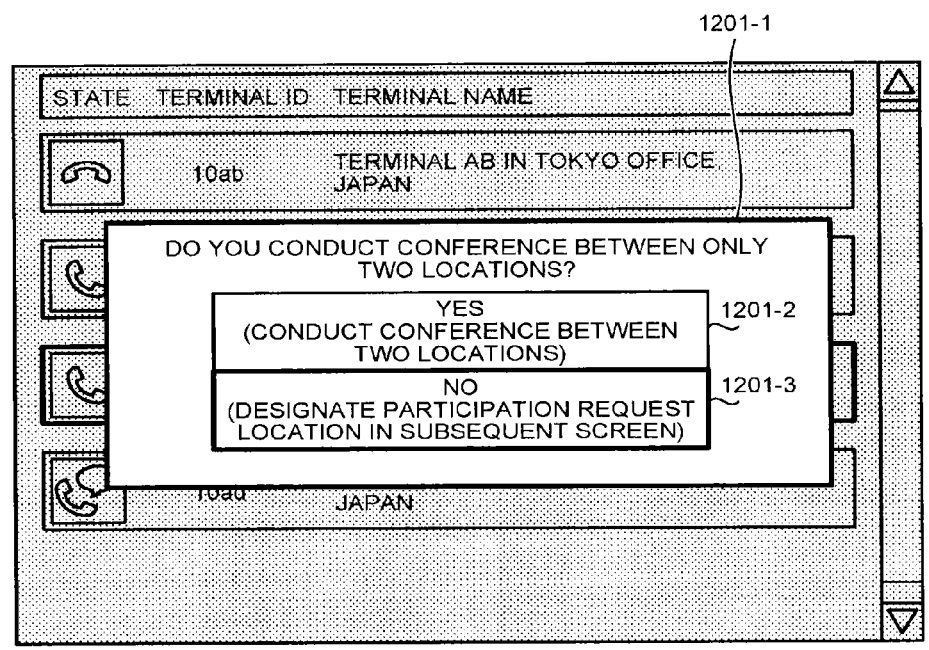
FIG. 21 is a diagram illustrating an example of display of a middle-of-conference participation designation confirmation dialog.
Figure 22:
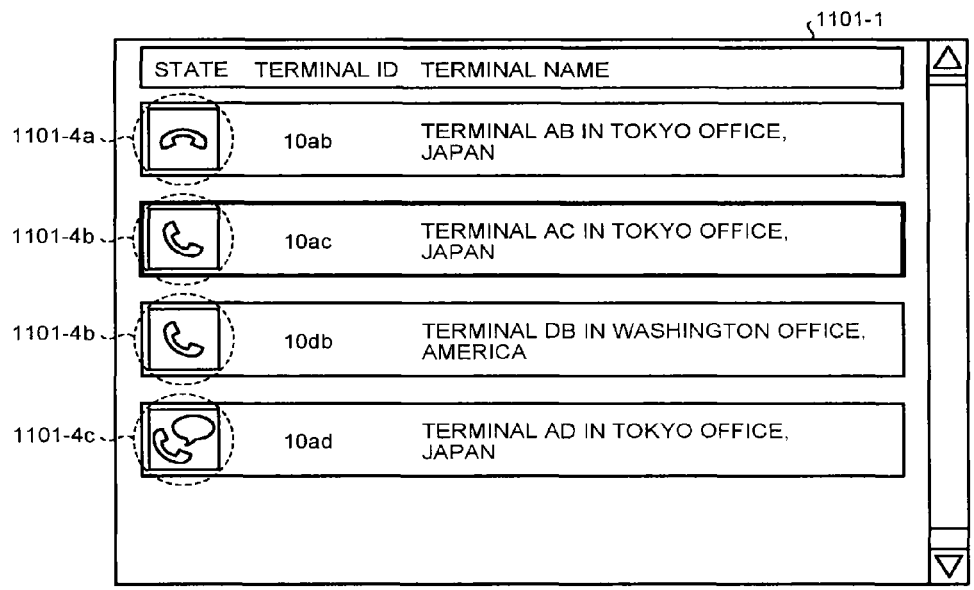
FIG. 22 is a diagram illustrating an example of display of a middle-of-conference participation designation list.
Figure 23:
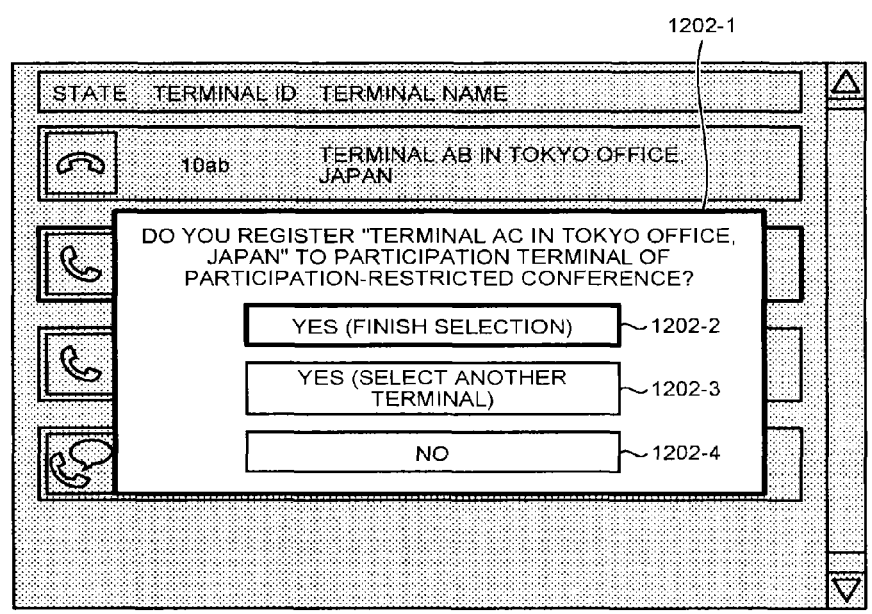
FIG. 23 is a diagram illustrating an example of display of a middle-of-conference participation terminal confirmation dialog.
Figure 24:
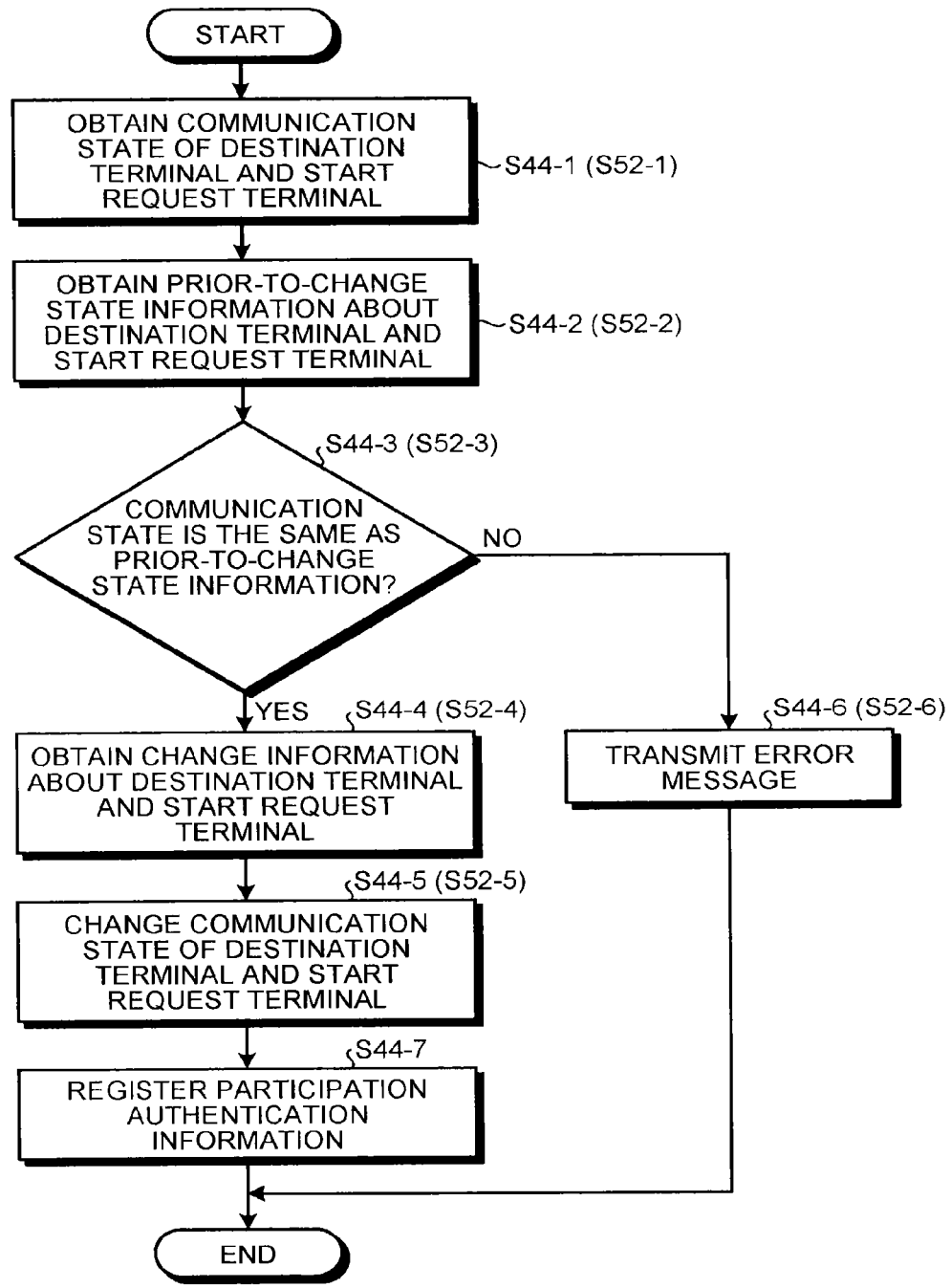
FIG. 24 is a processing flow diagram illustrating an example of processing for changing communication states of a start request terminal and a destination terminal.

FIG. 18 is a sequence diagram illustrating an example of processing for requesting start of communication. FIG. 19 is a flow diagram illustrating an example of detailed processing performed by a start request terminal in the destination selection processing. FIG. 20 is a figure illustrating an example of display of a call confirmation dialog. FIG. 21 is a figure illustrating an example of display of a middle-of-conference participation designation confirmation dialog. FIG. 22 is a figure illustrating an example of display of a middle-of-conference participation designation list. FIG. 23 is a figure illustrating an example of display of a middle-of-conference participation terminal confirmation dialog. FIG. 24 is a processing flow diagram illustrating an example of processing for changing the communication states of the start request terminal and the destination terminal. Processing where the terminal 10 requests starting of communication with another terminal 10 will be explained with reference to FIGS. 18 to 24. It should be noted that FIG. 18 shows processing in which all of various kinds of management information are transmitted and received by the management information session sei.

FIG. 18 shows an example where the terminal 10aa permitted to log-in in FIG. 16 transmits the start request information, and more specifically shows an example where the terminal 10aa operates as the start request terminal. The terminal 10aa serving as the start request terminal can communicate with at least one of the terminals of which operation state is "online" and of which communication state is "None", chosen from among the destination terminal candidates, on the basis of the state information about the destination terminal candidate received in step S32 of FIG. 16.

In the present embodiment, the start request terminal (the terminal 10aa) can communicate with the terminal 10db of which operation state is "online" and of which communication state is "None", chosen from among the destination terminal candidates, on the basis of the state information received in step S32 of FIG. 16. In the explanation below, the user of the start request terminal (the terminal 10aa) selects starting communication with the destination terminal (the terminal 10db).

Before the processing as shown in FIG. 18 is started, the display 120aa of the terminal 10aa serving as the start request terminal is considered to display the destination list as shown in FIG. 17. Then, the user of the start request terminal can select a desired party with which communication is performed from the destination list. More specifically, the user of the start request terminal can select the party with which a session is established.

In the processing as shown in FIG. 18, first, when the user of the start request terminal presses the operation button 108 as shown in FIG. 2 to select the destination terminal (the terminal 10db), the destination selection processing is performed (step S41). This destination selection processing will be explained with reference to FIG. 19.

When the user presses down the operation button 108 to select the destination terminal (the terminal 10db) in the destination list as explained above, the operation input reception unit 12 as shown in FIG. 4 receives a request for starting communication designating the destination terminal (the terminal 10db), i.e., receives a start request of the session (step S41-1). Subsequently, the display control unit 16 superimposes the call confirmation dialog 1200-1 as shown in FIG. 20 on the destination list and displays the destination list having the call confirmation dialog 1200-1 superimposed thereon (step S41-2).

The call confirmation dialog 1200-1 is a user interface for confirming the start request received in step S41-1 and designating whether to restrict the terminal 10 participating in the session related to the start request. The call confirmation dialog 1200-1 includes a "Yes" button 1200-2 for affirming transmission of the start request information, a "No" button 1200-3 for canceling transmission of the start request information, and a restriction call button 1200-4 for designating a session applied with participation restriction.

In this case, when the "Yes" button 1200-2 is pressed down, the operation input reception unit 12 receives the designation not applied with the participation restriction. On the other hand, when the restriction call button 1200-4 is selected, the operation input reception unit 12 receives the designation applied with the participation restriction.

When the operation input reception unit 12 receives the designation applied with the participation restriction (step S41-3: Yes), the display control unit 16 displays the middle-of-conference participation designation confirmation dialog 1201-1 as shown in FIG. 21 on the display 120.

The middle-of-conference participation designation confirmation dialog 1201-1 is an interface for selecting whether to designate not only the destination terminal designated in step S41-1 (the terminal 10db in this case) but also the terminal which demands middle-of-conference participation in the session to be established (middle-of-conference participation terminal). The middle-of-conference participation designation confirmation dialog 1201-1 includes a "Yes" button 1201-2 for selecting communication with only the destination terminal designated in step S41-1 and a "No" button 1201-3 for selecting designation of not only the destination terminal but also the middle-of-conference participation terminal participating in the established session.

In this case, when the "Yes" button 1201-2 is pressed down, the operation input reception unit 12 receives selection of communication with only the destination terminal. On the other hand, when the "No" button 1201-3 is pressed down, the operation input reception unit 12 receives selection of designation of not only the destination terminal but also the middle-of-conference participation terminal participating in the established session.

When the operation input reception unit 12 receives selection of designation of not only the destination terminal but also the middle-of-conference participation terminal participating in the established session (step S41-4: Yes), the display control unit 16 displays, on the display 120, the middle-of-conference participation designation list as shown in FIG. 22. As shown in FIG. 22, the middle-of-conference participation designation list displayed on the display 120 includes the terminal IDs of the candidates of the middle-of-conference participation terminals, the terminal names thereof, and the icons 1101-4a to 1101-4c reflecting the state information, and the like, in the middle-of-conference participation designation list frame 1101-1. The icons include an offline icon 1101-4a indicating offline and that communication cannot be performed, a communicable icon 1101-4b indicating online and that communication can be performed, and a communicating icon 1101-4c indicating online and that communication is being performed.

On the other hand, when the operation input reception unit 12 receives selection of communication with only the destination terminal (step S41-4: No), the processing in step S41-8 explained later is executed.

When the user presses down the operation button 108 to select the middle-of-conference participation terminal (the terminal 10ac in this case) in the middle-of-conference participation designation list, the display control unit 16 displays, on the display 120, the middle-of-conference participation terminal confirmation dialog 1202-1 as shown in FIG. 23 (step S41-5).

The middle-of-conference participation terminal confirmation dialog 1202-1 is an interface for selecting whether to register the selected middle-of-conference participation terminal or not, and whether to designate still another terminal 10 as the middle-of-conference participation terminal. The middle-of-conference participation terminal confirmation dialog 1202-1 includes a selection finish button 1202-2 for registering only the selected middle-of-conference participation terminal, an additional selection button 1202-3 for designating still another terminal 10 as the middle-of-conference participation terminal, and a "No" button 1202-4 for canceling registration of the selected middle-of-conference participation terminal.

In this case, when the selection finish button 1202-2 is pressed down, the operation input reception unit 12 receives selection of only the selected middle-of-conference participation terminal. When the additional selection button 1202-3 is pressed down, the operation input reception unit 12 receives selection of designating still another terminal 10 as the middle-of-conference participation terminal. When the "No" button 1202-4 is pressed down, the operation input reception unit 12 receives selection of canceling registration of the selected middle-of-conference participation terminal.

When the operation input reception unit 12 receives selection of only the selected middle-of-conference participation terminal (step S41-6: Yes (selection finish)), the selected terminal 10ac is registered as the middle-of-conference participation terminal in FIG. 22 (step S41-7).

When the operation input reception unit 12 receives selection of designating still another terminal 10 as the middle-of-conference participation terminal (step S41-6: Yes (additional selection)), the display control unit 16 displays the middle-of-conference participation designation list as shown in FIG. 22 on the display 120 again. Then, the processing in step S41-5 and subsequent steps is enabled again.

When the operation input reception unit 12 receives selection of canceling registration of the selected middle-of-conference participation terminal (step S41-6: No), the display control unit 16 displays the middle-of-conference participation designation confirmation dialog 1201-1 as shown in FIG. 21 on the display 120 again. Then, the processing in step S41-4 and subsequent steps is enabled again.

After the selected terminal 10ac is registered as the middle-of-conference selection terminal in FIG. 22, the transmission/reception unit 11 of the start request terminal (the terminal 10aa) generates start request information including the participation restriction information indicating presence of the participation restriction (step S41-8). The start request information generated in step S41-8 is information requesting start, and includes "Private Invite" which is the participation restriction information indicating presence of the participation restriction, the terminal ID "10aa" of the start request terminal, terminal ID "10db" of the destination terminal, and the terminal ID "10ac" of the middle-of-conference participation terminal.

On the other hand, when the operation input reception unit 12 receives the designation not applied with the participation restriction (NO in step S41-3), the transmission/reception unit 11 generates start request information including the participation restriction information indicating absence of the participation restriction (step S41-9). The start request information generated in step S41-9 is information for requesting start, and includes "Invite" indicating the participation restriction information indicating absence of the participation restriction, the terminal ID "10aa" of the start request terminal, and the terminal ID "10db" of the destination terminal.

In this case, in FIG. 18, an example where "Private Invite" which is the participation restriction information indicating presence of the participation restriction is designated as the start request information will be explained. In FIG. 18, the transmission/reception unit 11 of the terminal 10aa transmits, to the management system 50, start request information including the terminal ID "10aa" of the start request terminal (the terminal 10aa), the terminal ID "10db" of the destination terminal (the terminal 10db), "Private Invite" which is information indicating that the start is requested and includes the participation restriction information indicating presence of the participation restriction, and the terminal ID "10ac" of the middle-of-conference participation terminal, as well as the IP address of the start request terminal (step S42). Therefore, the transmission/reception unit 51 of the management system 50 receives the start request information, and recognizes the IP address "1.2.1.3" of the start request terminal (the terminal 10aa) which is the transmission source.

Subsequently, when the transmission/reception unit 51 receives the start request information including the participation restriction information indicating presence of the participation restriction, the participation authentication information generation unit 64 of the management system 50 generates participation authentication information (PIN code) (step S43).

Then, the state management unit 53 changes the field portions of the communication states of the records including the terminal ID "10aa" and the terminal ID "10db" in the terminal management table (see FIG. 7) of the terminal management DB 5003 on the basis of the terminal ID "10aa" of the start request terminal (the terminal 10aa) and the terminal ID "10db" of the destination terminal (the terminal 10db) included in the participation request information (step S44).

In this case, the processing in step S44 will be explained in details with reference to FIG. 24. First, the state management unit 53 of the management system 50 obtains the communication state of the start request terminal (the terminal 10aa) from the terminal management table (see FIG. 7) of the terminal management DB 5003 (step S44-1). In this case, "Private Invite" (or "Invite") included in the start request information received by the transmission/reception unit 51 is identified as the change request information about the communication state. The change request information "Private Invite" (or "Invite") is determined to be the particular change request information by the change request information determination unit 61 in advance. On the basis of this, the state management unit 53 obtains the communication state of not only the start request terminal but also the destination terminal (the terminal 10db) from the terminal management table. In this case, the state management unit 53 searches the terminal management table by using, as the search key, the terminal ID "10aa" of the start request terminal, and obtains the communication state "None" of the start request terminal which transmitted the start request information. Likewise the state management unit 53 obtains the communication state "None" of the destination terminal.

Subsequently, the state management unit 53 obtains the prior-to-change state information about the start request terminal and the destination terminal corresponding to the change request information "Private Invite" (or "Invite") (step S44-2). In this case, the state management unit 53 searches the state change management table (see FIG. 11) by using the change request information "Private Invite" (or "Invite") and the terminal information "start request terminal" as the search key, and obtains the prior-to-change state information "None" about the start request terminal. Likewise, the state management unit 53 searches the state change management table by using the change request information "Private Invite" (or "Invite") and the terminal information "destination terminal" as the search key, and obtains the prior-to-change state information "None" about the destination terminal.

Subsequently, the state management unit 53 compares the obtained communication state and the prior-to-change state information, and determines whether the obtained communication state and the prior-to-change state information are the same as each other or not (step S44-3). In this case, the state management unit 53 compares the obtained communication state "None" of the start request terminal (the terminal 10aa) and the obtained prior-to-change state information "None" of the start request terminal, and determines whether the obtained communication state "None" of the start request terminal (the terminal 10aa) and the obtained prior-to-change state information "None" of the start request terminal are the same as each other or not. Likewise, the state management unit 53 compares the obtained communication state "None" of the destination terminal (the terminal 10db) and the obtained prior-to-change state information "None" of the destination terminal, and determines whether the obtained communication state "None" of the destination terminal (the terminal 10db) and the obtained prior-to-change state information "None" of the destination terminal are the same as each other or not.

When the communication state of the start request terminal (the terminal 10aa) and the prior-to-change state information are determined to be the same as each other, and the communication state of the destination terminal (the terminal 10db) and the prior-to-change state information are determined to be the same as each other (step S44-3: Yes), the state management unit 53 obtains the change information about the start request terminal and the destination terminal corresponding to the change request information "Private Invite" (or "Invite") (step S44-4). In this case, the state management unit 53 searches the state change management table (see FIG. 11) by using the change request information "Private Invite" (or "Invite") and the terminal information "start request terminal" as the search key, and obtains the change information "Private Calling" (or "Calling") about the start request terminal. Likewise, the state management unit 53 searches the state change management table by using the change request information "Private Invite" (or "Invite") and the terminal information "destination terminal" as the search key, and obtains the change information "Private Ringing" (or "Ringing") about the destination terminal.

Subsequently, the state management unit 53 changes the field portions of the communication states of the records including the terminal ID "10aa" and the terminal ID "10db" in the terminal management table (see FIG. 7) on the basis of the terminal ID "10aa" of the start request terminal and the terminal ID "10db" of the destination terminal (step S44-5). In this case, the state management unit 53 changes the field portion of the communication state of the record including the terminal ID "10aa" in the terminal management table to the obtained change information "Private Calling" (or "Calling") of the start request terminal. Likewise, the state management unit 53 changes the field portion of the communication state of the record including the terminal ID "10db" in the terminal management table to the obtained change information "Private Ringing" (or "Ringing") of the destination terminal.

Then, the state management unit 53 registers the participation authentication information (PIN code) generated by the participation authentication information generation unit 64 to the field of the participation authentication information about the terminal ID "10aa" of the start request terminal and the terminal ID "10db" of the destination terminal in the terminal management table (step S44-7).

On the other hand, when the communication state of the start request terminal and the prior-to-change state information are determined not to be the same as each other, or the communication state of the destination terminal and the prior-to-change state information are determined not to be the same as each other (step S44-3: No), the state management unit 53 does not change the field portions of the communication states of the records including the terminal ID "10aa" and terminal ID "10db" in the terminal management table (see FIG. 7). This is because any one of the start request terminal and the destination terminal is not in the state ready to start call. In this case, the transmission/reception unit 51 generates a predetermined error message, and transmits the predetermined error message to the start request terminal, and thus the processing is finished (step S44-6). At this occasion, in the start request terminal, the error message is displayed on the display 120.

Subsequently, back to FIG. 18, subsequent processing in a case where the communication state was changed in step S44-5 will be explained. First, the relay apparatus selection unit 56 of the management system 50 generates a session ID "se1" for identifying the session (content data session sed) for executing communication with the destination terminal requested by the start request terminal (the terminal 10aa) (step S45). When the session ID is generated, the session management unit 57 stores the session ID "se1" to the volatile storage unit 5100.

Subsequently, the relay apparatus selection unit 56 selects the relay apparatus 30 for relaying content data via the content data session sed between the start request terminal (the terminal 10aa) and the destination terminal (the terminal 10db) (step S46). In this case, first, the relay apparatus selection unit 56 searches the relay apparatus selection management table on the basis of the terminal ID "10aa" of the start request terminal and the terminal ID "10db" of the destination terminal included in the start request information transmitted from the start request terminal. Then, the relay apparatus selection unit 56 extracts the relay apparatus IDs ("111a", "111d") corresponding to the terminal IDs of the start request terminal and the destination terminal from the relay apparatus selection management table.

When the relay apparatus IDs extracted are the same, the relay apparatus selection unit 56 refers to the operation state of the extracted relay apparatus ID from among the operation states of the relay apparatuses 30 managed in the relay apparatus management table (see FIG. 5). In this case, when the operation state of the relay apparatus ID is "online", the relay apparatus selection unit 56 selects the relay apparatus having the extracted relay apparatus ID as the relay apparatus for relaying content data. When the relay apparatus IDs extracted are not the same, or the operation state corresponding to the relay apparatus ID is "offline" as a result of reference to the relay apparatus management table, the relay apparatus selection unit 56 selects the relay apparatus 30e of the relay apparatus ID "111e" as the relay apparatus for relaying content data. In the present embodiment, a case where the relay apparatus selection unit 56 selects the relay apparatus 30e will be hereinafter explained continuously.

When the selection processing of the relay apparatus 30 is completed, the session management unit 57 stores the relay apparatus ID "111e" of the relay apparatus, the terminal ID "10aa" of the start request terminal, and the terminal ID "10db" of the destination terminal, which are selected, to the field portions of the relay apparatus ID in the record including the session ID "se1", the terminal ID of the start request terminal, and the terminal ID of the destination terminal in the session management table (see FIG. 9), and manages the relay apparatus ID "111e" of the relay apparatus, the terminal ID "10aa" of the start request terminal, and the terminal ID "10db" of the destination terminal (step S47).

Subsequently, the transmission/reception unit 51 transmits, via the communication network 2 to the start request terminal (the terminal 10aa), the session ID generated by the relay apparatus selection unit 56 and relay apparatus connection information used to connect to the selected relay apparatus 30e (step S48). The relay apparatus connection information may include the IP address "1.1.1.3" of the relay apparatus 30e, the authentication information, the port number, and the like. Therefore, in the execution of the session having the session ID "se1", the terminal 10aa can recognize the relay apparatus connection information used to connect the relay apparatus 30e used to relay the content data.

Subsequently, the transmission/reception unit 51 transmits, to the destination terminal, the start request information including the terminal ID "10aa" of the start request terminal, "Private Invite", and the session ID "se1", and the relay apparatus connection information and the IP address of the management system 50 to the destination terminal (step S49). Therefore, the transmission/reception unit 11 of the destination terminal receives the start request information, and recognizes the relay apparatus connection information used to connect the relay apparatus 30e used to relay the content data and the IP address "1.1.1.2" of the management system 50.

Figure 25:
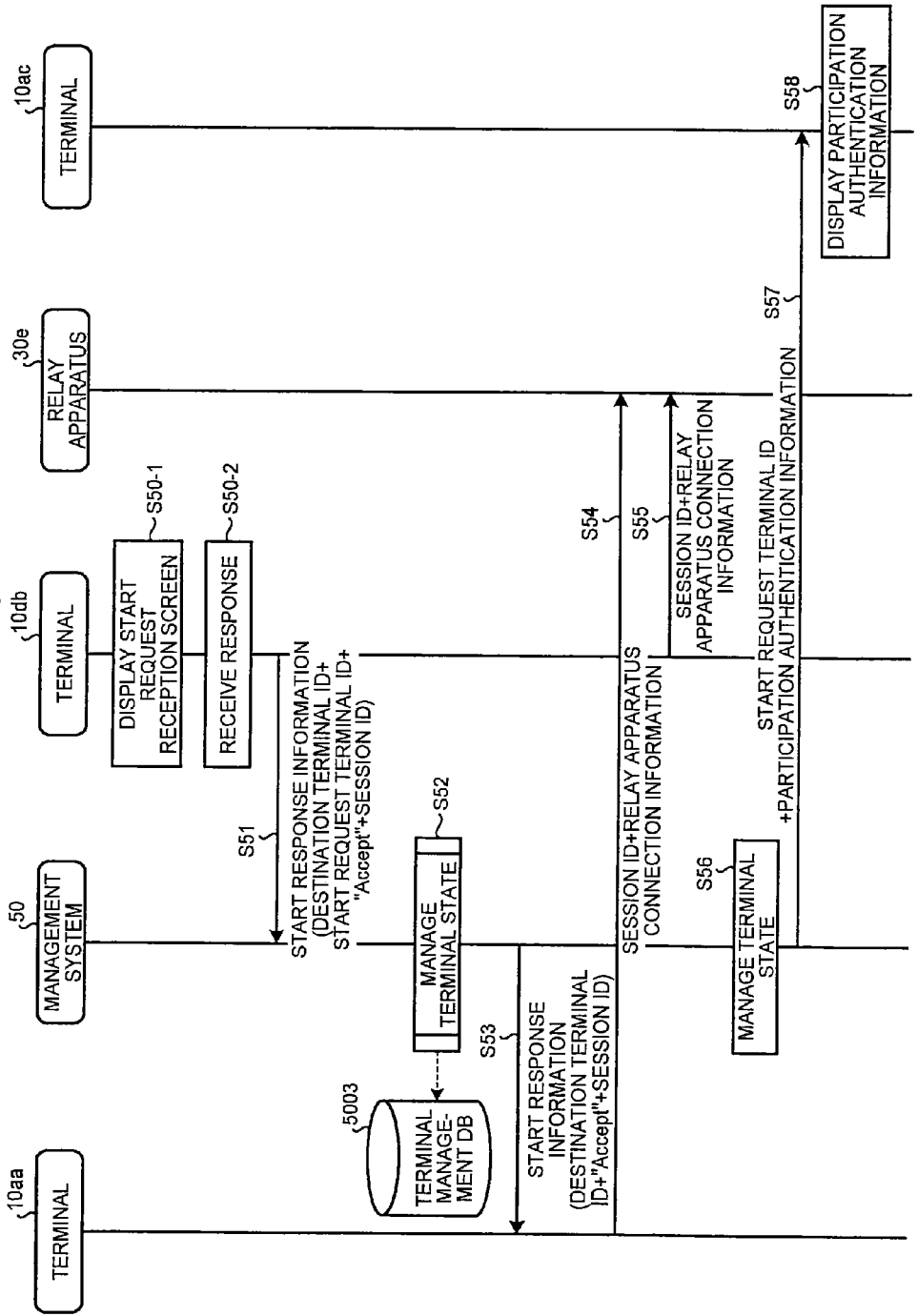
FIG. 25 is a sequence diagram illustrating an example of processing for permitting request of start of communication.
Figure 26:
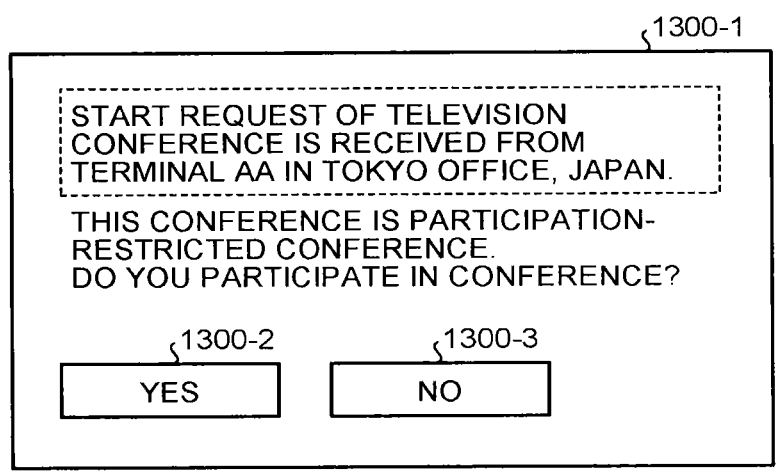
FIG. 26 is a diagram illustrating an example of display of a start request reception screen.

Processing where Destination Terminal Receives Response for Permitting Start of Communication with Start Request Terminal FIG. 25 is a sequence diagram illustrating an example of processing for permitting request of start of communication. FIG. 26 is a figure illustrating an example of display of a start request reception screen. Processing that is performed where the user of the destination terminal receiving the start request information presses down the operation button 108 as shown in FIG. 2 and a response for permitting start of communication (establishing of a session) with the start request terminal is received will be explained with reference to FIGS. 25 and 26. In FIG. 25, an example where the participation restriction information indicating presence of the participation restriction is designated as the start request information will be explained.

When the transmission/reception processing as shown in FIG. 25 is started, a start request reception screen 1300-1 indicating that the start request information is received (see FIG. 26) is displayed on the display 120 of the destination terminal (the terminal 10*db*) (step S50-1).

The start request reception screen 1300-1 as shown in FIG. 26 is a user interface showing that the start request information is received and for designating start of communication (establishing of a session) with the start request terminal is to be permitted or not. Further, when the start request information includes the participation restriction information indicating presence of the participation restriction, the start request reception screen 1300-1 indicates that participation restriction is applied, for example, "This conference is participation-restricted conference." The user can see the start request reception screen 1300-1 to confirm that the start request is received, and further confirm that the television conference of the session which is requested to be started is a participation-restricted conference designating participation-restriction or not. The start request reception screen 1300-1 includes a "Yes" button 1300-2 for permitting establishing of a session and a "No" button 1300-3 for making selection not to permit establishing of a session.

When the user of the destination terminal operates the operation button 108 of the destination terminal (the terminal 10*db*) to press down the "Yes" button 1300-2, the operation input reception unit 12 receives a response indicating that start of communication (establishing of a session) with the start request terminal (the terminal 10*aa*) is permitted (step S50-2). Subsequently, the transmission/reception unit 11 of the destination terminal transmits, to the management system 50, the start response information including the terminal ID "10db" of the destination terminal, the terminal ID "10aa" of the start request terminal, the change request information "Accept" indicating that a session applied with participation restriction is permitted to be established, and the session ID "se1" (step S51).

When the transmission/reception unit 51 of the management system 50 receives the start response information, the state management unit 53 changes the field portion of the communication state of the record including the terminal ID "10aa" and the terminal ID "10db" in the terminal management table (see FIG. 7) on the basis of the terminal ID "10aa" of the start request terminal and the terminal ID "10db" of the destination terminal included in the start response information (step S52).

In this case, processing in step S52 will be explained in details with reference to FIG. 24. First, like the processing in step S44-1, the state management unit 53 of the management system 50 obtains the communication state "Private Ringing" (or "Ringing") of the destination terminal (the terminal 10*db*) from the terminal management table (see FIG. 7) (step S52-1). In this case, the change request information "Accept" received by the transmission/reception unit 51 is determined to be the particular change request information by the change request information determination unit 61 in advance. On the basis of this, the state management unit 53 obtains the communication state "Private Calling" (or "Calling") of not only the destination terminal but also the start request terminal (the terminal 10*aa*) from the terminal management table.

Subsequently, like the processing in step S44-2, the state management unit 53 searches the state change management table (see FIG. 11), and obtains the prior-to-change state information "Private Calling" and "Private Accepted" about the start request terminal corresponding to the change request information "Accept". Likewise, the state management unit 53 searches the state change management table, and obtains the prior-to-change state information "Private Ringing" about the destination terminal corresponding to the change request information "Accept" (step S52-2).

Subsequently, the state management unit 53 compares the obtained communication state and the prior-to-change state information, and determines whether the obtained communication state and the prior-to-change state information are the same as each other or not (step S52-3). In this case, the state management unit 53 determines whether the obtained communication state "Private Calling" of the start request terminal (the terminal 10*aa*) is the same as any one of the obtained prior-to-change state information "Private Calling" and "Private Accepted" of the start request terminal. Likewise, the state management unit 53 determines whether the obtained communication state "Private Ringing" of the destination terminal (the terminal 10*db*) is the same as the obtained prior-to-change state information "Private Ringing" of the destination terminal.

When the communication state of the start request terminal (the terminal 10*aa*) is determined to be the same as the prior-to-change state information, and the communication state of the destination terminal (the terminal 10*db*) is determined to be the same as the prior-to-change state information (step S52-3: Yes), the state management unit 53 obtains the change information about the start request terminal and the destination terminal corresponding to the change request information "Accept" of the start response information (step S52-4). In this case, the state management unit 53 searches the state change management table (see FIG. 11) by using, as the search key, the change request information "Accept", the terminal information "start request terminal", and the prior-to-change state information "Private Calling" indicating the communication state of the start request terminal before the change, and obtains the change information "Private Accepted" about the start request terminal. Likewise, the state management unit 53 searches the state change management table by using, as the search key, the change request information "Accept", the terminal information "destination terminal", the prior-to-change state information "Private Ringing" indicating the communication state of the destination terminal before the change, and obtains the change information "Private Accepted" about the destination terminal.

Subsequently, the state management unit 53 changes the field portions of the communication states of the records including the terminal ID "10aa" and the terminal ID "10db" in the terminal management table (see FIG. 7) on the basis of the terminal ID "10aa" of the start request terminal (the terminal 10*aa*) and the terminal ID "10db" of the destination terminal (the terminal 10*db*) included in the start response information (step S52-5). In this case, the state management unit 53 changes the field portion of the communication state of the record including the terminal ID "10aa" in the terminal management table to the obtained change information "Private Accepted" of the start request terminal. Likewise, the state management unit 53 changes the field portion of the communication state of the record including the terminal ID "10db" in the terminal management table to the obtained change information "Private Accepted" of the destination terminal.

On the other hand, when the communication state of the start request terminal and the prior-to-change state information are determined not to be the same, or the communication state of the destination terminal and the prior-to-change state information are determined not to be the same (step S52-3: No), the state management unit 53 does not change the field portions of the communication states of the records including the terminal ID "10aa" and the terminal ID "10db" in the terminal management table (see FIG. 7). In this case, the transmission/reception unit 51 generates a predetermined error message, and transmits this to the destination terminal, and thus the processing is finished (step S52-6).

Subsequently, processing that is performed subsequently where the communication state is changed in step S52-5 will be explained. The transmission/reception unit 51 transmits, to the start request terminal (the terminal 10aa), the start response information including the terminal ID "10db" of the destination terminal (the terminal 10db), change request information "Accept" indicating permission of request of start of communication with the destination terminal, and the session ID "se1" (step S53). When the start request terminal receives this start response information, the transmission/reception unit 11 transmits the session ID "se1" and the relay apparatus connection information obtained in step S48 to the relay apparatus 30e, thus connecting with the relay apparatus 30e (step S54). On the other hand, in the destination terminal, the transmission/reception unit 11 transmits the session ID "se1" and the relay apparatus connection information obtained in step S49 to the relay apparatus 30e, thus connecting with the relay apparatus 30e (step S55).

Subsequently, the state management unit 53 changes the field portions of the participation PIN code and the participation destination terminal ID of the record including the terminal ID "10ac" in the terminal management table (see FIG. 7) on the basis of the terminal ID "10ac" of the middle-of-conference participation terminal (the terminal 10ac) (step S56). More specifically, the state management unit 53 changes the field portions of the participation PIN code and the participation destination terminal ID of the record including the terminal ID "10ac" in the terminal management table to the participation authentication information generated by the participation authentication information generation unit 64 and the terminal ID of the start request terminal, respectively.

Then, the transmission/reception unit 51 transmits the terminal ID "10aa" of the start request terminal (the terminal 10aa) and the participation authentication information generated by the participation authentication information generation unit 64 to the middle-of-conference participation terminal (the terminal 10ac) (step S57). Therefore, the middle-of-conference participation terminal recognizes the terminal ID of the participation destination terminal (the start request terminal, the terminal 10aa) and the participation authentication information for participating in the session to be established. The transmission/reception unit 11 of the middle-of-conference participation terminal receives the terminal ID of the start request terminal and the participation authentication information, and the display control unit 16 displays the terminal ID of the start request terminal and the participation authentication information on the display 120 (see FIG. 30 explained later) (step S58).

Figure 27:
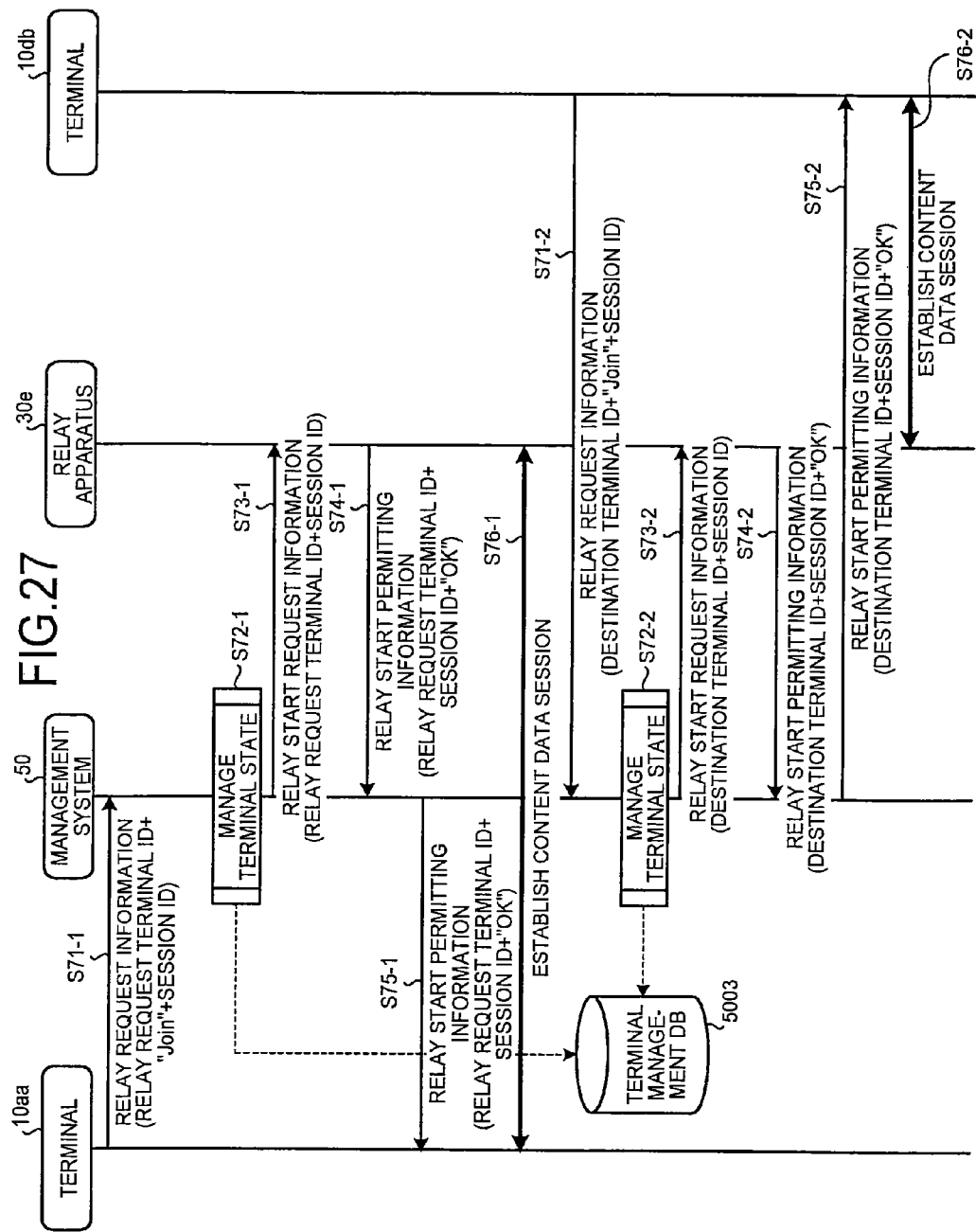
FIG. 27 is a sequence diagram illustrating an example of processing for requesting relay of content data.
Figure 28:
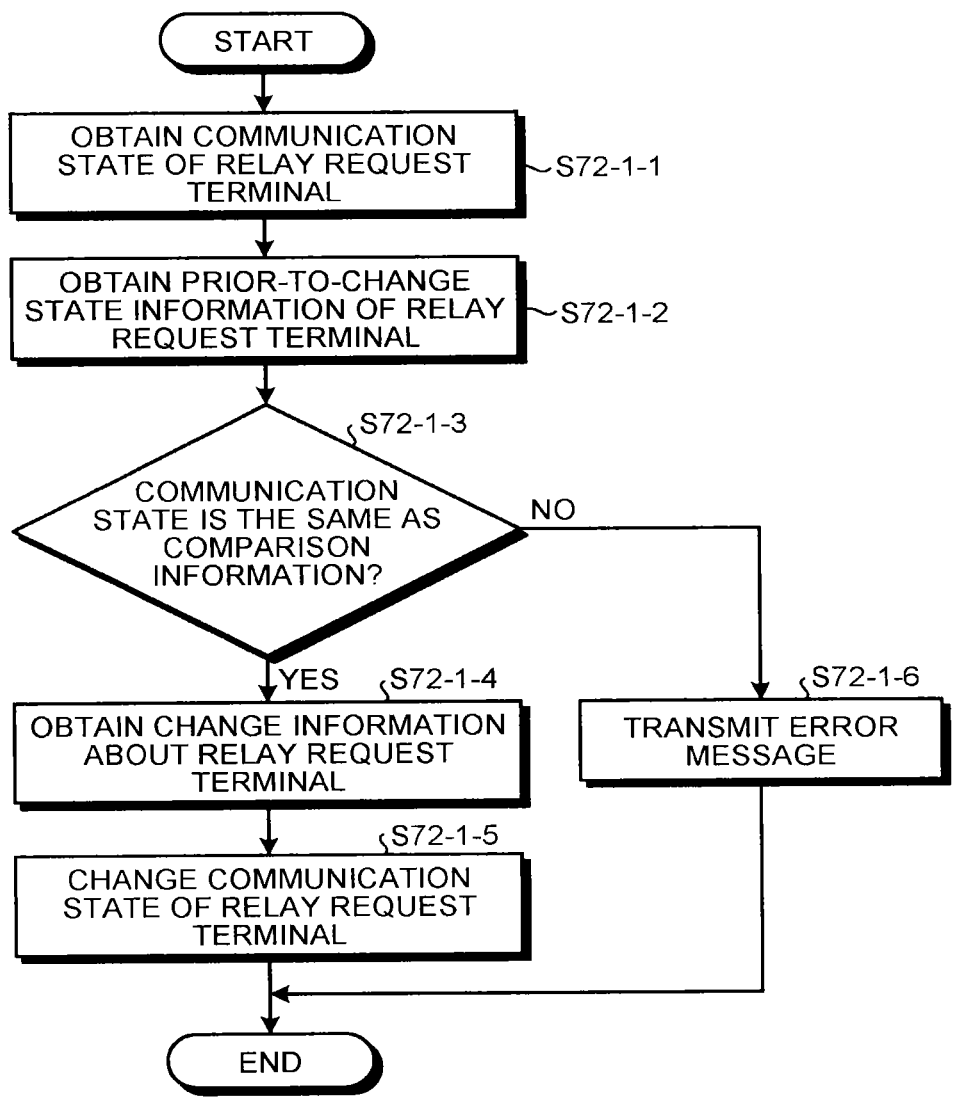
FIG. 28 is a processing flow diagram illustrating an example of processing for changing communication state of the relay request terminal.

Processing in which Relay Apparatus Starts Relaying Data Transmitted Between Start Request Terminal and Destination Terminal FIG. 27 is a sequence diagram illustrating an example of processing for requesting relay of content data. FIG. 28 is a processing flow diagram illustrating an example of processing for changing the communication state of a relay request terminal. Processing in which the relay apparatus 30e starts relaying of content data transmitted between the start request terminal (the terminal 10aa) and the destination terminal (the terminal 10db) will be explained with reference to FIGS. 27 and 28. FIG. 27 illustrates processing in which all of various kinds of management information are transmitted and received via the management information session sei.

First, with predetermined timing after the start request terminal (the terminal 10aa) connects with the relay apparatus 30e (see step S54 of FIG. 25), the transmission/reception unit 11 transmits, to the management system 50, the relay request information including the terminal ID (relay request terminal ID) "10aa" of the start request terminal, the session ID "se1", and the change request information "Join" indicating that the start of relaying is requested (step S71-1).

When the transmission/reception unit 51 of the management system 50 receives the relay request information, the state management unit 53 changes the field portion of the communication state of the record including the terminal ID "10aa" in the terminal management table (see FIG. 7) on the basis of the terminal ID "10aa" of the start request terminal (the terminal 10aa) included in the relay request information (step S72-1).

In this case, the processing in step S72-1 will be explained in details with reference to FIG. 28. In FIG. 28, the start request terminal will be referred to as a relay request terminal serving as a transmission source of relay request information. First, the state management unit 53 of the management system 50 obtains the communication state of the relay request terminal (the terminal 10aa) from the terminal management table (see FIG. 7) (step S72-1-1). In this case, the change request information "Join" received by the transmission/reception unit 51 is determined not to be the particular change request information by the change request information determination unit 61 in advance. On the basis of this, the state management unit 53 obtains only the communication state of the relay request terminal. In this case, the state management unit 53 searches the terminal management table by using the terminal ID "10aa" of the relay request terminal as the search key, and obtains the communication state "Private Accepted" (or "Accepted") of the relay request terminal that transmitted the relay request information.

Subsequently, the state management unit 53 obtains the prior-to-change state information corresponding to the change request information "Join" (step S72-1-2). In this case, the state management unit 53 searches state change management table (see FIG. 10) by using the change request information "Join" as the search key, and obtains the prior-to-change state information "Private Accepted" (or "Accepted").

Subsequently, the state management unit 53 compares the obtained communication state and the prior-to-change state information, and determines whether the obtained communication state and the prior-to-change state information are the same as each other or not (step S72-1-3). In this case, the state management unit 53 compares the obtained communication state "Private Accepted" (or "Accepted") of the relay request terminal (the terminal 10aa) and the obtained prior-to-change state information "Private Accepted" (or "Accepted"), and determines whether the obtained communication state "Private Accepted" (or "Accepted") of the relay request terminal (The terminal 10aa) and the obtained prior-to-change state information "Private Accepted" (or "Accepted") are the same as each other or not.

When the communication state of the relay request terminal (the terminal 10aa) and the prior-to-change state information are determined to be the same as each other (step S72-1-3: Yes), the state management unit 53 obtains the change information corresponding to the change request information "Join" (step S72-1-4). In this case, the state management unit 53 searches the state change management table (see FIG. 10) by using the change request information "Join" as the search key, and obtains the change information "Private Busy" (or "Busy").

Subsequently, the state management unit 53 changes the field portion of the communication state of the record including the terminal ID "10aa" in the terminal management table (see FIG. 7) on the basis of the terminal ID "10aa" of the relay request terminal (the terminal 10aa) (step S72-1-5). In this case, the state management unit 53 changes the field portion of the communication state of the record including terminal ID "10aa" in the terminal management table to the obtained change information "Private Busy" (or "Busy").

On the other hand, when the communication state of the relay request terminal (the terminal 10aa) and the prior-to-change state information are determined not to be the same as each other (step S72-1-3: No), the state management unit 53 does not change the field portion of the communication state of the record including the terminal ID "10aa" in the terminal management table (see FIG. 7). In this case, the transmission/reception unit 51 generates a predetermined error message, and transmits the predetermined error message to the relay request terminal, and thus the processing is finished (step S72-1-6).

Subsequently, back to FIG. 27, processing that is performed subsequently where the communication state is changed in step S72-1-5 will be explained. First, the management system 50 transmits, to the relay apparatus 30e, the relay start request information including the terminal ID "10aa" of the relay request terminal (the terminal 10aa) and the session ID "se1" (step S73-1). When the relay apparatus 30e receives the relay start request information, the relay apparatus 30e transmits, to the management system 50, the relay start permitting information including notification information "OK" indicating that the start of relaying is permitted, the terminal ID "10aa" of the relay request terminal, and the session ID "se1" (step S74-1). When the transmission/reception unit 51 of the management system 50 receives the relay start permitting information, the transmission/reception unit 51 of the management system 50 transmits this relay start permitting information to the relay request terminal (step S75-1). Therefore, the content data session sed is established between the relay request terminal and the relay apparatus 30e (step S76-1).

On the other hand, with predetermined timing after the destination terminal (the terminal 10db) connects with the relay apparatus 30e (see step S55 of FIG. 25), the transmission/reception unit 11 transmits, to the management system 50, the relay request information including the terminal ID "10db" of the destination terminal, session ID "se1", and the change request information "Join" indicating that the start of relaying is requested (step S71-2).

Subsequently, the management system 50, the relay apparatus 30e, and the destination terminal (the terminal 10db) execute the same processing as steps S72-1, S73-1, S74-1, and S75-1, so that the content data session sed is established between the destination terminal and the relay apparatus 30e (step S72-2, S73-2, S74-2, S75-2, and S76-2). In step S72-2, the destination terminal is treated as the transmission source of the relay request information, which is the relay request terminal. When the content data session sed is established between the relay request terminal (the terminal 10aa) and the relay apparatus 30e and between the destination terminal (the terminal 10db) and the relay apparatus 30e, the relay apparatus 30e can relay three pieces of image data and audio data including low resolution, medium resolution, and high resolution between the terminal 10aa and the terminal 10db. Therefore, the terminal 10aa and the terminal 10db can start the television conference.

Figure 29:
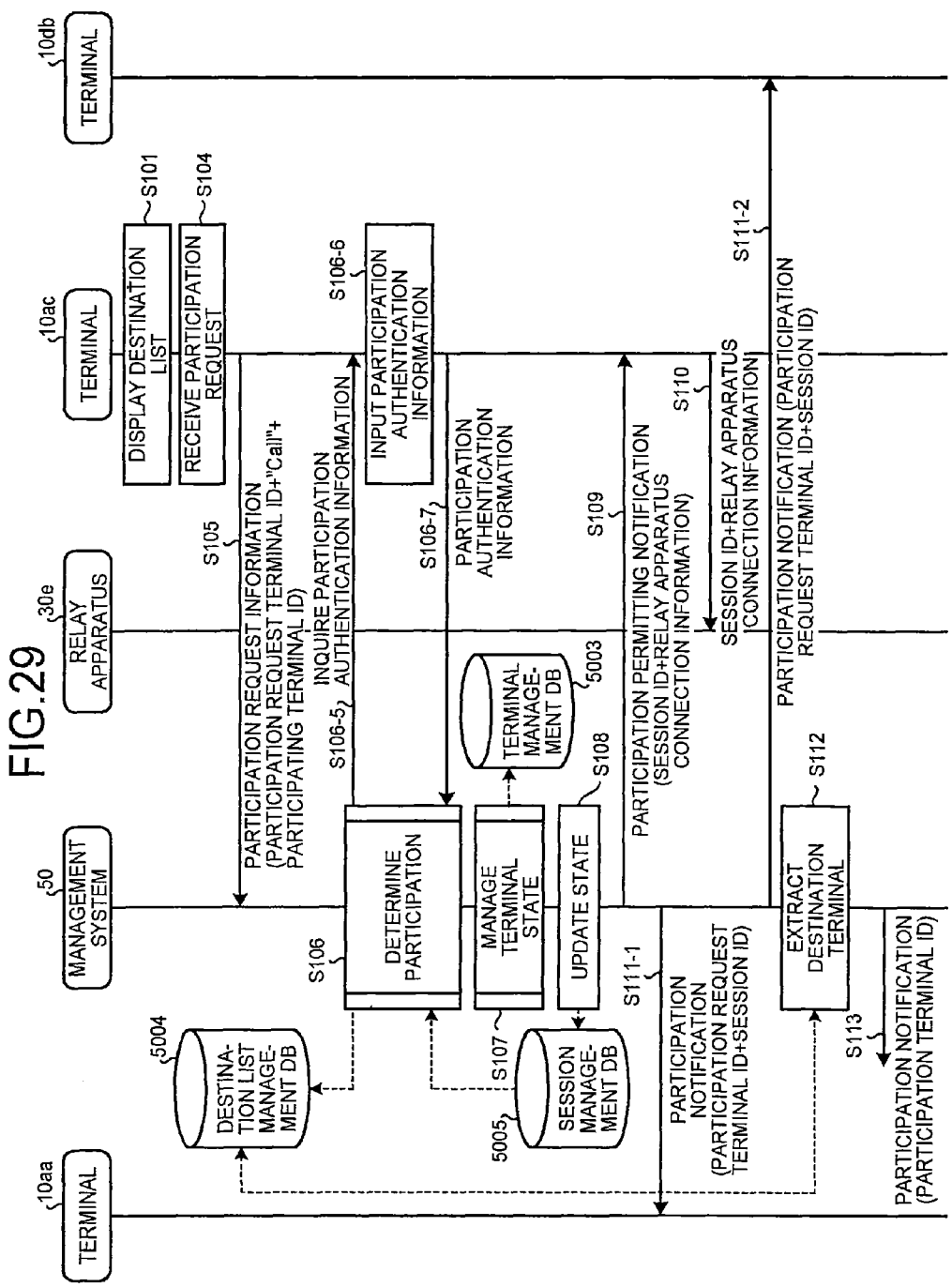
FIG. 29 is a sequence diagram illustrating an example of processing for transmitting participation request information to a content data session according to the first embodiment.
Figure 30:
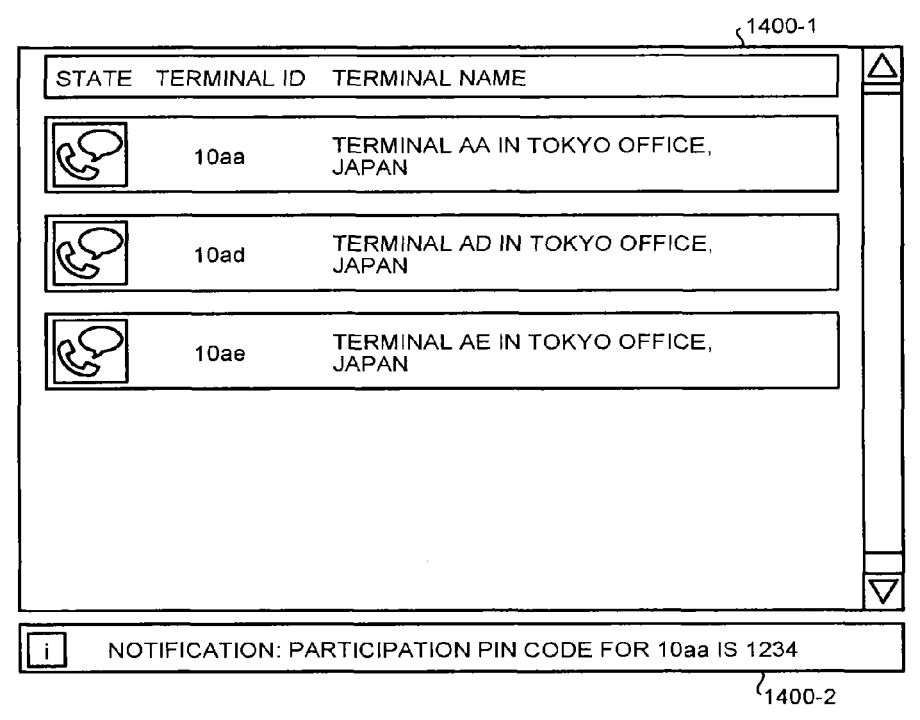
Figure 31:
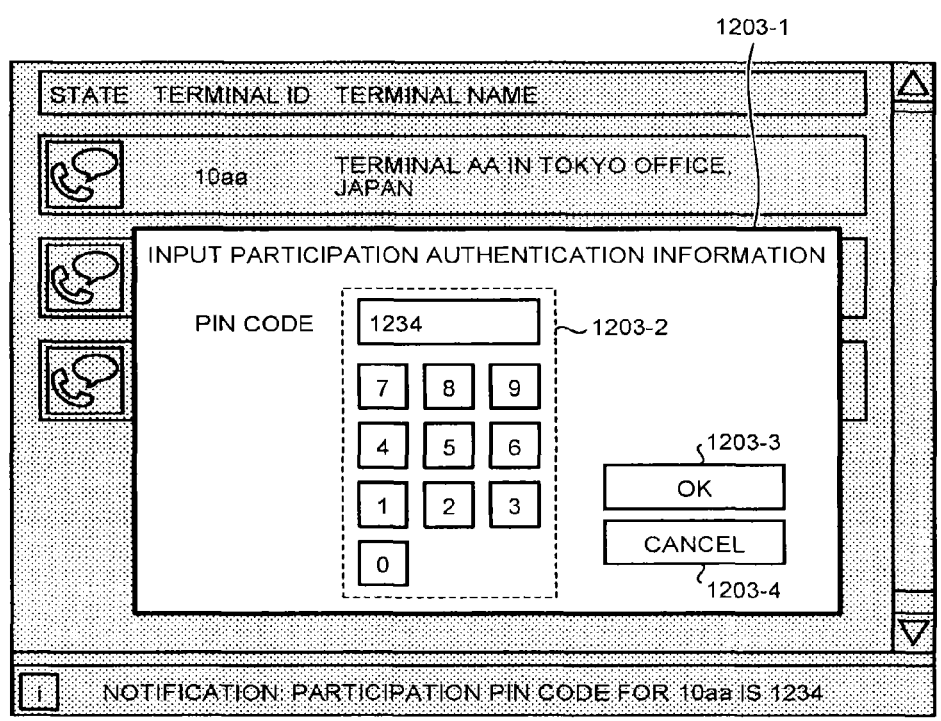
FIG. 31 is a diagram illustrating an example of display of a participation restriction information input dialog.
Figure 32:
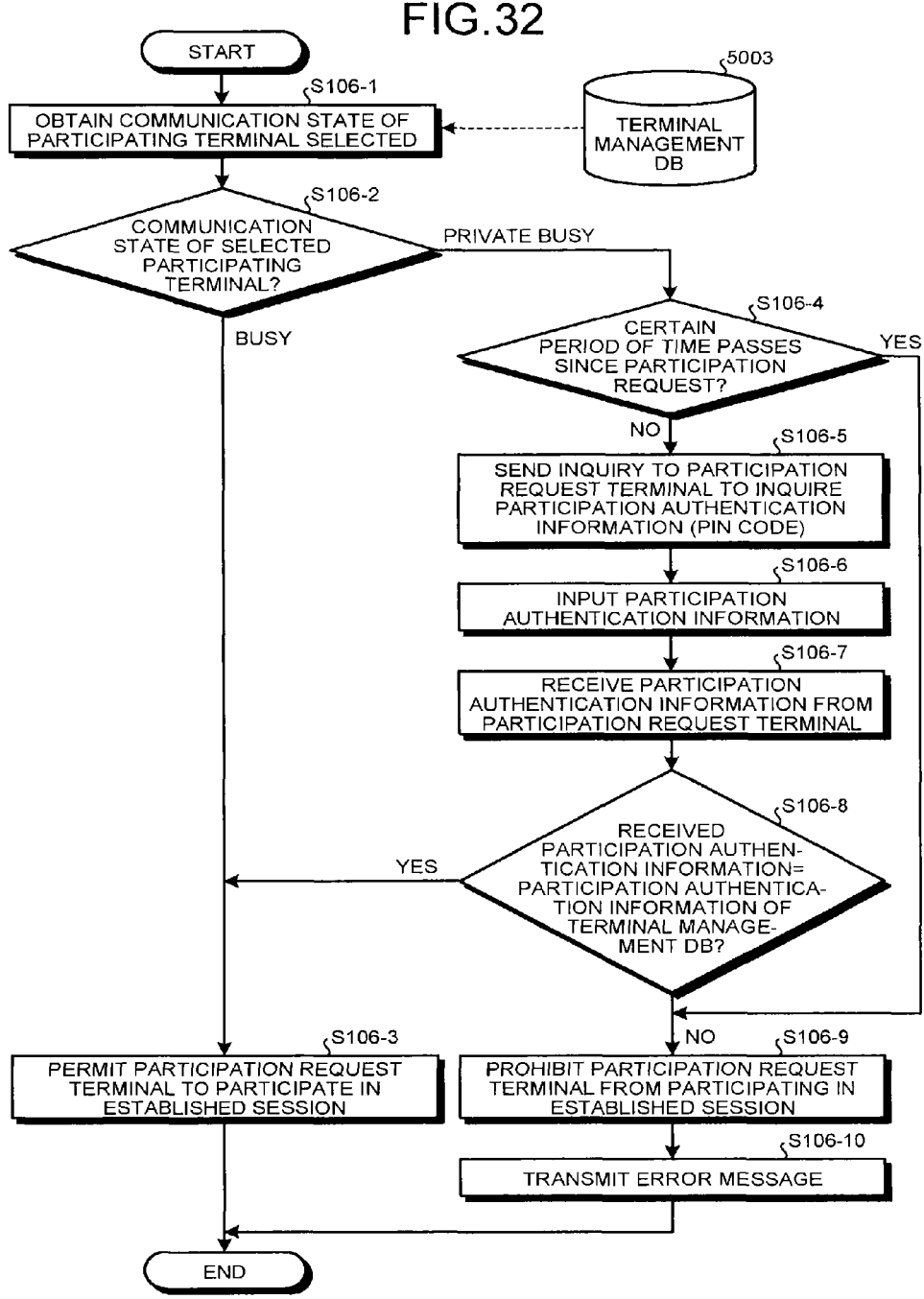
FIG. 32 is a processing flow diagram illustrating an example of determination processing of participation.
Figure 33:
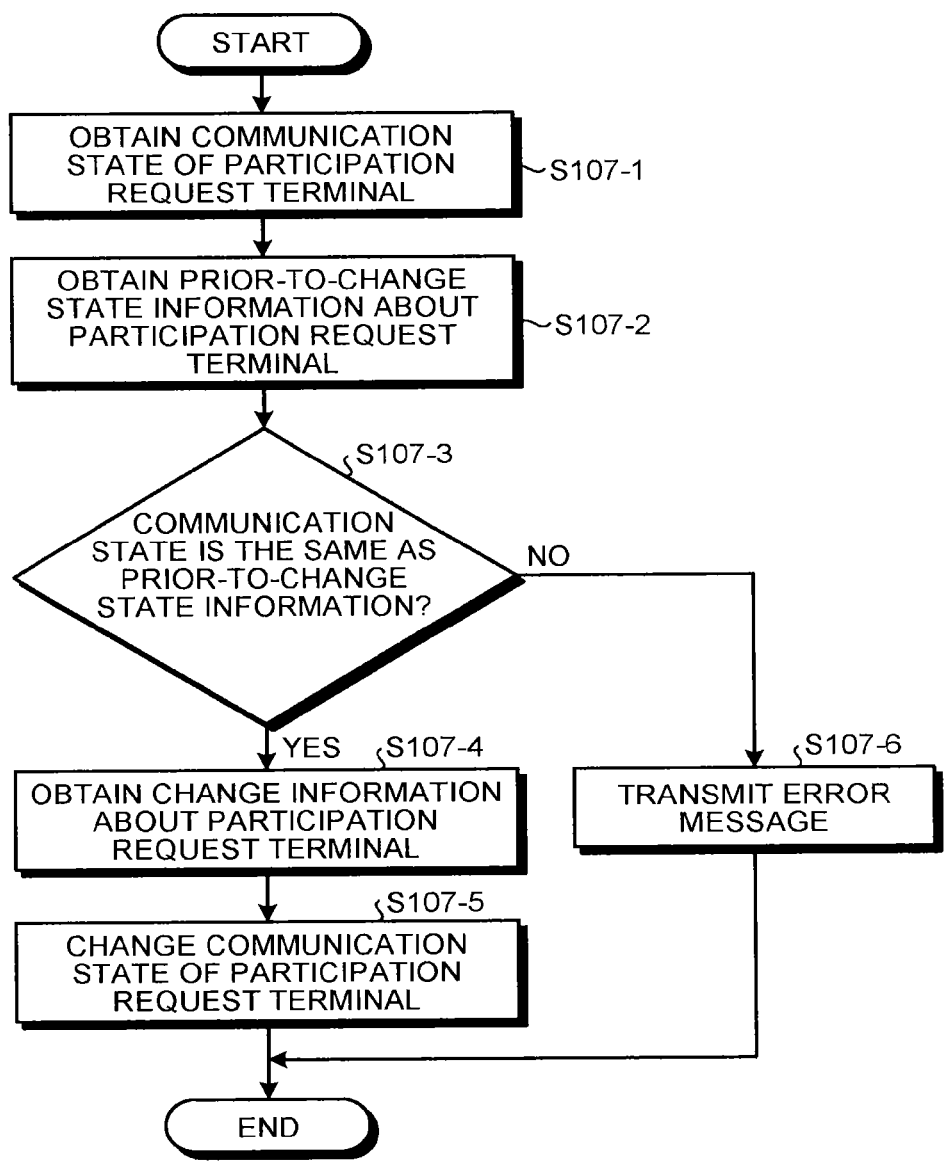
FIG. 33 is a diagram illustrating an example of processing for changing the communication state of the participation request terminal.

Processing where middle-of-conference participation terminal requests participation in content data session FIG. 29 is a sequence diagram illustrating an example of processing for transmitting participation request information to a content data session according to the first embodiment. FIG. 30 is a figure illustrating an example of display of a destination list according to the first embodiment. FIG. 31 is a figure illustrating an example of display of a participation restriction information input dialog. FIG. 32 is a processing flow diagram illustrating an example of determination processing of participation. FIG. 33 is a figure illustrating an example of processing for changing the communication state of the participation request terminal. Processing in which, after a content data session is established between the start request terminal (the terminal 10aa) and the destination terminal (the terminal 10db), the middle-of-conference participation terminal (the terminal 10ac) transmits participation request information for requesting participation in the content data session will be explained with reference to FIGS. 29 to 33. More specifically, the middle-of-conference participation terminal (the terminal 10ac) operates as the participation request terminal transmitting the participation request information. FIG. 29 shows processing in which all of the various kinds of management information are transmitted and received via the management information session sei.

When the user wants to participate in the established session which is a session already established and the user wants to participate in the television conference using this session, the user causes the destination list to be displayed on the display 120ac of the terminal 10ac by using the terminal (the terminal 10ac in this case) used by the user himself/herself to perform the log-in processing explained with reference to FIG. 16 (step S101).

As shown in FIG. 30, a destination list 1400-1 is displayed on the display 120ac of the terminal 10ac. In the destination list 1400-1, destination terminal candidates with which the terminal 10ac serving as the start request terminal can establish a session are displayed as a list. As a result of processing in step S58 of FIG. 25, the display 120ac displays a participation authentication information display unit 1400-2 including the terminal ID "10aa" of the start request terminal (the terminal 10aa) and the participation authentication information (for example, "1234") below the destination list 1400-1.

The user of the participation request terminal (the terminal 10ac) operates the operation button 108 as shown in FIG. 2 to select, from the destination list 1400-1, a terminal (hereinafter referred to as participating terminal) which has already participated in the session in which the user wants to participate. In response, the operation input reception unit 12 receives a participation request in a content data session already established (step S104). In the explanation below, a case where the terminal 10aa serving as the participating terminal is selected will be explained.

Therefore, the transmission/reception unit 11 of the participation request terminal (the terminal 10ac) requesting participation transmits, to the management system 50, participation request information including the terminal ID "10ac" of the participation request terminal, the change request information "Call" indicating request for participating in the content data session sed, and the terminal ID "10aa" of the selected participating terminal (the terminal 10aa) (step S105).

When the management system 50 receives the participation request information, the management system 50 uses the destination list management table (see FIG. 8) to determine whether to continue processing for connecting the participation request terminal (the terminal 10ac) and the participating terminal (the terminal 10aa and the terminal 10db) which already participates in the content data session sed (step S106).

In this case, the processing in step S106 will be explained in details with reference to FIG. 32. First, the state management unit 53 refers to the terminal management table (see FIG. 7), and obtains the communication state of the participating terminal by using, as the search key, the terminal ID "10aa" of the selected participating terminal (the terminal 10aa) indicated by the participation request information (step S106-1).

Subsequently, the participation determination unit 63 refers to the communication state of the participating terminal (the terminal 10aa) obtained by the state management unit 53 (step S106-2). When the communication state of the participating terminal is "Busy" (step S106-2: Busy), the participation determination unit 63 permits the participation request terminal (the terminal 10ac) to participate in the established session (step S106-3).

On the other hand, in a case where the communication state of the participating terminal (the terminal 10aa) is "Private Busy" (step S106-2: Private Busy), the participation determination unit 63 determines whether a certain period of time passes since the reception of the participation request information from the participation request terminal (the terminal 10ac) (step S106-4). When the participation determination unit 63 determines that the certain period of time has not yet passed since the reception of the participation request information (step S106-4: No), the transmission/reception unit 51 inquires of the participation request terminal (the terminal 10ac) about the participation authentication information (step S106-5). Therefore, the participation request terminal (the terminal 10ac) causes the display control unit 16 to superimpose the participation authentication information input dialog 1203-1 as shown in FIG. 31 on the destination list 1400-1, and display the destination list 1400-1 having the participation authentication information input dialog 1203-1 superimposed thereon on the display 120ac, and receives input of the participation authentication information (PIN code) from the user (step S106-6).

The participation authentication information input dialog 1203-1 is a user interface for receiving input of the participation authentication information from the user as described above. The participation authentication information input dialog 1203-1 includes a PIN code input unit 1203-2 for inputting the participation authentication information, an OK button 1203-3 for confirming the input participation authentication information, and a cancel button 1203-4 for canceling input operation of the participation authentication information.

When the user of the participation request terminal (the terminal 10ac) performs input operation to input the participation authentication information with the PIN code input unit 1203-2 of the participation authentication information input dialog 1203-1 displayed on the display 120ac, the user of the participation request terminal (the terminal 10ac) inputs the participation authentication information displayed on the participation authentication information display unit 1400-2 displayed on the same display 120ac.

Therefore, the user may input the participation authentication information displayed on the participation authentication information display unit 1400-2, and therefore, it is not necessary to recognize the participation authentication information in advance, and can easily perform participation operation to participate in the established session.

Then, the participation request terminal (the terminal 10ac) causes the transmission/reception unit 11 to transmit the received participation authentication information to the management system 50, and the transmission/reception unit 51 of the management system 50 receives this (step S106-7).

Subsequently, the participation determination unit 63 of the management system 50 compares the content of the participation authentication information received from the participation request terminal (the terminal 10ac) and the contents of the participation authentication information corresponding to the terminal IDs of the participating terminals (the terminals 10aa, 10db) in the terminal management table (see FIG. 7), and determines whether the content of the participation authentication information received from the participation request terminal (the terminal 10ac) and the contents of the participation authentication information corresponding to the terminal IDs of the participating terminals (the terminals 10aa, 10db) are the same as each other or not (step S106-8).

When the content of the participation authentication information received from the participation request terminal (the terminal 10ac) and the contents of the participation authentication information corresponding to the terminal IDs of the participating terminals (the terminals 10aa, 10db) are determined to be the same as each other (step S106-8: Yes), the participation determination unit 63 permits the participation request terminal (the terminal 10ac) to participate in the established session (step S106-3).

On the other hand, when the content of the participation authentication information received from the participation request terminal (the terminal 10ac) and the contents of the participation authentication information corresponding to the terminal IDs of the participating terminals (the terminals 10aa, 10db) are determined not to be the same as each other in step S106-8 (step S106-8: No), or the participation determination unit 63 determines that the certain period of time has passed since the reception of the participation request information in step S106-4 (step S106-4: Yes), then the participation determination unit 63 prohibits the participation request terminal from participating in the established session (step S106-9). Then, the transmission/reception unit 51 transmits an error message, for notifying not being able to participate in the session, to the participation request terminal (the terminal 10ac) (step S106-10). Then, when the participation request terminal (the terminal 10ac) receives the error message, the participation request terminal (the terminal 10ac) displays the error message on the display 120.

Subsequently, back to FIG. 29, processing that is performed subsequently where the participation request terminal (the terminal 10ac) is permitted to participate in the established session, and processing is continuously performed to cause the participation request terminal to connect to the participating terminals (the terminals 10aa, 10db) will be explained. First, the state management unit 53 of the management system 50 changes the field portion of the communication state of the record including the terminal ID "10ac" in the terminal management table (see FIG. 7) on the basis of the terminal ID "10ac" of the participation request terminal (the terminal 10ac) included in the participation request information (step S107).

In this case, the processing in step S107 will be explained in details with reference to FIG. 33. First, the state management unit 53 of the management system 50 obtains the communication state of the participation request terminal (the terminal 10ac) from the terminal management table (see FIG. 7) of the terminal management DB 5003 (step S107-1). In this case, "Call" included in the participation request information received by the transmission/reception unit 51 is identified as the change request information about the communication state. The change request information "Call" is determined not to be the particular change request information by the change request information determination unit 61 in advance. On the basis of this, the state management unit 53 obtains only the communication state of the participation request terminal (the terminal 10ac) from the terminal management table. In this case, the state management unit 53 searches the terminal management table by using, as the search key, the terminal ID "10ac" of the participation request terminal, and obtains the communication state "None" of the participation request terminal (the terminal 10ac) which transmitted the participation request information.

Subsequently, the state management unit 53 obtains the prior-to-change state information about the participation request terminal corresponding to the change request information "Call" (step S107-2). In this case, the state management unit 53 searches the state change management table (see FIG. 10) by using the change request information "Call" as the search key, and obtains the prior-to-change state information "None".

Subsequently, the state management unit 53 compares the obtained communication state of the participation request terminal (the terminal 10ac) and the prior-to-change state information, and determines whether the obtained communication state of the participation request terminal (the terminal 10ac) and the prior-to-change state information are the same or not (step S107-3). In this case, the state management unit 53 compares the obtained communication state "None" of the participation request terminal and the prior-to-change state information "None", and determines whether the obtained communication state "None" of the participation request terminal and the prior-to-change state information "None" are the same or not.

When the communication state of the participation request terminal (the terminal 10ac) and the prior-to-change state information are determined to be the same as each other (step S107-3: Yes), the state management unit 53 obtains the change information corresponding to the change request information "Call" (step S107-4). In this case, the state management unit 53 searches the state change management table (see FIG. 10) by using the change request information "Call" as the search key, and obtains the change information "Accepted".

Subsequently, the state management unit 53 changes the field portion of the communication state of the record including terminal ID "10ac" in the terminal management table (see FIG. 7) on the basis of the terminal ID "10ac" of the participation request terminal (the terminal 10ac) (step S107-5). In this case, the state management unit 53 changes the field portion of the communication state of the record including the terminal ID "10ac" in the terminal management table to the obtained change information "Accepted".

On the other hand, when the communication state of the participation request terminal (the terminal 10ac) and the prior-to-change state information are determined not to be the same as each other (step S107-3: No), the state management unit 53 does not change the field portion of the communication state of the record including the terminal ID "10ac" in the terminal management table (see FIG. 7). In this case, the transmission/reception unit 51 generates a predetermined error message, and transmits the predetermined error message to the participation request terminal (the terminal 10ac), and thus the processing is finished (step S107-6).

Subsequently, back to FIG. 29, processing that is performed subsequently where the communication state is changed in step S107-5 will be explained. First, the session management unit 57 adds the terminal ID "10ac" of the participation request terminal (the terminal 10ac) to the field portion of the destination terminal of the record including the session ID "se1" in the session management table (see FIG. 9) (step S108).

Subsequently, when the participation request terminal (the terminal 10ac) is permitted to participate in the established session (content data session sed) in step S106-3 as shown in FIG. 32, the transmission/reception unit 51 transmits the participation permitting notification including the session ID "se1" and the relay apparatus connection information used to connect with the relay apparatus 30e to the participation request terminal (step S109).

When the participation request terminal (the terminal 10ac) receives the participation permitting notification, the transmission/reception unit 11 transmits the session ID "se1" and the relay apparatus connection information included in the participation permitting notification to the relay apparatus 30e, thus connecting with the relay apparatus 30e (step S110). Further, with predetermined timing after the participation request terminal connects with the relay apparatus 30e, the transmission/reception unit 11 transmits, to the management system 50, the relay request information including the terminal ID "10ac" of the terminal 10ac, the session ID "se1", and the change request information "Join" indicating that the start of relaying is requested. Subsequently, the management system 50, the relay apparatus 30e, and the participation request terminal execute the same processing as step S72-1, S73-1, S74-1, and S75-1 as shown in FIG. 27, so that the content data session sed is established between the participation request terminal and the relay apparatus 30e. When the content data session sed is established, the relay apparatus 30e can relay three pieces of image data and audio data including low resolution, medium resolution, and high resolution between the terminal 10aa, the terminal 10db, and the terminal 10ac. Therefore, the terminal 10aa, the terminal 10db, and the terminal 10ac can start the television conference.

The transmission/reception unit 51 of the management system 50 transmits a participation notification including the terminal ID "10ac" of the participation request terminal (the terminal 10ac) and the session ID "se1" to the participating terminals (the terminals 10aa, 10db) which already started the content data session sed (step S111-1 and S111-2). Therefore, the participating terminals (the terminals 10aa, 10db) can recognize that the participation request terminal (the terminal 10ac) participates in the content data session.

The terminal extraction unit 54 searches the destination list management table (see FIG. 8) by using, as the search key, the terminal ID of the participation request terminal (the terminal 10ac) included in the participation request information, and extracts the terminal IDs "10aa, 10ad, 10ae" of the destination terminal candidates corresponding to the participation request terminal (step S112). The transmission/reception unit 51 transmits a participation notification (an example of participation information) including the terminal ID "10ac" to the terminals 10ad, 10ae, to which the participation notification has not yet been transmitted, of the terminals 10*aa*, 10*ad*, 10*ae* identified by the extracted terminal IDs (step S113). Therefore, the terminals 10*ad*, 10*ae* can recognize that the participation request terminal (the terminal 10*ac*) is participating in the content data session.

Major Effects of the Present Embodiment

As described above, according to the present embodiment, in order to establish the session for transmitting the content data between the first terminal (the terminal 10*aa*) and the second terminal (the terminal 10*db*), the start request terminal designates the middle-of-conference participation terminal who requests participation in that session. In a case where the session for transmitting the content data is established between the first terminal (the terminal 10*aa*) and the second terminal (the terminal 10*db*), the transmission/reception unit 51 of the management system 50 receives the request of participation in this session from the third terminal (the terminal 10*ac*). In this case, when the first terminal (the terminal 10*aa*) starts the session, which is applied with the participation restriction, with the second terminal (the terminal 10*db*), the management system 50 registers the participation authentication information generated by the participation authentication information generation unit 64. The transmission/reception unit 51 of the management system 50 notifies the participation authentication information generated by the participation authentication information generation unit 64 to the third terminal (the terminal 10*ac*). When the established session is a session applied with the participation restriction, the participation determination unit 63 of the management system 50 prompts input of the participation authentication information on the basis of the participation authentication information displayed on the third terminal. When the received participation restriction information and the participation authentication information generated and registered by the participation authentication information generation unit 64 at the start of the session do not match each other, the participation determination unit 63 prohibits the third terminal from participating in the session. In a case where the participation authentication information of them both match each other, or the session is not applied with the participation restriction, the participation determination unit 63 permits the third terminal to participate in the session. Therefore, the management system 50 according to the present embodiment designates a terminal that can participate, in the middle of the conference, in the session used for a conference involving exchange of highly confidential information, so that middle-of-conference participation in the session can be easily and appropriately restricted. The third terminal designated as the terminal that can participate in the session in the middle of the conference receives notification of the generated participation authentication information from the management system 50, and the user of the third terminal may input the notified participation authentication information in order to receive permission for middle-of-conference participation in the session, and therefore, while the security is improved, and the convenience of the user can be improved.

The management system 50 performs control so as to connect the first terminal (the terminal 10*aa*), the second terminal (the terminal 10*db*), and the third terminal (the terminal 10*ac*). In this case, the transmission/reception unit 51 transmits, to the third terminal, the relay apparatus connection information for connecting to the relay apparatus 30*e* relaying content data transmitted from the first terminal to the second terminal. Therefore, the third terminal can use this relay apparatus connection information to connect to the relay apparatus 30*e*.

Second Embodiment

In the first embodiment, the participation restriction information is not displayed in the destination list displayed on the participation request terminal, but in the present embodiment, the participation restriction information is displayed in the destination list displayed on the participation request terminal.

In the present embodiment, the network configuration of the transmission system 1, and the hardware configuration of the terminal 10, the management system 50, the relay apparatus 30, the program supply system 90, and the maintenance system 100, and each terminal constituting the transmission system 1, and the functional configuration of the apparatuses and the system are the same as those of the first embodiment.

Processing/Operation of the Present Embodiment

In the present embodiment, the processing for managing the state information indicating the state of each relay apparatus 30 transmitted from each relay apparatus 30 to the management system 50, the transmission/reception processing of each of the pieces of management information in the preparation stage before the terminal 10 starts communication, the processing where the terminal 10 requests start of communication with another terminal 10, the processing that is performed where the destination terminal receives a response for permitting start of communication with the start request terminal, and the processing where the relay apparatus starts relaying of data transmitted between the start request terminal and the destination terminal, are also the same as those of the first embodiment.

Figure 34:
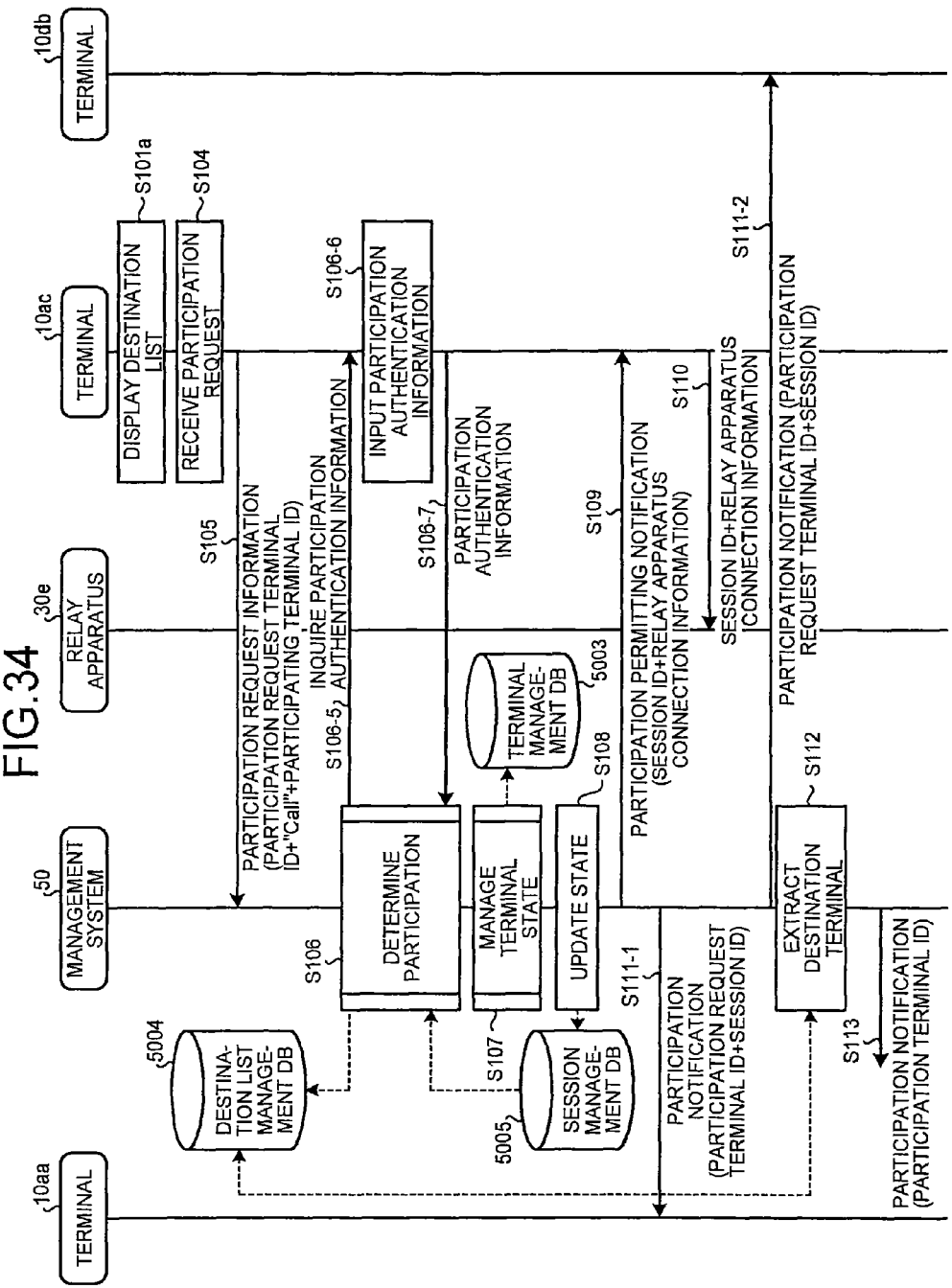
FIG. 34 is a sequence diagram illustrating an example of processing for requesting start of communication according to a second embodiment of the present invention.
Figure 35:
FIG. 35 is a diagram illustrating an example of display of a destination list according to the second embodiment.

Processing where Middle-of-Conference Participation Terminal Requests Participation in Content Data Session FIG. 34 is a sequence diagram illustrating an example of processing for transmitting participation request information in content data session according to the second embodiment. FIG. 35 is a figure illustrating an example of display of a destination list according to the second embodiment. Processing in which, after a content data session is established between the start request terminal (the terminal 10*aa*) and the destination terminal (the terminal 10*db*), the middle-of-conference participation terminal (the terminal 10*ac*) transmits participation request information for requesting participation in the content data session will be explained with reference to FIGS. 34 and 35. More specifically, the middle-of-conference participation terminal (the terminal 10*ac*) operates as the participation request terminal transmitting the participation request information. FIG. 34 shows processing in which all of the various kinds of management information are transmitted and received via the management information session sei.

When the user wants to participate in the established session which is a session that has already been established and participate in the television conference using this session, the user causes the display 120*ac* of the terminal 10*ac* to display the destination list by means of log-in processing explained with reference to FIG. 16 using the terminal used by the user (the terminal 10*ac* in this case) (step S101*a*).

As shown in FIG. 35, a destination list 1401-1 is displayed on the display 120*ac* of the terminal 10*ac*. In the destination list 1401-1, destination terminal candidates with which the terminal 10*ac* serving as the start request terminal can establish a session are displayed as a list. As a result of processing in step S58 of FIG. 25, the display 120ac displays a participation authentication information display unit 1401-2 including the terminal ID "10aa" of the start request terminal (the terminal 10aa) and the participation authentication information (for example, "1234") below the destination list 1401-1. Further, in the participation request terminal (the terminal 10ac) which received the terminal ID, the operation state, and the communication state of the destination candidate terminal as a result of the processing in step S32 of FIG. 16, the participation restriction presence/absence display unit 1401-3 indicating presence/absence of the participation restriction of the destination candidate terminal for the session is displayed in the destination list 1401-1 displayed on the display 120ac. It should be noted that the participation request terminal determines presence/absence of the participation restriction of the destination candidate terminal for the session on the basis of the communication state received from the management system 50. The user of the participation request terminal can find whether there is participation restriction or not for the terminal 10 in the session which is to be participated in, before the participation request. The user of the participation request terminal compares the terminal ID displayed on the participation authentication information display unit 1401-2 and the terminal ID of the terminal 10 displayed in the destination list 1401-1, and when the terminal 10 displayed in the destination list 1401-1 is participating in the session applied with the participation restriction, the user can determine whether the user can participate in the session or not before the participation request.

The processing in steps S104 to S113 below is the same as the processing as shown in FIG. 29 according to the first embodiment.

As described above, according to the present embodiment, the destination list displayed on the participation request terminal shows not only the participation restriction information but also the participation authentication information generated by the participation authentication information generation unit 64 and the terminal ID of the start request terminal. As described above, for each of the terminals displayed in the destination list, the participation control information is displayed, and the user can make participation request upon finding whether there is participation restriction for the session in which the user is participating in the middle of the conference, and therefore, this is convenient for the user. The user compares the terminal ID of the start request terminal displayed on the middle-of-conference participation terminal and the terminal ID of the terminal displayed in the destination list, and when the terminal displayed in the destination list is participating in the session applied with the participation restriction, the user can determine whether the user can participate in the session or not, and this further improves the convenience of the user.

The explanation has been made with reference to the present embodiments, but various changes or improvements can be added to the above embodiments.

Figure 36:
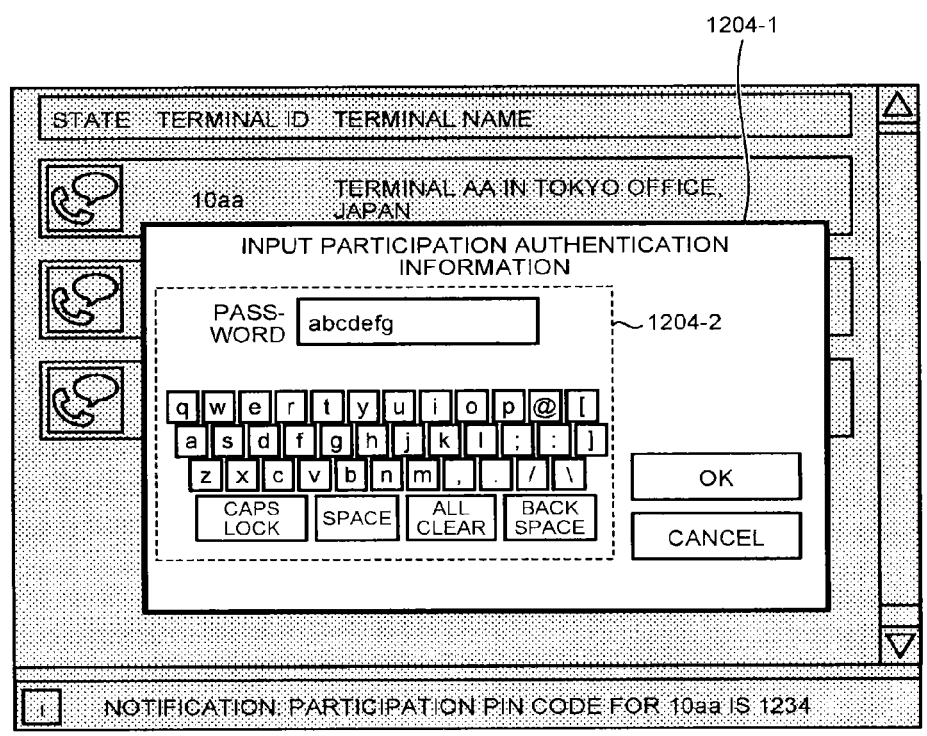
FIG. 36 is a diagram illustrating an example of display of a participation restriction information input dialog according to a modification of the second embodiment.

FIG. 36 is a figure illustrating an example of display of a participation restriction information input dialog according to a modification. As shown in FIG. 36, a participation authentication information input dialog 1204-1 including a software keyboard may be displayed instead of the participation authentication information input dialog 1203-1 as shown in FIG. 31. Therefore, the display control unit 16 of the terminal 10 can be configured so as to allow for input of the participation authentication information using the PIN code input unit 1204-2 including the software keyboard.

Alternatively, the terminal 10 may be configured such that a hand writing input unit and the like may be displayed in the participation authentication information input dialog, so that the display control unit 16 and the operation input reception unit 12 are configured to allow for input of the participation authentication information by means of hand writing input, and a recognition unit may be provided to perform character recognition of input text.

Supplement to Embodiments

The management system 50 and the program supply system 90 according to each of the above embodiments may be structured by a single computer, or may be structured by multiple computers in which each unit (function or means) is divided and allocated in any manner. When the program supply system 90 is structured by a single computer, the program transmitted by the program supply system 90 may be transmitted upon being divided into multiple modules, or may be transmitted without being divided into multiple modules. Further, when the program supply system 90 is structured by multiple computers, the program may be transmitted from each computer in such a state that multiple modules are divided.

Any one of a recording medium storing the program for terminal, the program for the relay apparatus and the program for transmission management according to each of the above embodiments, an HD 204 storing these programs, and the program supply system 90 having the HD 204 is used when the program for terminal, the program for the relay apparatus and the program for transmission management are provided as program products to users and the like in a domestic country or overseas.

Further, in each of the above embodiments, the change quality management table and quality management table is managed with attention being given to the resolution of an image of image data which is an example of image quality of image data relayed by the relay apparatus 30. However, the embodiment is not limited thereto. Alternatively, the change quality management table and quality management table may be managed with attention being given to the depth of the image quality of the image data, the sampling frequency of audio of audio data, or the bit length of audio of audio data, which is another example of quality.

The reception date/time is managed in the relay apparatus management table, the terminal management table as shown in FIG. 7, and the session management table as shown in FIG. 9, but the embodiment is not limited thereto. Alternatively, at least reception time of the reception date/time may be managed.

Further, in each of the above embodiments, the IP address of the relay apparatus is managed in the relay apparatus management table as shown in FIG. 5, and the IP address of the terminal is managed in the terminal management table as shown in FIG. 7, but the embodiment is not limited. In the case of the relay apparatus identification information for identifying the relay apparatus 30 on the communication network 2, or the terminal identification information for identifying the terminal 10 on the communication network 2, the FQDN (Fully Qualified Domain Name) thereof may be managed. In this case, the IP address corresponding to the FQDN is obtained by a well-known DNS (Domain Name System) server. It should be noted that "the relay apparatus identification information for identifying the relay apparatus 30 on the communication network 2" may also be expressed as "relay apparatus connection destination information indicating a connection destination to the relay apparatus 30 on the communication network 2" or "relay apparatus destination information indicating a destination to the relay apparatus 30 on the communication network 2". Likewise, "the terminal identification information for identifying the terminal 10 in the communication network 2" may also be expressed as "terminal connection destination information indicating a connection destination to the terminal 10 in the communication network 2" or "terminal destination information indicating a destination to the terminal 10 in the communication network 2".

In each of the above embodiments, the "television conference" is used as a term that can be replaced with "video conference".

In each of the above embodiments, the case of the television conference system has been explained as an example of transmission system 1, but the embodiment is not limited thereto. Alternatively, the transmission system 1 may be a telephone system such as IP (Internet Protocol) telephone or the Internet telephone. Still alternatively, the transmission system 1 may be a car navigation system. In this case, for example, one of the terminals 10 corresponds to a car navigation apparatus implemented on a car, and the other of the terminals 10 corresponds to a management terminal or a management server at a management center where car navigation is managed or corresponds to a car navigation apparatus implemented on another car. Further, the transmission system 1 may be an audio conference system or a PC (Personal Computer) screen sharing system.

Figure 37:
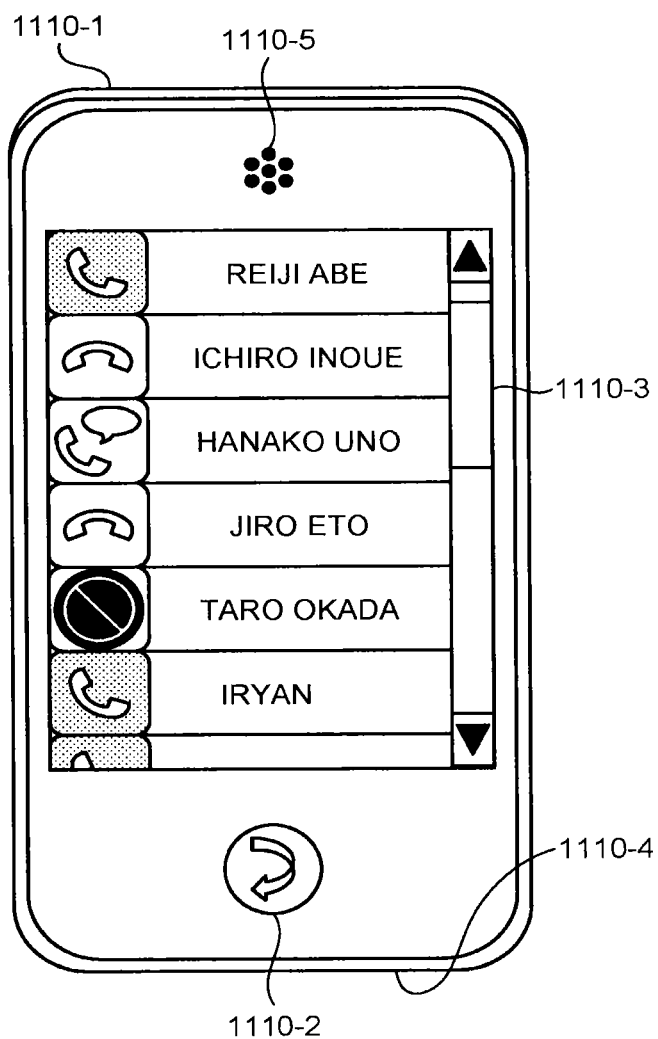
FIG. 37 is a conceptual diagram illustrating a destination list according to another embodiment of the present invention.

FIG. 37 is a conceptual diagram illustrating a destination list according to another embodiment. The transmission system 1 may be a communication system such as a cellular phone. In this case, for example, the terminal 10 corresponds to a cellular phone. An example of display of a destination list in this case is shown in FIG. 37. More specifically, the terminal 10 serving as the cellular phone includes a main body 1110-1 of the cellular phone, a menu screen display button 1110-2 provided on the main body 1110-1, a display unit 1110-3 provided on the main body 1110-1, a microphone 1110-4 provided at a lower portion of the main body 1110-1, and a speaker 1110-5 provided on the main body 1110-1. The menu screen display button 1110-2 is a button for displaying a menu screen where icons indicating various kinds of applications are displayed. The display unit 1110-3 is a touch panel, on which the user selects the destination name, so that the user can communicate with a cellular phone of the other party.

In each of the above embodiments, image data and audio data have been explained as an example of content data, but the embodiment is not limited thereto. Alternatively, the content data may be tactile (touch) data. In this case, the sense felt by the user at one of the terminals is transmitted to the other of the terminals. Further, the content data may be smell data. In this case, smell at one of the terminals is transmitted to another terminal. The content data may be any at least one of image data, audio data, tactile data, and smell data.

In each of the above embodiments, the case where the television conference is conducted by the transmission system 1 has been explained, but the embodiment is not limited thereto. Alternatively, the transmission system 1 may be used for meeting, general conversation between family members or between friends, or one-way presentation of information.

According to the present invention, the security can be improved while easily restricting a participation location for a session.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication system including a plurality of terminals, the communication system comprising:
    processing circuitry configured to
        receive, from a first terminal, start request information, which is information for requesting a start of a session between the first terminal and a second terminal of the plurality of terminals and which includes terminal identification information of a third terminal designated by the first terminal as having permission to join the session after the session is established;
        establish the session between the first terminal and the second terminal in response to receiving the start request information;
        transmit, after establishment of the session, to the third terminal, which is a terminal other than the first terminal and the second terminal, first participation authentication information for authenticating participation in the established session between the first terminal and the second terminal;
        receive, from the third terminal, participation request information with which the third terminal requests participating in the established session, and second participation authentication information that is input with the third terminal; and
        when the participation request information is a request for participation in the established session established by the start request information, compare the first participation authentication information and the second participation authentication information, and when the first participation authentication information and the second participation authentication information match each other, permit the third terminal to participate in the established session, wherein when the processing circuitry permits participation in the established session, the processing circuitry causes the third terminal to participate in the established session.

2. The communication system according to claim 1, wherein the processing circuitry is further configured to generate the first participation authentication information, and transmit the first participation authentication information to the third terminal.

3. The communication system according to claim 1, further comprising a first display controller configured to cause a display of the first terminal to display a participation restriction selection screen for selecting whether or not the session established with the second terminal is applied with a participation restriction, wherein the first processing circuitry receives the start request information including information about a presence/absence of the participation restriction selected in the participation restriction selection screen.

4. The communication system according to claim 1, wherein the processing circuitry is further configured to transmit the participation authentication information to the third terminal indicated by the terminal identification information about the terminal included in the start request information.

5. The communication system according to claim 4, further comprising a second display controller configured to cause a display of the first terminal to display a screen showing the terminal to be designated as the third terminal, wherein the start request information includes the terminal identification information about the terminal designated as the third terminal in the screen.

6. The communication system according to claim 3, wherein the processing circuitry is further configured to transmit, to the third terminal, the first participation authentication information as well as terminal identification information about the first terminal, the communication system further comprises a third display controller configured to cause a display of the third terminal to display a participating terminal selection screen for selecting the terminal participating in the established session, an authentication information display screen for displaying the terminal identification information about the first terminal, and an authentication information input screen with which the second participation authentication information is input, and the processing circuitry is configured to receive the participation request information including terminal identification information about the terminal selected in the participating terminal selection screen based on the terminal identification information about the first terminal displayed on the authentication information display screen, and the second participation authentication information which is input in the authentication information input screen.

7. The communication system according to claim 6, further comprising a memory configured to store terminal management information in which terminal identification information identifying each of the plurality of terminals and a communication state of each of the terminals are associated with each other, wherein the third display controller displays, on the participating terminal selection screen, information about the presence/absence of the participation restriction indicated by the communication state in the terminal management information associated with the terminal displayed.

8. The communication system according to claim 1, wherein when the participation authentication information input with the third terminal cannot be obtained for a certain period of time since the processing circuitry receives the participation request information for requesting participation in the established session, the processing circuitry prohibits the third terminal from participating in the established session.

9. A management apparatus, comprising:

processing circuitry configured to receive, from a first terminal, start request information, which is information for requesting a start of a session between the first terminal and a second terminal of a plurality of terminals and which includes terminal identification information of a third terminal designated by the first terminal as having permission to join the session after the session is established;

establish the session between the first terminal and the second terminal in response to receiving the start request information;

transmit, after establishment of the session, to the third terminal, which is a terminal other than the first terminal and the second terminal, first participation authentication information for authenticating participation in the established session between the first terminal and the second terminal;

receive, from the third terminal, participation request information with which the third terminal requests participating in the established session, and second participation authentication information that is input with the third terminal; and when the participation request information is a request for participation in the established session established by the start request information, compare the first participation authentication information and the second participation authentication information, and when the first participation authentication information and the second participation authentication information match each other, permit the third terminal to participate in the established session, wherein when the processing circuitry permits participation in the established session, the processing circuitry causes the third terminal to participate in the established session.

10. A communication method, comprising:

receiving, from a first terminal, start request information, which is information for requesting a start of a session between the first terminal and a second terminal of a plurality of terminals and which includes terminal identification information of a third terminal designated by the first terminal as having permission to join the session after the session is established;

establishing the session between the first terminal and the second terminal in response to receiving the start request information;

transmitting, after establishment of the session, to the third terminal, which is a terminal other than the first terminal and the second terminal, first participation authentication information for authenticating participation in the established session between the first terminal and the second terminal;

receiving, from the third terminal, participation request information with which the third terminal requests participating in the established session, and second participation authentication information that is input with the third terminal; and permitting the third terminal to participate in the established session when the participation request information is a request for participation in the established session established by the start request information, the first participation authentication information and the second participation authentication information input with the third terminal are compared, and when the first participation authentication information and the second participation authentication information match each other.

11. The communication method according to claim 10, further comprising generating participation authentication information, wherein the step of transmitting includes transmitting the first participation authentication information to the third terminal.

12. The communication method according to claim 10, further comprising controlling a display of the first terminal to display a participation restriction selection screen for selecting whether or not the session established with the second terminal is applied with a participation restriction,
wherein the step of receiving start request information includes receiving the start request information including information about a presence/absence of the participation restriction selected in the participation restriction selection screen.

13. The communication method according to claim 10, wherein
the step of transmitting includes transmitting the first participation authentication information to the third terminal indicated by the terminal identification information about the terminal included in the start request information.

14. The communication method according to claim 13, further comprising controlling a display of the first terminal to display a screen showing the terminal to be designated as the third terminal,
wherein the start request information includes the terminal identification information about the terminal designated as the third terminal in the screen.

15. The communication method according to claim 12, wherein
the step of transmitting includes transmitting, to the third terminal, the first participation authentication information as well as terminal identification information about the first terminal,
the communication method further comprises controlling a display of the third terminal to display a participating terminal selection screen for selecting the terminal participating in the established session, an authentication information display screen for displaying the terminal identification information about the first terminal, and an authentication information input screen with which the second participation authentication information is input, and the step of receiving the participation request information includes receiving the participation request information including terminal identification information about the terminal selected in the participating terminal selection screen based on the terminal identification information about the first terminal displayed on the authentication information display screen, and the second participation authentication information which is input in the authentication information input screen.

16. The communication method according to claim 15, further comprising storing terminal management information in which terminal identification information identifying each of the plurality of terminals and a communication state of each of the terminals are associated with each other,
wherein the step of controlling a display of the third terminal includes displaying, on the participating terminal selection screen, information about the presence/absence of the participation restriction indicated by the communication state in the terminal management information associated with the terminal displayed.

17. The communication method according to claim 10, wherein
when the participation authentication information input with the third terminal cannot be obtained for a certain period of time since receiving the participation request information for requesting participation in the established session, the third terminal is prohibited from participating in the established session.

18. A non-transitory computer-readable recording medium that contains a computer program that causes a computer to:
receive, from a first terminal, start request information, which is information for requesting start of a session between the first terminal and a second terminal of a plurality of terminals and which includes terminal identification information of a third terminal designated by the first terminal as having permission to join the session after the session is established;
establish the session between the first terminal and the second terminal in response to receiving the start request information;
transmit, after establishment of the session, to the third terminal, which is a terminal other than the first terminal and the second terminal, first participation authentication information for authenticating participation in the established session between the first terminal and the second terminal;
receive, from the third terminal, participation request information with which the third terminal requests participating in the established session, and second participation authentication information that is input with the third terminal; and
when the participation request information is a request for participation in the established session established by the start request information, compare the first participation authentication information and the second participation authentication information and when the first participation authentication information and the second participation authentication information match each other, permit the third terminal to participate in the established session.

* * * * *